(12) United States Patent
Bhoora et al.

(10) Patent No.: US 12,499,434 B2
(45) Date of Patent: Dec. 16, 2025

(54) COMBINABLE GIFT CARD COMPONENTS AND PROCESS FOR ACTIVATION AND VALIDATION OF ASSEMBLED GIFT CARDS

(71) Applicant: Target Brands, Inc., Minneapolis, MN (US)

(72) Inventors: Surjeet Bhoora, Bangalore (IN); Christopher Brakob, Minneapolis, MN (US); Donnie Tolbert, Carver, MN (US); Andrew Wipf, Minneapolis, MN (US); Nicholas Lojewski, Minneapolis, MN (US); Arnab Pal, Rogers, MN (US); Richard Ryan Walstrom, Champlin, MN (US); Alexandros Glitsos, Saint Michael, MN (US); Matthew Levy, Chanhassen, MN (US); Miguel Herrera, Fillmore, CA (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/941,182

(22) Filed: Nov. 8, 2024

(65) Prior Publication Data

US 2025/0156846 A1    May 15, 2025

Related U.S. Application Data

(60) Provisional application No. 63/558,145, filed on Feb. 27, 2024, provisional application No. 63/620,514,
(Continued)

(51) Int. Cl.
*G06Q 20/28* (2012.01)
*G06Q 20/34* (2012.01)
*G06Q 20/40* (2012.01)

(52) U.S. Cl.
CPC ............ *G06Q 20/354* (2013.01); *G06Q 20/28* (2013.01); *G06Q 20/401* (2013.01)

(58) Field of Classification Search
CPC ...... G06Q 20/352; G06Q 20/28; G06Q 20/401
See application file for complete search history.

(56) References Cited

U.S. PATENT DOCUMENTS

| 4,398,708 A | 8/1983 | Goldman et al. |
| 5,286,061 A | 2/1994 | Behm |

(Continued)

FOREIGN PATENT DOCUMENTS

| CA | 172324 | 7/2018 |
| CA | 187373 | 8/2020 |

(Continued)

OTHER PUBLICATIONS

"Jabran Riaz, Retail Industry Gift Card Hacking Technique Challenges, Jan. 1, 2019, IEEE" (Year: 2019).*

(Continued)

*Primary Examiner* — David P Sharvin
*Assistant Examiner* — Gregory M James
(74) *Attorney, Agent, or Firm* — Barnes & Thornburg LLP

(57) ABSTRACT

Disclosed are systems, methods, and techniques for combinable gift card components during a checkout process in a retail environment. A gift card can include a first gift card component of a first type, the first gift card component including a first identifier (e.g., barcode), and a second gift card component of a second type that can be different from the first type and separate from the first gift card component, having a second identifier. The first and second identifiers can be scanned and used to associate the first gift card component with the second gift card component. The second gift card component can be an envelope or sleeve that can be
(Continued)

a similar size and/or a similar shape as the first gift card component. The second gift card component can permanently attach to the first gift card component during the checkout process to form the gift card.

26 Claims, 40 Drawing Sheets

Related U.S. Application Data filed on Jan. 12, 2024, provisional application No. 63/598,980, filed on Nov. 15, 2023.

(56) References Cited

U.S. PATENT DOCUMENTS

| | | | |
|---|---|---|---|
| 5,500,514 | A | 3/1996 | Veeneman et al. |
| 5,791,474 | A | 8/1998 | Hansen |
| 5,803,504 | A | 9/1998 | Deshiens et al. |
| 6,142,533 | A | 11/2000 | Borowski, Jr. |
| D450,760 | S | 11/2001 | Luciano et al. |
| D493,829 | S | 8/2004 | Foster |
| 6,832,720 | B2 | 12/2004 | Dawson |
| D522,052 | S | 5/2006 | Lubking |
| D524,654 | S | 7/2006 | Keiichi et al. |
| 7,290,705 | B1 | 11/2007 | Shin |
| 7,354,004 | B2 | 4/2008 | Andersen et al. |
| 7,374,095 | B2 | 5/2008 | Blank et al. |
| 8,089,655 | B2 * | 1/2012 | Elarde ............... G06Q 30/0601 358/1.18 |
| 8,251,285 | B2 | 8/2012 | Kingsborough et al. |
| 8,430,298 | B2 | 4/2013 | Martinez et al. |
| 8,523,078 | B2 | 9/2013 | Biskupski |
| 8,571,983 | B1 * | 10/2013 | Blackhurst ............ G06Q 30/02 705/40 |
| 8,594,286 | B2 | 11/2013 | New et al. |
| 8,622,436 | B2 | 1/2014 | Mehta et al. |
| 8,727,213 | B2 | 5/2014 | Wilen |
| 8,939,354 | B1 | 1/2015 | Hinson et al. |
| D734,388 | S | 7/2015 | Lin et al. |
| RE45,762 | E | 10/2015 | Raksha et al. |
| D785,334 | S | 5/2017 | Holt et al. |
| D813,302 | S | 3/2018 | Getachew et al. |
| D854,615 | S | 7/2019 | Hamilton et al. |
| D881,270 | S | 4/2020 | Narayan et al. |
| D940,569 | S | 1/2022 | Pierron et al. |
| 11,379,810 | B2 | 7/2022 | Curtis |
| D963,471 | S | 9/2022 | Larson |
| 2001/0022446 | A1 | 9/2001 | Klure |
| 2005/0038714 | A1 | 2/2005 | Bonet et al. |
| 2007/0096457 | A1 | 5/2007 | Cahill |
| 2007/0200000 | A1 * | 8/2007 | Sanders ................ B43M 3/045 235/487 |
| 2007/0224398 | A1 | 9/2007 | Raksha et al. |
| 2007/0272743 | A1 | 11/2007 | Christie et al. |
| 2008/0217415 | A1 | 9/2008 | Royer |
| 2008/0290180 | A1 * | 11/2008 | Lauer ....................... G09F 3/20 235/494 |
| 2009/0038968 | A1 | 2/2009 | Smith |
| 2009/0289123 | A1 * | 11/2009 | Fleischer ............ G06Q 20/342 235/494 |
| 2014/0116908 | A1 | 5/2014 | Beyer et al. |
| 2018/0018651 | A1 * | 1/2018 | Nelson ................... G07F 17/26 |
| 2018/0053157 | A1 | 2/2018 | Roffey |
| 2024/0112173 | A1 * | 4/2024 | Parks .................. G06Q 20/342 |

FOREIGN PATENT DOCUMENTS

| | | | | |
|---|---|---|---|---|
| CA | 3067374 | A1 * | 7/2021 | ......... G06Q 30/0601 |
| CN | 302370719 | | 3/2013 | |
| CN | 302924774 | | 8/2014 | |
| CN | 303070306 | | 1/2015 | |
| CN | 303070307 | | 1/2015 | |
| CN | 303090171 | | 1/2015 | |
| CN | 303480618 | | 12/2015 | |
| CN | 304105177 | | 4/2017 | |
| CN | 304209564 | | 7/2017 | |
| CN | 305698549 | | 4/2020 | |
| CN | 306019714 | | 8/2020 | |
| CN | 308044830 | | 5/2023 | |
| CN | 308777793 | | 8/2024 | |
| DE | 402023202640-0007 | | 5/2024 | |
| EP | 1514695 | | 3/2005 | |
| EP | 015055010-0001 | | 4/2024 | |
| GB | 4022615 | | 1/2012 | |
| GB | 4035911 | | 7/2014 | |
| GB | 9003064179-0002 | | 4/2016 | |
| GB | 9003064179-0003 | | 4/2016 | |
| GB | 9003064179-0004 | | 4/2016 | |
| GB | 9003064179-0005 | | 4/2016 | |
| GB | 9003081405-0001 | | 4/2016 | |
| GB | 9003081405-0002 | | 4/2016 | |
| GB | 9003081405-0003 | | 4/2016 | |
| GB | 9003081405-0004 | | 4/2016 | |
| GB | 6062822 | | 6/2019 | |
| GB | 6103479 | | 10/2020 | |
| GB | 6341541 | | 1/2024 | |
| JP | D1561094 | | 10/2016 | |
| JP | D1568183 | | 1/2017 | |

OTHER PUBLICATIONS

Eva Sgroi, "Beware of Apple Gift Card Scam", itnewsafrica.com, Jul. 14, 2023, accessed on Oct. 11, 2024 at https://www.itnewsafrica.com/2023/07/beware-of-apple-gift-card-scam/, 1 page.

Gidget Alikpala, "How do scammers rip off Walmart gift card holders? Fraud prevention techniques", en.as.com, accessed on Oct. 11, 2024 at https://en.as.com/latest_news/how-do-scammers-rip-off-walmart-gift-card-holders-fraud-prevention-techniques-n/, 8 pages.

Diane Wilson, "How scammers can drain gift cards before you even buy them", abc11.com, accessed on Oct. 11, 2024 at https://abc11.com/gift-card-scams-buy/5742144/, 4 pages.

Michael Schwartz, "Gift card balance drained before used, how hackers do it", wkbw.com, accessed on Oct. 11, 2024 at https://www.wkbw.com/7problemsolvers/gift-card-balance-drained-before-used-how-hackers-do-it, 7 pages.

"What is a Gift Card Scam?", giftcards.com, accessed on Oct. 14, 2024 at https://web.archive.org/web/20240620004819/https://www.giftcards.com/blog/giftcard-scams, 12 pages.

Anti-Counterfeiting Ink Printing Overview, Holo solution Inc., Dec. 24, 2020, accessed on Oct. 11, 2024 at https://www.holoteam.com/post/anti-counterfeiting-ink-en, 13 pages.

Take your package design beyond the expected, traveltags.com, accessed on Oct. 11, 2024 at https://www.traveltags.com/card-services/card-packaging, 3 pages.

* cited by examiner

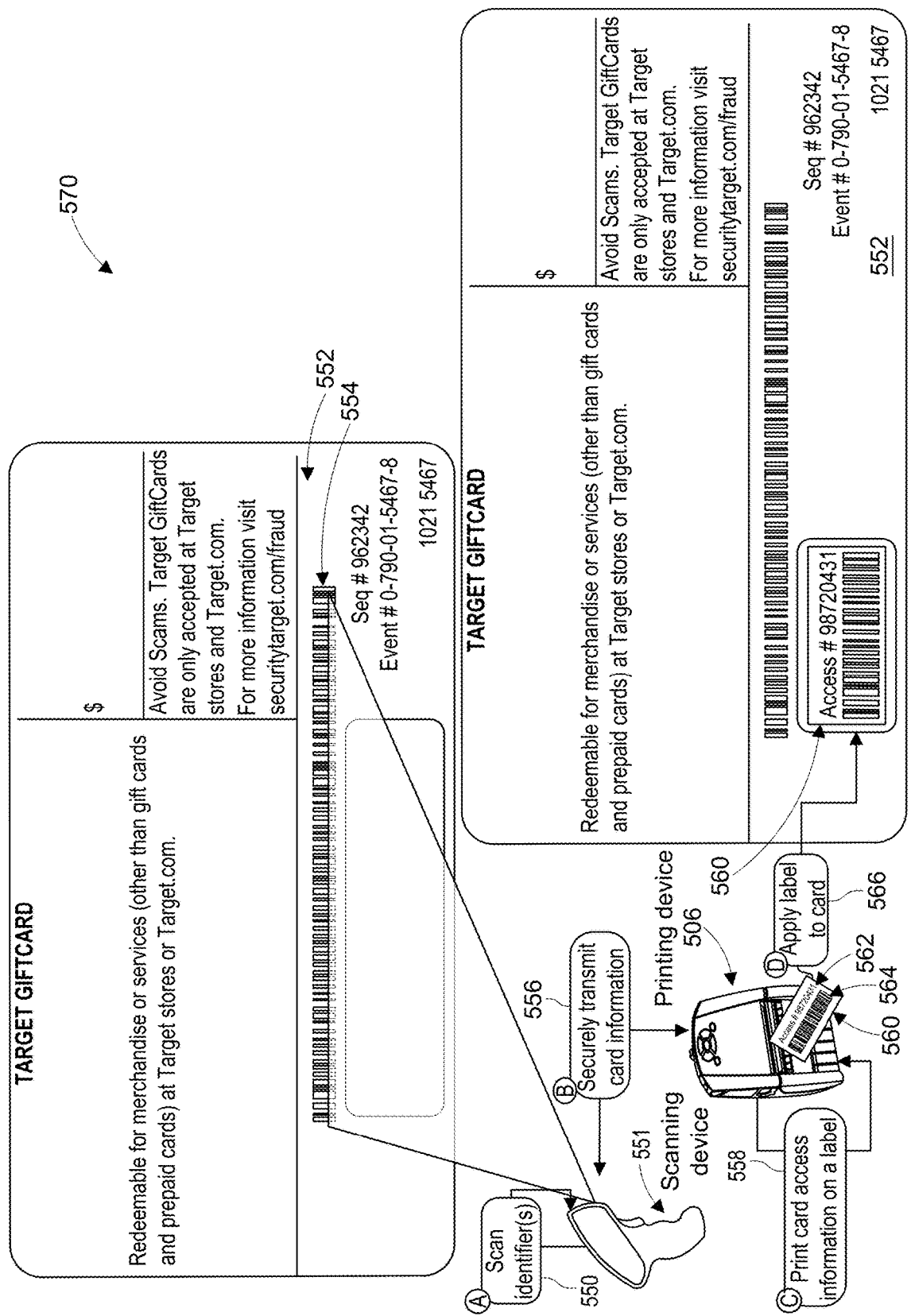

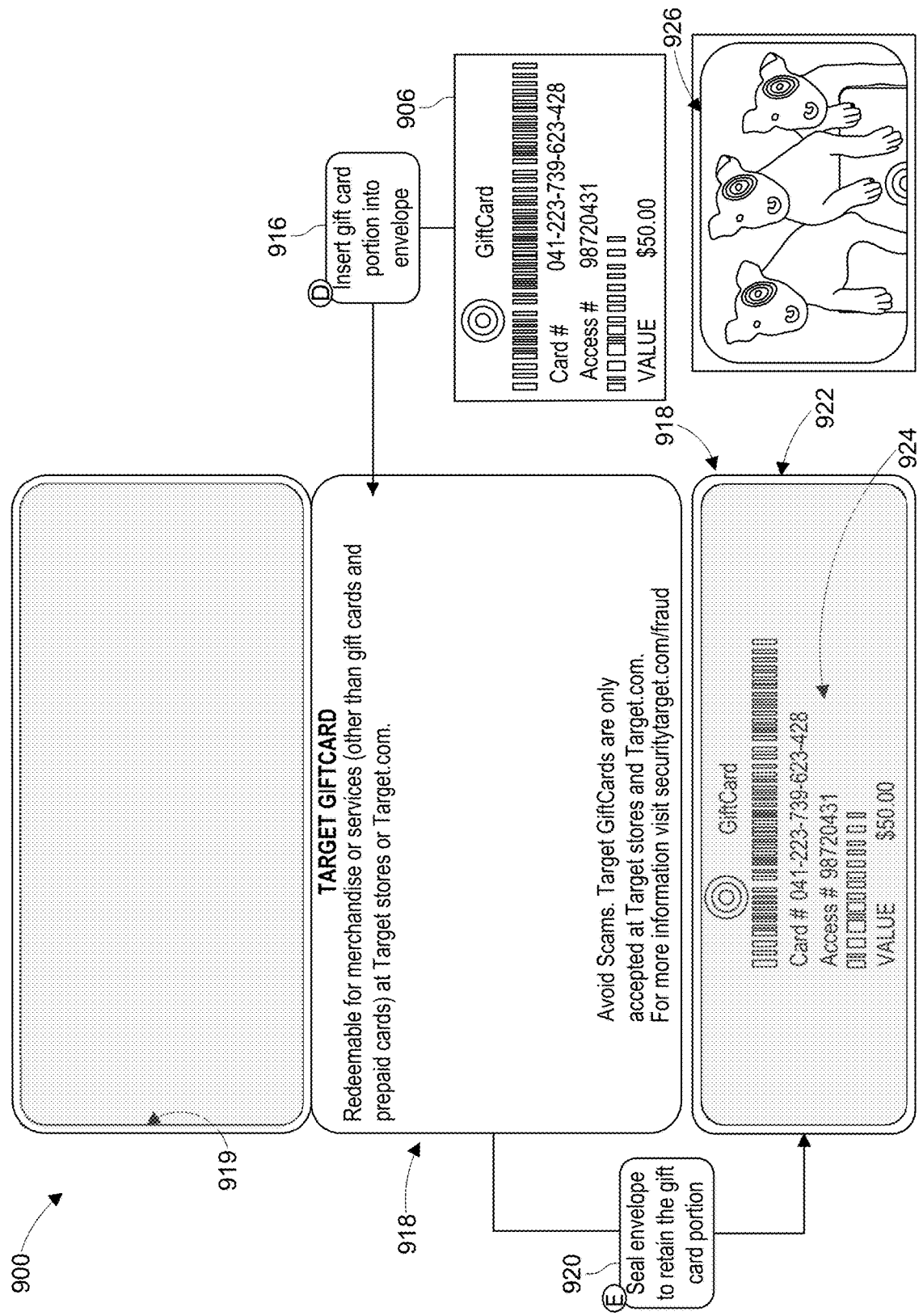

COMBINABLE GIFT CARD COMPONENTS AND PROCESS FOR ACTIVATION AND VALIDATION OF ASSEMBLED GIFT CARDS

INCORPORATION BY REFERENCE

This application claims the benefit of priority to U.S. Provisional Patent Application No. 63/620,514, filed on Jan. 12, 2024, U.S. Provisional Patent Application No. 63/558,145, filed on Feb. 27, 2024, and U.S. Provisional Patent Application No. 63/598,980, filed on Nov. 15, 2023, the entire contents of each of which are herein incorporated by reference in their entirety.

TECHNICAL FIELD

This disclosure generally describes devices, systems, apparatuses, and methods related to combinable gift card components that are configured to be assembled at or during a checkout process in a retail environment, such as a store, to validate and activate the gift cards for usage.

BACKGROUND

Physical gift cards have often been made of a plastic material and include a pre-generated unique card number used to identify the card and to redeem the stored value associated with the card. Such pre-generated unique card numbers can be generated and printed on gift cards prior to their placement on a shelf or other retail display, and prior to the gift card being purchased during a retail checkout process.

To provide added security, gift cards have often been pre-generated to include a PIN or other validating identifier that is paired with the unique gift card number and used to validate purchases made with the gift card. For example, the gift card can be printed or otherwise generated with the card number and the PIN, and then put on a shelf in a retail environment, such as a store. The card number and/or the PIN can sometimes be exposed while on display on the shelf. Sometimes, the gift card may be printed with a message, images, or other information on a surface of the card.

When a retail customer purchases the gift card, the card number can be scanned, the purchase of the gift card can be verified, and then the gift card can be activated for redemption by presenting the card number in combination with the PIN. Sometimes, the PIN can be physically covered on the card with a protective film or other tamper-proof material that can prevent the PIN from being viewed unless the film or other tamper-proof material is at least partially removed. To reveal or otherwise view the PIN, a customer may scratch off the film or other tamper-proof material.

SUMMARY

The disclosure generally describes devices, systems, apparatuses, and methods related to gift card components (e.g., decoupled gift card components) that are configured to be assembled/attached to each other around or during a checkout process in a retail environment, such as a store, to validate and activate the gift cards for usage. More specifically, two separate (e.g., decoupled), attachable components, such as a gift card and an envelope (e.g., sleeve, skin, label), sticker, or wrapper, can be placed on shelves or other retail stands for selection, attachment, and purchase. Both the gift card and the envelope can have scannable identifiers, such as barcodes, which on some components may be unique across all of those component types (e.g., gift card identifier can be unique with regard to all other identifiers on gift card component type) and on other components may be non-unique with regard to those component types (e.g., envelope or covering identifier can be non-unique with regard to all other envelope/covering component types). The components can be configured such that, when the gift card is placed inside the envelope or otherwise attached to the envelope, the gift card and the envelope may not be detached from each other, both barcodes can be visible and scannable during a checkout process. During the checkout process, a customer and/or a team member in the retail environment can scan both barcodes to identify and activate the gift card and complete purchase of the gift card. When the barcodes are scanned, a backend server system can associate the values from the multiple components to create a new and unique combination of gift card values (e.g., gift card number and PIN combination) that can be used to authenticate and validate the gift card when used. The new combination of values can be stored by the backend server system and can form a new gift card that is being purchased as part of the scanning event. The combined card information can be used and processed during checkout, such as by a point-of-sale (POS) terminal, to validate the gift card, add funds to the card, and activate the card. In some implementations, the barcode can be a pointer to a PIN or other gift card identifier value that is maintained by the backend server system. Therefore, the barcode may not be the PIN itself that identifies the gift card.

The gift card and/or the envelope may have adhesives on one or more respective surfaces for attaching the gift card and the envelope to each other. The envelope can include a window or transparent material through which a portion of the gift card can be visible when the gift card is placed inside the envelope. For example, the barcode of the gift card may be visible through the window. The envelope may be configured to wrap around, encase, and/or cover at least one edge of the gift card. The envelope can be any other type of skin, wrapper, sticker, or material that wraps around or otherwise covers a portion of the gift card. The envelope may be approximately a same size as the gift card (height, length, width, thickness) so that when attached to the gift card in any of the configurations described herein, the gift card can fit into a pocket and/or wallet like a credit card. Sometimes, the barcodes on each of the gift card and the envelope may line up when correctly affixed to each other. Sometimes, when the gift card and the envelope are correctly attached, a portion of a barcode for the gift card and/or the envelope may be covered, thereby ensuring proper assembly of the two separate components. In some implementations, identifying information, such as a PIN, can be printed on a label, in real-time during a checkout process, then affixed to the gift card that is combined with the envelope. The PIN can be generated and associated with the gift card in real-time, at the time of purchase. Sometimes, the PIN can be pre-existing and already associated with the gift card at the time of purchase. The PIN on the label can be scanned during the checkout process and used to identify and activate the gift card that is combined with the envelope.

As an illustrative example, suppose a customer wants to purchase a $50 gift card for their nephew's birthday. The customer can select, from a gift card display, a gift card that simply indicates the card is for $50. The selected gift card can have a barcode (e.g., SKU, other identifying information) that identifies the card item within a checkout system (e.g., SKU barcode and corresponding SKU number that identifies a $50 gift card in the checkout system for the retail environment). In some implementations, the barcode may be a pointer to a PIN or other identifier value associated with the gift card, which can be stored by the backend server system. The card may also have an identifier for the card itself (e.g., barcode that identifies the gift card relative to all other gift cards in the retail environment). The customer can also grab an envelope that is available at the display, the envelope being a sleeve to slide the gift card into. The envelope also may have a barcode that provides an additional value, such as a PIN, to be paired with the gift card's identifier to provide valid gift card information. The envelope may also include a window that allows the customer to see an amount on the gift card and the barcode of the card. Once the card is inside the envelope, the envelope can be sealed shut using one or more adhesives. During a checkout process, both the barcodes on the gift card and the envelope can be scanned, associated with the gift card, and used to activate the gift card with a $50 balance. This value pair (e.g., both barcodes for the gift card and the envelope) can then be referenced and required in order to use the balance associated with the gift card. Sometimes, the identifier and the corresponding additional value pair may not be generated until purchase of the gift card, which can undermine attempts by malicious users to obtain those values in advance of the gift card purchase. The identifier and the additional value can be on either the gift card or the envelope, and can, in some instances, be generated based on a combination of the values from the two separate components.

One or more embodiments described herein can include a system for assembling a secure gift card, the system including: a first gift card component of a first type, the first gift card component including a first identifier, a second gift card component of a second type that can be different from the first type, the second gift card component including a second identifier, the first gift card component and the second gift card component being configured to be retained separately and to be physically combined at or around a time of activation to form a combined gift card that is usable in a retail environment, and a gift card computer system that can be configured to perform an activation process for the combined gift card to be used in the retail environment, the activation process including: receiving, over a communication network, the first identifier for the first gift card component and the second identifier for the second gift card component for the combined gift card, validating that the first gift card component and the second gift card component are available for use in the combined gift card based on a comparison of the received first identifier and the received second identifier against gift card component data in a data store, associating, based on the validating, the first gift card component and the second gift card component for the combined gift card in the data store, where the associating can include generating a combined gift card data entry in the data store for the combined gift card that associates the first gift card component with the second gift card component, and transmitting, based on the validating and associating, confirmation that the combined gift card has been activated for use in the retail environment.

The system can optionally include one or more of the following features. For example, when combined, the first gift card component can include a unique identifier for the combined gift card and the second gift card component can include an access code for the combined gift card, the combined gift card data entry generated in the data store for the combined gift card can provide an association between the unique identifier and the access code for the combined gift card, and the association provided by the combined gift card data entry can be configured to be referenced to validate the combined gift card during a subsequent redemption process. The second identifier for the second gift card component can be different from the access code included on the second gift card component. The combined gift card data entry can include the unique identifier and the access code for the combined gift card. The data store can include a second gift card component data entry that associates the second identifier for the second gift card component with the access code for the second gift card component, the second gift card component data entry can be accessed (i) to validate the second gift card component based on the received second identifier and (ii) to retrieve the access code for the second gift card component based on the received second identifier for use generating the combined gift card data entry. The first identifier for the first gift card component can be the unique identifier for the combined gift card, and the second identifier can be a unique identifier for the second gift card component that can be different from the access code. The second gift card component further can include a removable material that overlays and covers at least a portion of the access code on the second gift card component so as to make the at least a portion of the access code unviewable, and the removable material can be configured to be removed from the second gift card component, causing the access code to be viewable. The second identifier can be presented on a same side of the second gift card component as the access code and the removable material, and can be viewable and uncovered by the removable material.

Sometimes, the gift card computer system can be further configured to perform a redemption process for the combined gift card, the redemption process including: receiving, over the communication network, data values representing a submitted unique identifier and a submitted access code as part of a redemption request for requested gift card, accessing, using the data store, the association provided by the combined gift card data entry and other associations for other combined gift cards provided by other combined gift card data entries, validating the requested gift card as authentic based on the submitted unique identifier and the submitted access code being associated with each other in the association or the other associations provided by the combined gift card data entry and the other combined gift card data entries, and returning, based on validating the requested gift card, confirmation that the requested gift card is authentic. The access code can be concealed by a tamper-proof material provided on the combined gift card, the unique identifier and the second identifier can be viewable and unconcealed on the combined gift card, and the subsequent redemption process can be configured to require submission of the unique identifier and the access code from the combined gift card.

In some implementations, the gift card component data in the data store can include (i) a first data entry for the first gift card component that includes the first identifier and first information identifying whether the first gift card component has already been combined with other gift card components, and (ii) a second data entry for the second gift card component that includes the second identifier and second information identifying whether the second gift card component has already been combined with other gift card components. Validating the first gift card component and the second gift card component can include accessing the first information and the second information to verify that the first gift card component and the second gift card component have not already been combined with other gift card components, and when the combined gift card data entry is generated associating the first gift card component and the second gift card component for the combined gift card, the first information and the second information can be updated to indicate that the first gift card component and the second gift card component have been combined with other gift card components. The first gift card component can include a card and the second gift card component can be configured to be physically attached to the card. The second gift card component can include a label with a first side and a second side, the first side of the label including adhesive material configured for physical attaching the second gift card component to the card, and the second side of the label including the second identifier. The retail environment can include physical retail stores and online stores associated with one or more retailers.

The system can also include: a group of first gift card components of the first type that each include unique first identifiers, the first gift card component being part of the group of first gift card components and a group of second gift card components of the second type that each include unique second identifiers, the second gift card component being part of the group of second gift card components. The group of first gift card components can be configured to be retained separate in the retail environment from the group of second gift card components prior to being combined and activated as combined gift cards, and each of the group of first gift card components can be configured to be combinable with any of the group of second card components to form combined gift cards. In some implementations, the system can also include: a point of sale (POS) terminal in network communication with the gift card computer system, the POS terminal being configured to: scan, using a scanning device at the POS terminal, the first identifier and the second identifier of the combined gift card, transmit, to the gift card computer system, the scanned first and second identifiers for the combined gift card, receive, from the gift card computer system, the confirmation that the combined gift card has been activated for use in the retail environment, and complete, based on the confirmation, a checkout process to purchase the combined gift card.

One or more embodiments described herein can include: a secure gift card having a first gift card component of a first type, the first gift card component including a first identifier and a second gift card component of a second type that is different from the first type, the second gift card component including a second identifier. The first gift card component and the second gift card component can be configured to be retained separately and to be physically combined at or around a time of activation to form a combined gift card that is usable in a retail environment.

The secure gift card can optionally include one or more of the following features. For example, when combined, the first gift card component can include a unique identifier for the combined gift card and the second gift card component can include an access code for the combined gift card. The second identifier for the second gift card component can be different from the access code included on the second gift card component. The second gift card component further can include a removable material that overlays and covers at least a portion of the access code on the second gift card component so as to make the at least a portion of the access code unviewable, and the removable material can be configured to be removed from the second gift card component, causing the access code to be viewable. The first gift card component can include a card and the second gift card component can be configured to be physically attached to the card. The second gift card component can include a label with a first side and a second side, the first side of the label can include adhesive material that can be configured for physical attaching the second gift card component to the first gift card component, and the second side of the label can include the second identifier. The second side further can include an access code concealed by a tamper-proof material provided on a portion of the second side.

One or more embodiments described herein can include a system for assembling a secure gift card, the system including: a gift card computer system that can be configured to perform an activation process for a combined gift card to be used in a retail environment, the activation process including: receiving, over a communication network, a first identifier for a first gift card component and a second identifier for a second gift card component of the combined gift card, validating that the first gift card component and the second gift card component are available for use in the combined gift card based on a comparison of the received first identifier and the received second identifier against gift card component data in a data store, associating, based on the validating, the first gift card component and the second gift card component for the combined gift card in the data store, where the associating can include generating a combined gift card data entry in the data store for the combined gift card that associates the first gift card component with the second gift card component, and transmitting, based on the validating and associating, confirmation that the combined gift card has been activated for use in the retail environment.

The system can optionally include one or more of the following features. For example, the first gift card component and the second gift card component can be configured to be retained separately and to be physically combined at or around a time of activation to form the combined gift card that is usable in the retail environment. When combined, the first gift card component can include a unique identifier for the combined gift card and the second gift card component can include an access code for the combined gift card, the combined gift card data entry generated in the data store for the combined gift card can provide an association between the unique identifier and the access code for the combined gift card, and the association provided by the combined gift card data entry can be configured to be referenced to validate the combined gift card during a subsequent redemption process. The data store can include a second gift card component data entry that can associate the second identifier for the second gift card component with the access code for the second gift card component, and the second gift card component data entry can be accessed (i) to validate the second gift card component based on the received second identifier and (ii) to retrieve the access code for the second gift card component based on the received second identifier for use generating the combined gift card data entry. The second gift card component further can include a removable material that overlays and covers at least a portion of the access code on the second gift card component so as to make the at least a portion of the access code unviewable, and the removable material can be configured to be removed from the second gift card component, causing the access code to be viewable.

One or more embodiments described herein can include a system for assembling a secure gift card for purchase and use in a retail environment, the system can include: a first gift card component of a first type, the first gift card component including a first identifier, a second gift card component of a second type that can be different from the first type, the second gift card component being separate from the first gift card component and including a second identifier, and the second gift card component can be configured to be permanently attached to the first gift card component to form a combined gift card that is purchasable during a checkout process. The system can also include a point of sale (POS) terminal that can be configured to process purchase and activation of the combined gift card, and a computer system in network communication with the POS terminal and that can be configured to validate the combined gift card based on the checkout process being performed at the POS terminal to purchase and activate the combined gift card. The POS terminal can be configured to perform operations that may include: scanning, using a scanning device at the POS terminal, a combined identifier for the combined gift card, the combined identifier including at least one of the first identifier or the second identifier, transmitting, to the computer system, a request to validate the combined gift card, the request including the scanned combined identifier, receiving, from the computer system, card validation information indicating that the combined gift card is approved for purchase during the checkout process, the computer system being configured to generate the card validation information by (i) validating the scanned combined identifier against combined gift card associations in a data store, and (ii) generating a data entry in the data store that associates the unique identifiers for the first gift card component and the second gift card component of the combined gift card with each other, activating, based on the card validation information, the combined gift card, and completing, based on the activation and the card validation information, the checkout process.

In some implementations, the embodiments described herein can optionally include one or more of the following features. The second gift card component can be an envelope component that can be configured to be a similar size and a similar shape as the first gift card component. The second gift card component can be configured to receive the first gift card component within an enclosure that can be defined by sides of the second gift card component. The second gift card component can include a transparent window, and a portion of the first gift card component can be visible through the transparent window when positioning the first gift card component within the enclosure of the second gift card component. The portion of the first gift card component that may be visible through the transparent window can include the first identifier for the first gift card component. The first gift card component can include at least one adhesive on at least one surface of the first gift card component, the at least one adhesive being configured to permanently affix the first gift card component to the second gift card component when the first gift card component and the second gift card component are aligned with each other.

In some implementations, the second gift card component can include at least one adhesive on at least one surface of the second gift card component, the at least one adhesive being configured to permanently affix the second gift card component to the first gift card component when the second gift card component and the first gift card component are aligned with each other. The second gift card component can include a film that can be configured to permanently affix to a surface of the first gift card component, the film being a partially transparent material and the surface of the first gift card component being visible through the partially transparent material of the film. The film can include the second identifier, and the first identifier of the first gift card component and the second identifier can be visible and scannable at a same or similar time during the checkout process when the film is permanently affixed to the surface of the first gift card component.

As another example, the second gift card component can include the second identifier and at least one of text, graphics, or a design on one or more surfaces of the second gift card component, and the first gift card component can include the first identifier. The second gift card component can include a portion that wraps around at least one edge of the first gift card component when permanently affixed to each other, the portion of the second gift card component including at least one adhesive to permanently affix the second gift card component to the first gift card component. The second gift card component can include a visual indicator indicating a position for which to align the first identifier of the first gift card component with the second identifier of the second gift card component when the first gift card component is positioned inside an enclosure defined by the second gift card component. The visual indicator can be proximate the second identifier of the second gift card component, and aligning the first identifier of the first gift card component with the visual indicator may cause the second identifier of the second gift card component and the first identifier of the first gift card component to be scanned as the combined identifier for the combined gift card. The first gift card component can include a visual indicator that can be configured to be covered by the second gift card component when the first gift card component and the second gift card component are permanently affixed to each other in a correct assembly. The visual indicator can be at least partially visible when the first gift card component and the second gift card component are permanently affixed to each other in an incorrect assembly.

In some implementations, the first gift card component and the second gift card component can be permanently affixed to each other in a correct assembly when the first identifier of the first gift card component is scannable by the scanning device. The first gift card component and the second gift card component can be permanently affixed to each other in an incorrect assembly when the first identifier of the first gift card component may be at least partially obstructed from being scanned by the scanning device. Sometimes, validating the scanned combined identifier may include determining that the first gift card component is not associated with another combined gift card. Determining that the first gift card component is not associated with another combined gift card can include comparing the scanned at least one unique identifier to unique identifiers of other combined gift cards that can be stored in the data store and that may be identified as (i) potentially compromised or (ii) already purchased. Determining that the first gift card component is not associated with another combined gift card can include identifying the scanned combined identifier as a unique identifier of the gift card components that may be identified, in the data store, as unpurchased in the retail environment.

In yet some implementations, the request may include a public encryption key associated with the combined gift card and the operations further can include: receiving, from the computer system and in response to the computer system (i) generating at least one of the first or second identifiers and (ii) encrypting the at least one of the first or second identifiers using the public key, the encrypted at least one of the first or second identifiers, decrypting, using a private key associated with the public encryption key, the encrypted at least one of the first or second identifiers, and activating the combined gift card using the decrypted at least one of the first or second identifiers. The computer system can also encrypt the card validation information by: decrypting the card validation information using the private key associated with the public encryption key and activating the combined gift card using the decrypted card validation information.

The system can also include a printing device that can be configured to print identifying information on labels, the labels being permanently affixed to the combined gift card. The printing device can be configured to receive and execute instructions for printing the card validation information onto a label that can be permanently affixed to the combined gift card, the printed card validation information including a card access code. The POS terminal can include the printing device. The printing device can be a mobile printing device that can be configured to establish an encrypted connection with the POS terminal in response to scanning at least one of the first identifier or the second identifier. The printing device can be configured to print the identifying information onto a surface of at least one of the first gift card component or the second gift card component.

In some implementations, the first identifier or the second identifier can include a pointer that, when scanned, causes the POS terminal to (i) access the computer system and (ii) retrieve, based on the pointer, identifying information associated with the first identifier or the second identifier, respectively. The computer system can also: generate instructions for printing the identifying information onto a label or a portion of at least one of the first gift card component or the second gift card component, and transmit the instructions to a printing device. The printing device can be configured to automatically execute the instructions to print the identifying information onto the label or the portion of at least one of the first gift card component or the second gift card component during the checkout process. The first gift card component and the second gift card component can be removably attached to a retention apparatus of a display at a retail environment. The first gift card component can be removably attached to a retention apparatus of a display in a retail environment and the second gift card component can be dispensed from a unidirectional retention apparatus in a checkout area of the retail environment.

Sometimes, completing the checkout process can include generating and returning a notification to the POS terminal instructing a guest purchasing the combined gift card to (i) re-attach the first gift card component and the second gift card component to each other and (ii) rescan the combined identifier. Completing the checkout process can include generating and returning a notification to the POS terminal instructing a guest purchasing the combined gift card to (i) attach the first gift card component to another second gift card component and (ii) rescan the combined identifier. Completing the checkout process can include generating and returning a notification to the POS terminal instructing a guest purchasing the combined gift card to (i) attach another first gift card component to the second gift card component and (ii) rescan the combined identifier. Completing the checkout process can include generating and returning a notification to the POS terminal instructing a guest purchasing the combined gift card to (i) replace the first gift card component and the second gift card component with another first gift card component and another second gift card component and (ii) scan another identifier for at least one of the another first gift card component or the another second gift card component.

The system may also include a card and envelope retention apparatus to retain the first and second gift card components that are separate from each other when retained by the card and envelope retention apparatus. Scanning the combined identifier for the combined gift card can include scanning both the first identifier and the second identifier. Scanning the combined identifier can include scanning the first identifier. Scanning the combined identifier can include scanning the second identifier. The data entry that associates the unique identifiers for the first gift card component and the second gift card component may include a unique value that includes the first identifier and the second identifier.

One or more embodiments described herein can include a gift card having: a first gift card component of a first type, the first gift card component including a first identifier, and a second gift card component of a second type that can be different from the first type, the second gift card component being separate from the first gift card component and including a second identifier. The second gift card component can be configured to be permanently attached to the first gift card component during a checkout process to form a combined gift card.

The gift card can optionally include one or more of the following features. For example, the second gift card component can be an envelope or sleeve that can be configured to be a similar size and a similar shape as the first gift card component. The second gift card component can be configured to receive the first gift card component within an enclosure that can be defined by at least one side of the second gift card component. The second gift card component can include a transparent window, and a portion of the first gift card component can be visible through the transparent window when positioning the first gift card component within the enclosure of the second gift card component. The first gift card component can include at least one adhesive on at least one surface of the first gift card component, the at least one adhesive being configured to permanently affix the first gift card component to the second gift card component when the first gift card component and the second gift card component are aligned with each other. Sometimes, the second gift card component can include at least one adhesive on at least one surface of the second gift card component, the at least one adhesive being configured to permanently affix the second gift card component to the first gift card component when the second gift card component and the first gift card component are aligned with each other. The second gift card component may include a film that can be configured to permanently affix to a surface of the first gift card component, the film being a partially transparent material and the surface of the first gift card component being visible through the partially transparent material of the film.

In some implementations, the second gift card component can include the second identifier, and the first gift card component can include the first identifier. The second gift card component can include a portion that wraps around at least one edge of the first gift card component when permanently affixed to each other, the portion of the second gift card component including at least one adhesive to permanently affix the second gift card component to the first gift card component.

One or more embodiments described herein can include a gift card with a sleeve component having: a front surface, a back surface opposite the front surface, a first opening that can extend through the front surface and the back surface of the sleeve component, and a second opening along an edge of the sleeve component, the second opening defining an enclosure within the sleeve component to receive a gift card component. The gift card can also include a gift card component having a front surface and a back surface, and the sleeve component can be configured to receive the gift card component during a checkout process to form a combined gift card.

The gift card can optionally include one or more of the following features. For example, the gift card component further can include a value of the combined gift card printed onto the front surface of the gift card component. When the gift card component is received in the sleeve component, the value can be configured to be visible through the first opening that extends through the front surface and the back surface of the sleeve component. At least one of the front surface or the back surface of the gift card component can include instructions for guiding a guest during the checkout process to assemble the gift card component with the sleeve component. The back surface of the gift card component can include an identifier that can be configured to be scannable by a scanning device during the checkout process to identify at least one of the gift card component or the combined gift card, the identifier being visible through the opening that can extend through the front surface and the back surface of the sleeve component when the gift card component is assembled with the sleeve component. The identifier can be a barcode. The identifier can include a card number. The identifier can include an access number.

Sometimes, the sleeve component further can include a tab that may extend from the edge of the sleeve component. When the gift card component is received in the sleeve component, the tab can be configured to fold over the edge, attach to a portion of the back surface of the sleeve component, and permanently secure the gift card component inside the sleeve component. The sleeve component further can include an identifier printed onto the back surface. The identifier may include a barcode. The barcode can include a pointer to a stored value that identifies at least one of the sleeve component or the combined gift card. The identifier can include a card number. The identifier can include a first identifier and a second identifier, the first identifier being a barcode and the second identifier being a card number.

In some implementations, the front surface of the gift card component can include artwork that can be configured to be visible through the opening that extends through the front surface and the back surface of the sleeve component when the gift card component is assembled with the sleeve component. The back surface of the sleeve component can include an access code and a removable material that can be configured to cover the access code. The removable material can include a scratch-off film.

One or more embodiments described herein can include a gift card having a sleeve component including: a front surface, a back surface opposite the front surface, a first opening that can extend through the front surface of the sleeve component, a second opening that can extend through the back surface of the sleeve component, the first opening being sized larger than the second opening, and a third opening along an edge of the sleeve component, the third opening defining an enclosure within the sleeve component that can be configured to receive a gift card component, and a gift card component including a front surface and a back surface, the sleeve component being configured to receive the gift card component during a checkout process to form a combined gift card.

The gift card can optionally include one or more of the following features. For example, the front surface of the gift card component can include graphics that, when the gift card component is received within the enclosure of the sleeve component, may be visible through the first opening extending through the front surface of the sleeve component. The back surface of the gift card component can include identifying information that, when the gift card component is received within the enclosure of the sleeve component, can be visible through the second opening extending through the back surface of the sleeve component. The gift card can also include a scratch-off material that can be configured to overlay a portion of the identifying information and obscure the portion of the identifying information from visibility until the scratch-off material is physically removed from the gift card component.

One or more embodiments described herein can include a system for securely printing card access information during a checkout process in a retail environment, the system including: a POS terminal to perform a checkout process in a retail environment, a printing device in network communication with the POS terminal to execute instructions to print card access information for a gift card that is purchased during the checkout process, and a backend computer system in network communication with at least one of the POS terminal or the printing device, the backend computer system being configured to validate gift cards that are purchased during checkout processes in the retail environment. The POS terminal can perform operations that may include: scanning, using a scanning device, an identifier for the gift card, receiving, in response to scanning the identifier for the gift card, user input indicating login credentials for a team member working in the retail environment, verifying the login credentials based on the user input, scanning, using the scanning device and in response to verifying the login credentials, an identifier for the printing device, establishing an encrypted connection between the POS terminal and the printing device based on the identifier for the printing device, obtaining, from the backend computer system, card access information that can be stored in association with the identifier for the gift card, generating, based on the obtained card access information, instructions for printing the card access information for the gift card, and transmitting, by the encrypted connection to the printing device, the instructions for printing the card access information for the gift card. The printing device can automatically execute the instructions to print the card access information, and in response to printing the card access information by the printing device, the POS terminal can complete the checkout process for the gift card.

The system can optionally include one or more of the following features. The printing device can print the card access information onto a label, the label being permanently affixed to a surface of the gift card during the checkout process and before the POS terminal completes the checkout process for the gift card. The printing device can receive the gift card and print the card access information onto a portion of the received gift card before the POS terminal completes the checkout process for the gift card. The gift card can include a first component and a second component that can be configured to be permanently affixed to each other during the checkout process. The identifier for the gift card may include a barcode printed on the first component. The identifier for the gift card may include a barcode printed on the second component. The identifier for the gift card may include a combination of an identifier printed on the first component and an identifier printed on the second component.

One or more embodiments described herein can include a system for generating a gift card during a checkout process, the system including: a POS terminal that can be configured to perform a checkout process in a retail environment, and a printing device in network communication with the POS terminal, the printing device being configured to print information in response to performing the checkout process. The POS terminal can: receive user input indicating a purchase of a gift card, perform a checkout process to complete the purchase of the gift card, generate instructions to print a receipt for completing the purchase of the gift card, and transmit the instructions to print the receipt to the printing device. The printing device can: receive the instructions to print the receipt, and print the receipt based on automatically executing the instructions. The receipt can include a gift card portion that can be removable from the receipt, the gift card portion being configured to be removed from the receipt and inserted into an envelope component during the checkout process. The envelope component can include: a front surface having an opening, a back surface opposite the front surface, and a partially transparent material that can be configured to extend over at least the opening of the front surface of the envelope component. When the gift card portion is inserted into the envelope component, identifying information printed onto a front surface of the gift card portion can be visible through the opening of the front surface of the envelope component, and the envelope component can be configured to seal around the gift card portion to permanently retain the gift card portion therein.

The system can optionally include one or more of the following features. The user input can include scanning an identifier for the gift card. The identifying information printed onto the front surface of the gift card portion can include at least one of a card number, an access code, a barcode, or a value of the gift card. The gift card can include the gift card portion sealed within the envelope component.

One or more embodiments described herein can include a system for securely printing card access information during a checkout process in a retail environment, the system including: a POS terminal that can be configured to perform a checkout process in a retail environment, the POS terminal being configured to establish a connection with a printing device to print card access information for a gift card that is purchased during the checkout process. The POS terminal can be configured to perform operations that include: scanning, using a scanning device, an identifier for the gift card, obtaining, from a backend computer system, card access information that can be stored in association with the identifier for the gift card in a data store, generating, based on the obtained card access information, printing instructions for printing the card access information for the gift card, the printing instructions, when executed, causing the printing device to print at least a card access code, and transmitting, by the connection to the printing device, the instructions for printing at least the card access code for the gift card.

The system can optionally include one or more of the following features. The connection can be a network connection, the network connection being at least one of an Ethernet connection, a WIFI connection, or a BLUETOOTH connection. The connection can include a cabled connection. The cabled connection can include a USB wired connection. The identifier for the gift card can include a barcode printed onto a surface of the gift card. The printing instructions, when executed, may cause the printing device to print the card access code onto a label, the label being configured to be permanently affixed to the gift card. The printing instructions, when executed, may cause the printing device to further print a card value, a card number, and a barcode onto the label. The card number printed onto the label can be configured to be associated with the identifier for the gift card, the card number being embedded into the identifier for the gift card. The printing instructions, when executed, may cause the printing device to further print at least one of a card value, a card number, or a barcode onto the label. The printing instructions, when executed, may cause the printing device to print the card access code onto a back surface of the gift card.

The operations can also include: receiving an indication that the printing device executed the instructions to print at least the card access code, scanning, using the scanning device, the printed card access code, and verifying that the scanned card access code is associated with the card access information corresponding to the scanned identifier for the gift card. The operations can include: in response to verifying the scanned card access code, receiving payment for a card value to be added to the gift card, completing the checkout process based on applying the card value to the gift card in response to receiving the payment, and activating the gift card. The operations may include; receiving, in response to scanning the identifier for the gift card, user input indicating login credentials for a team member working in the retail environment, verifying the login credentials based on the user input, scanning, using the scanning device and in response to verifying the login credentials, an identifier for the printing device, establishing the connection between the POS terminal and the printing device, and in response to establishing the connection, generating the printing instructions.

One or more embodiments described herein can include a gift card including: a first component having a designated area on a surface of the first component, the designated area being sized and shaped to receive a second component, and a second component that can be configured to be aligned within the designated area and affixed to the surface of the first component during a checkout process. The second component may include: a portion made of a transparent material, and an identifier printed on the portion made of the transparent material with ink having a color that can correspond to a color of a material used for printing the second component. The identifier printed on the portion made of the transparent material may only be visible when the second component is removed from the material used for printing the second component and affixed to the surface of the first component during the checkout process.

The gift card can optionally include one or more of the following features. For example, the surface of the first component can include a color that can contrast the ink used for printing the identifier on the portion made of the transparent material of the second component so that the identifier may be visible when the second component is affixed to the surface of the first component. The identifier can include a barcode and printing the identifier on the portion made of the transparent material can include printing bars of the barcode with the ink on the portion made of the transparent material. The identifier can include a barcode and printing the identifier on the portion made of the transparent material can include printing spaces between bars of the barcode with the ink on the portion made of the transparent material, where the bars of the barcode may not be printed on the portion made of the transparent material.

As another example, the material used for printing the second component can include a color that can be the same as the color of the ink used for printing the identifier on the portion made of the transparent material so that the identifier can remain invisible when the second component is affixed to the material used for printing the second component. The designated area can include a portion having a color that can be different than a color of the designated area, the color of the portion of the designated area being configured to contrast the ink used for printing the identifier on the portion made of the transparent material of the second component.

The second component can include a second portion made of an opaque material, the second portion made of the opaque material including a color that can be the same as a color of the surface of the first component. The second component further can include identifying information printed on the second portion made of the opaque material, the identifying information being printed on the second portion with ink that can contrast the color of the second portion. The second component further can include a scratch off material applied to the second portion made of the opaque material, the scratch off material being configured to overlay the identifying information and keep the identifying information hidden from view until the scratch off material can be removed from the second component. The scratch off material can also be removed from the second component by a user, where removing the scratch off material can include scratching off the scratch off material using a coin. In some implementations, the second component can be a label.

The devices, system, and techniques described herein may provide one or more of the following advantages. For example, the disclosed technology can limit or otherwise prevent an ability of users to steal or otherwise compromise gift card PINs and subsequently drain card funds upon activation of those cards. A customer must attach two separate components, a gift card and an envelope, to each other before a checkout process, where each of the components has identifying information. The components are attached to each other in such a way that the identifying information for both components can be identifiable and scannable at checkout to verify and activate the gift card. The required attachment of components and combined scanning of identifying information can limit or otherwise prevent malicious users from compromising gift card information and draining associated funds, thereby ensuring increased security of the gift card information and gift cards more generally in retail environments.

The disclosed technology can improve customer experiences with the retail environment for the reasons mentioned above. The customer experiences can also be improved since a customer can customize how their gift card appears based on selection of a uniquely decorated envelope. The customer can select a generic gift card from a retail display, the card having a barcode and designated funds amount, and a uniquely decorated envelope from the display, the envelope being decorated for a particular holiday and/or occasion. As another example, data encryption techniques can be used to ensure that identifying information for gift cards may not be intercepted during transmission between different system components (e.g., POS terminals, remote computer systems, team member computing devices).

The details of one or more implementations are set forth in the accompanying drawings and the description below. Other features and advantages will be apparent from the description and drawings, and from the claims.

BRIEF DESCRIPTION OF THE DRAWINGS

FIG. 5C is a conceptual diagram of a process for printing card access information onto a label for a gift card component during a checkout process.

FIGS. 9A and 9B are conceptual diagrams of a process for using a gift card receipt as part of a combined gift card.

Figure 1A:
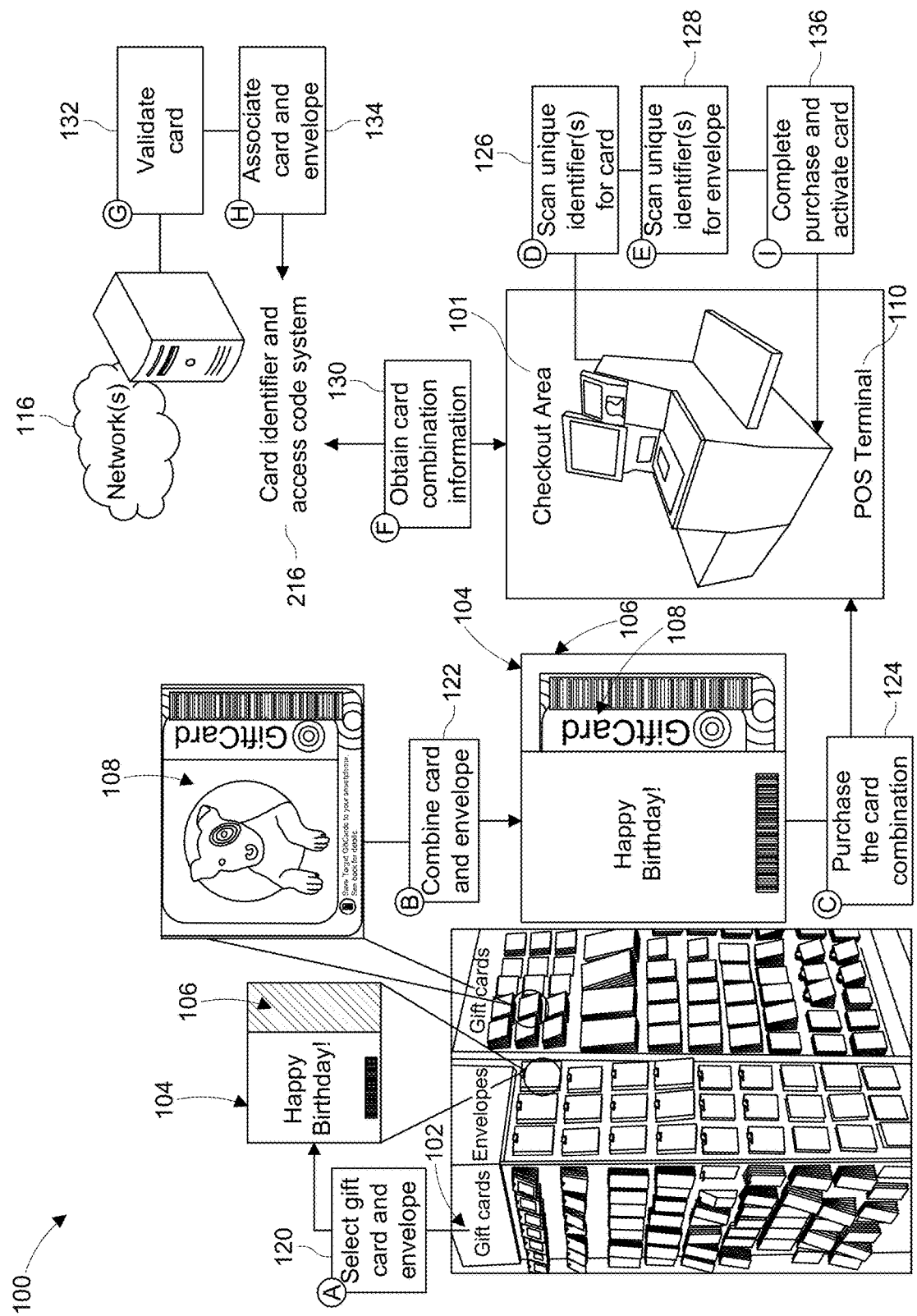
FIGS. 1A and 1B are conceptual diagrams of a system for purchasing and activating a physical gift card component affixed to an envelope component using the disclosed techniques.

In the present disclosure, like-numbered components of various embodiments generally have similar features when those components are of a similar nature and/or serve a similar purpose, unless otherwise noted or otherwise understood by a person skilled in the art.

DETAILED DESCRIPTION OF ILLUSTRATIVE EMBODIMENTS

This disclosure generally relates to systems, methods, apparatus, and techniques for combinable gift card components (e.g., decoupled gift card components) that are configured to be assembled at or during a checkout process in a retail environment. For example, the disclosure provides for attaching uniquely identified physical gift card components with envelope components (e.g., wrappers, stickers, sleeves, folds) during a checkout process in a retail environment, such as a store, to validate and activate the gift cards for usage. The terms envelope and sleeve may be used interchangeably throughout this document. More particularly, the disclosed technology provides a physical implementation for affixing physical gift cards with envelopes, each having identifying information. The identifying information can be scanned during the checkout process to verify the gift card and the envelope, associate the card and envelope with each other, and validate the combined gift card and envelope for activation and usage.

Traditionally, a gift card can include a PIN that is covered with a protective film but otherwise identifiable/locatable on the card. A user may scratch off the protective film to view the PIN, which allows the user to make purchases with the gift card as a form of payment. Some malicious users have begun taking gift cards off the shelves before the gift cards are purchased and activated, and going to an offsite location where the malicious users remove the protective films, recording the PINs in association with the gift card numbers (or other combinations of identifying information that is pre-generated on the gift cards) into a system, reapplying the protective films, and then put the gift cards back on the shelves in the retail store. The intention of this scheme is to make the protective film or other tamper-proof material that has been reapplied to the cards appear authentic and original so that other, legitimate users within the store proceed to purchase the cards using the processes described above. While these recorded and compromised gift cards are on the shelves, the malicious users are polling online gift card systems using the recorded gift card number and PIN numbers (or other unique identifiers) until they are purchased and activated by the legitimate users, at which point the online gift card systems return a positive response to the polling queries by the malicious users. Once a positive response is received, the malicious users transfer and/or use the stored value associated with the gift cards to another account-effectively draining the stored value associated with the gifts cards without the knowledge of the legitimate user. Then, the purchasing users (and/or other users receiving the gift cards) cannot utilize the gift cards because the bad actors who scratched off the protective films and recorded the PINs have already drained the funds from the now-activated gift cards using the previously-recorded identifying information (e.g., combination of gift card numbers and PINs).

The disclosed technology addresses these concerns and other gift card scams by providing a physical implementation of gift card and envelope components (e.g., decoupled components) having respective identifying information (e.g., barcodes, SKUs) that, when affixed to each other, allow for scanning the identifying information to securely activate the gift card. Moreover, the disclosed technology may be applied in a variety of settings and use cases, as described further in reference to U.S. Provisional Patent Application No. 63/626,311 entitled "Gift Card having Coin Reactive Ink and Other Tamperproof Properties," which was filed on Jan. 29, 2024, and is incorporated herein by reference in its entirety, and U.S. Provisional Patent Application No. 63/556,137 entitled "Secure Inserts for Gift Cards," which was filed on Feb. 21, 2024, and is incorporated herein by reference in its entirety.

Referring to the figures, FIG. 1A is a conceptual diagram of a system 100 for purchasing and activating a physical gift card component 108 (e.g., a first type of gift card component) affixed to an envelope component 104 (e.g., a second type of gift card component) using the disclosed techniques. The system 100 provides an illustrative example in which decoupled gift card components can be purchased and activated. The system 100 can be implemented in a retail environment, such as a store. The system 100 can include a gift card and envelope display 102, which may include various different gift cards for purchase, such as the gift card 108, as well as various different envelopes, such as the envelope component 104. The display 102 can be positioned anywhere inside the retail environment. A customer (e.g., user, guest) who wishes to purchase the gift card 108 can remove the gift card 108 from the display 102 and select and remove the corresponding envelope 104 from the display 102.

The system 100 can also include a POS terminal 110 in a checkout area 101. In some implementations, the retail environment can include a plurality of checkout lanes, checkout terminals, and/or checkout stations in the checkout area 101, each checkout location having a respective POS terminal. The checkout area 101 can include checkout locations that are operated by employees, team members, or other relevant users working in the retail environment. Sometimes, the checkout area 101 can include one or more self-checkout stations.

The POS terminal 110 can be configured to perform, process, and complete a checkout process in the checkout area 101. For example, the POS terminal 110 can include one or more scanning devices and/or displays. The POS terminal 110 can be used to scan items for purchase by a customer, present transaction information for the scanned items, receive payment information for the scanned items, and complete the checkout process for the scanned items.

The POS terminal 110 can communicate (e.g., wired, wirelessly) via network(s) 116 with a card identifier and access code system 216. The system 216 can be any type of computing system, network of computing devices, cloud-based computing system, and/or remote computing system. In some implementations, the system 216 can be part of the POS terminal 110. The system 216 can be configured to generate, assign, associate, validate, and/or activate the gift card 108 at the time of purchase, as described further below.

The envelope component 104 can include a window 106, which can be transparent or partially transparent. The envelope 104 can be sized to receive the gift card 108 therein. When the gift card 108 is slid into/placed inside the envelope 104, a portion of the gift card 108 may be visible through the window 106, such as a barcode or other identifying information for the card 108. The envelope component 104 may also have identifying information printed and/or applied onto the envelope 104. As described further below, identifying information on both the envelope 104 and the gift card 108 can be scanned during the checkout process and used to validate and activate the card 108. Refer to at least FIGS. 3A, 3B, 3C, 3D, 3D, 3E, 3F, 3G, 3H, 3I, 4A, 4B, 4C, and/or 4D for additional information about one or more gift card 108 and envelope 104 configurations.

The gift card 108 may include one or more identifying information printed thereon, such as on a front surface and/or a back surface of the card 108. The identifying information can include a barcode, a QR code, a label, an access code, a PIN, etc. In some implementations, the gift card 108 may include a barcode but not an access code or PIN. Rather, the access code and/or the PIN can be retrieved (e.g., by the POS terminal 110 from the card identifier and access code system 216) during the checkout process as part of validating and activating the card 108. In yet some implementations, the barcode can be a pointer to a unique identifier, such as a PIN or access code that is stored by a backend computer system, such as the card identifier and access code system 216. Therefore, the barcode may not be the PIN or access code for the gift card 108.

Still referring to FIG. 1A, a customer can select the gift card 108 and the envelope 104 from the display 102 (block A, 120). The gift card 108 and the envelope 104 can be separate components.

The customer can combine the card 108 and the envelope 104 in block B (122). These separate components (e.g., decoupled gift card components) can therefore be attached/affixed/assembled to each other at time of checkout. The gift card 108 and the envelope 104 can be attached to each other (e.g., by using adhesives, by sliding the card 108 into the envelope 108, by wrapping the envelope 108 around a portion or at least one edge of the card 108 like a skin/sleeve) with the intent of preventing the card 108 and envelope 104 from becoming detached.

The customer can proceed to purchase the combination of the card 108 and the envelope 104 (block C, 124). For example, the customer can bring the combined card 108 and envelope 104 to the POS terminal 110 in the checkout area 101. At the POS terminal 110, the customer (or a team member working in the checkout area 101) can scan at least one unique identifier for the card 108 (e.g., a barcode) (block D, 126). The customer may also scan at least one unique identifier for the envelope 104 (block E, 128). Blocks D and E, 126 and 128 respectively, can be performed in any order. The unique identifiers can be scanned using one or more scanning devices, including but not limited to a scanner, barcode scanner, cameras, imaging devices, handheld scanning device, flatbed scanner, etc.

The POS terminal 110 may transmit the scanned identifiers to the card identifier and access code system 216 to obtain information about this card combination (block F, 130). This communication can be performed securely, using one or more encryption techniques described further in reference to FIG. 2A.

Figure 2A:
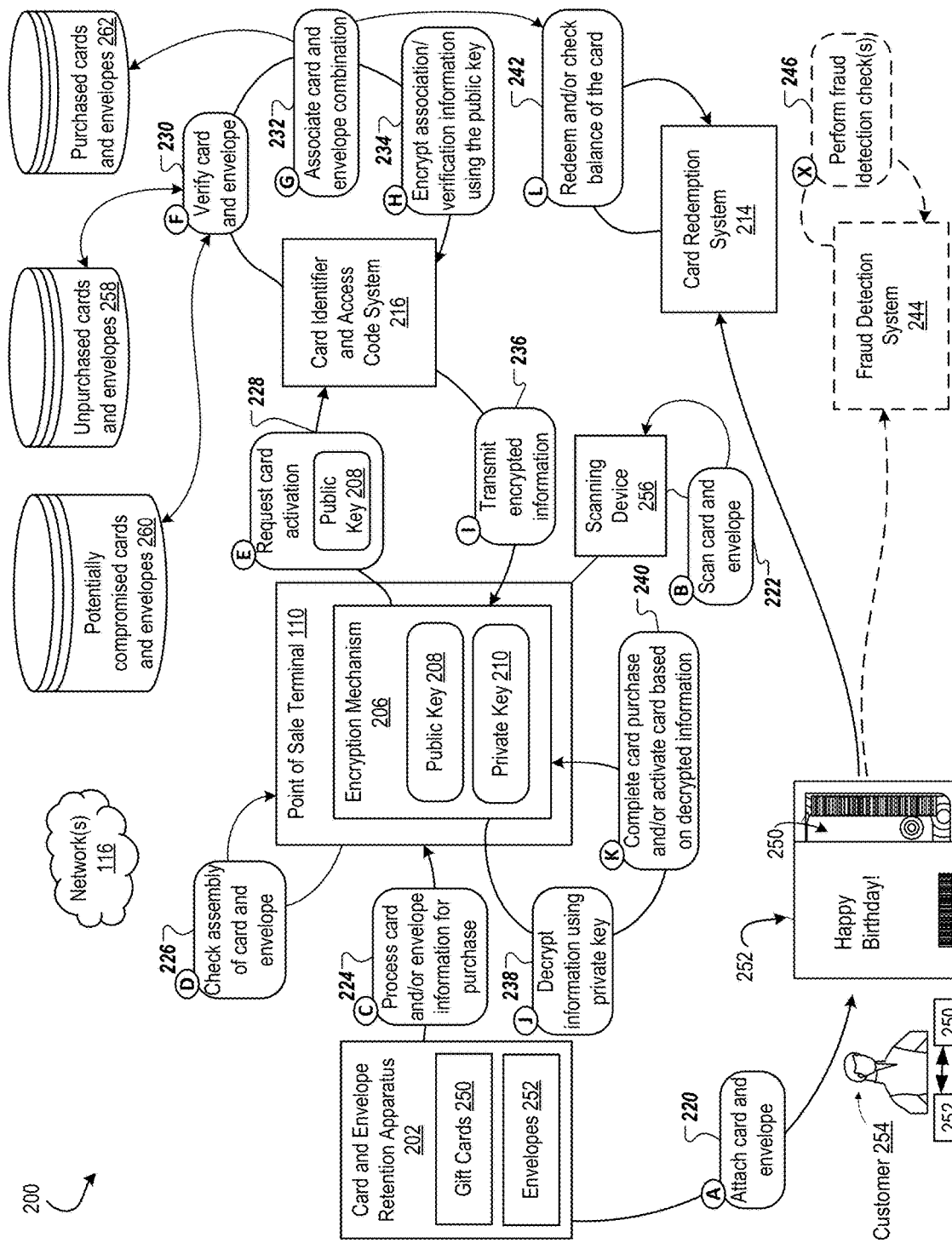
FIG. 2A is a system diagram of one or more system components used for performing the disclosed techniques.

For example, the system 216 may validate the card 108 in block G (132). Validating the card 108 may include checking the scanned identifier for the card 108 against known identifiers for other cards that are available for purchase in the retail environment. The known identifiers for the other cards can be stored in one or more data stores and/or databases described further below. The system 216 can verify that the card 108's identifier is not associated with another gift card (and/or another envelope). The system 216 can verify that the card 108's unique identifier is associated with a gift card that has not yet been activated. Refer to FIG. 2A for further discussion. Sometimes, validating the card 108 may include ensuring whether the card 108's identifier (e.g., a card number) and an access code (e.g., printed onto a label applied to the card 108, printed onto the envelope 104) are associated with the retail environment that is initiating the checkout process. The system 216 can reject a request to activate the card 108 during the checkout process if either the card identifier or the access code is associated with a different retail environment, which may indicate potential malicious activity, tampering, and/or counterfeiting.

Once the card 108 is validated, the system 216 may associate the card 108 and the envelope 104 in block H (134). Associating the card 108 and the envelope 104 can include storing their corresponding unique identifiers in association in one or more data stores described herein. As a result, both the unique identifiers may be used and/or required to activate and use the combined card 108 and envelope 104.

In some implementations, the unique identifiers of the card 108 and the envelope 104 may already be associated. The system 216 can check the received card combination information against known associations in the data store(s) to validate that the card 108 is paired with the correct envelope 104. In such a scenario, each gift card may have a unique identifier. Each envelope may have a general identifier, which may be linked to a plurality of similar or same types of cards.

For example, a $50 gift card can have an identifier ABCD, a $25 gift card can have an identifier EFG, a $100 gift card can have an identifier HIJ, and a plurality of envelopes that say "happy birthday" on them can have a same identifier 1234. The plurality of envelopes may be associated with both the $50 gift card having the identifier ABCD and the $100 gift card having the identifier HIJ, which means that so long as the customer pairs/combines any of the plurality of envelopes with the $50 gift card or the $100 gift card, the gift card combination is valid. On the other hand, if the customer tries combining the $25 gift card with any one of the plurality of envelopes, the system 216 may determine that this combination is not valid and thus prevent the customer from being able to complete the purchase. Instead, the POS terminal 110 can present a notification to the customer prompting them to retrieve a different envelope (such as an envelope that is already associated with the $25 gift card having the unique identifier EFG.

After associating the card 108 and the envelope 104, the card combination information (e.g., the association between unique identifiers) can be transmitted back to the POS terminal 110 (block F, 130).

In some implementations, the system 216 may generate identifying information for the gift card 108, such as a card number and/or a PIN in blocks G and/or H (132 and/or 134, respectively). Sometimes, the system 216 can generate and assign both the card number and the PIN to the card 108. Sometimes, the system 216 may generate and assign only one of the card number and the PIN to the card 108. By generating and assigning only one of the card number and the PIN, the card 108 balance may remain secured if communication between the system 216 and/or the POS terminal 110 is compromised. The generated card number and/or the PIN can be transmitted securely back to the POS terminal 110 as part of the card combination information (block F, 130).

Using the card combination information, the POS terminal 110 can complete the purchase of the combined card 108 and envelope 104 and activate the card 108 (block I, 136). The POS terminal 110 can initiate and complete the purchase of the card 108 once the card 108 is attached to the envelope 104. The gift card 108 can be added to a transaction for the customer, which may be displayed in a display screen and/or graphical user interface (GUI) display at the POS terminal 110 (or at a mobile device of the customer). The customer purchasing the gift card 108 at the POS terminal 110 can provide a form of payment, which can be processed by the POS terminal 110 to complete the card purchase, apply funds to the card 108, and activate the card 108. Sometimes, if a payment confirmation is never received for the card 108, then if that same card 108 is attempted to be activated at a later time, the system 216 or one or more other systems described herein can flag the card 108 as an invalid card for issuance. This is because the access code for the card 108 may have previously been exposed.

Figure 1B:
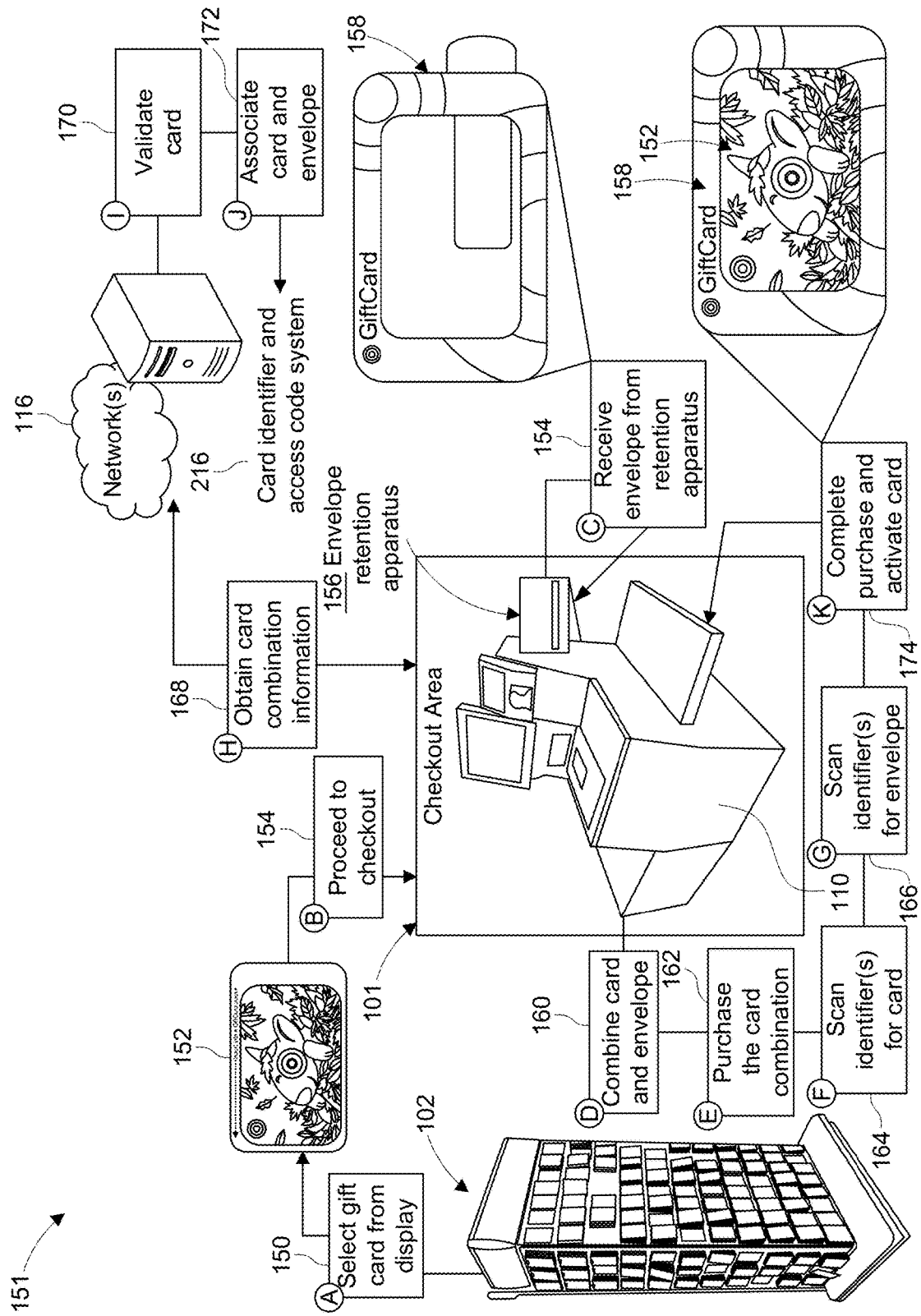

FIG. 1B is another example of the system 151 for selecting and purchasing gift card components (e.g., decoupled gift card components) in a retail environment. In the example system 100 of FIG. 1A, gift card and envelope components are shown as being selected from a same or similar display in the retail environment, then being brought to a checkout area in the retail environment. In the example system 151 of FIG. 1B, on the other hand, a guest can select the gift card component from a display in the retail environment and then receive or select an envelope component from a retention apparatus in the checkout area. The retention apparatus, as described herein, can be a locked dispenser permitting removal of an envelope component but preventing reinsertion of the envelope component. In the illustrative system 151 of FIG. 1B, gift card components having PINs, access codes, or other identifying information can be selected by and readily accessible to guests, while the envelope components can be restricted and accessible at or near checkout. The envelope components may, in some implementations, include identifying information, including but not limited to a card number, PIN, access code, etc.

As shown in FIG. 1B, the system 100 can include the display 102 and the checkout area 101. Gift card components (e.g., decoupled gift card components), such as a gift card component 152, can be available at the display 102 for selection by a guest in the retail environment. Refer to FIG. 1A for further discussion about putting the gift card components on display at the display 102.

A guest in the retail environment can select the gift card component 152 from the display in block A (150). As illustrated, the gift card component 152 can include artwork. The gift card component 152 can additionally or alternatively include additional features, graphics, artwork, and/or text printed thereon, including but not limited to instructions for how to attach the gift card component 152 to an envelope component, information indicating a value associated with the gift card component 152, etc.

The guest can proceed to checkout with the gift card component 152 in the checkout area 101 (block B, 154).

In the checkout area 101, the guest can receive an envelope component 158 from an envelope retention apparatus 156 (block C, 154). The retention apparatus 156 can be located at a self-checkout lane and/or at a checkout lane that is operated and/or assisted by a team member in the retail environment. As described above, the retention apparatus 156 can include a locking mechanism such that one envelope component 158 can be dispensed at a time but the envelope component 158 may not be reinserted back into the retention apparatus 156. In some implementations, the envelope component 158 can be automatically dispensed from the retention apparatus 156 in response to the guest scanning an identifier of the gift card component 152.

Sometimes, the guest can simply remove or pull the envelope component 158 out from the retention apparatus 156 without first scanning any identifiers of the gift card component 152. In yet some implementations, the guest may only receive the envelope component 158 from the retention apparatus 156 in response to a team member meeting the guest in the checkout area 101 and removing the envelope component 158 from the retention apparatus 165 for the guest (e.g., the team member provides their employee ID, a code, or other information to a POS terminal that authorizes the dispensing of the envelope component 158 from the retention apparatus 156.

Once the guest receives the envelope component 158 in block C (154), the guest can combine the gift card component 152 with the envelope component 158 in block D (160). The guest can combine the gift card component 152 with the envelope component 158 as described throughout this disclosure. For example, refer to FIGS. 3A, 3B, 3C, 3D, 3E, 3F, 3G, 3H, and 3I for further discussion about different combinations of the gift card component 152 with the envelope component 158.

The guest can begin a process to purchase the card combination (block E, 162). For example, the guest can scan one or more identifiers for the gift card component 152 (block F, 164). Additionally or alternatively, the guest can scan one or more identifiers for the envelope component 158 (block G, 166). Blocks F and G can be performed in any order and/or at the same time. Refer to FIG. 1A for further discussion.

The POS terminal 110 can obtain card combination information from the card identifier and access code system 216, as described in reference to FIG. 1A (block H, 168). In some implementations, identifying information on the gift card component 152 (and/or the envelope component 158) can be similar to a public access key. This key can be scanned and used by the POS terminal 110 to generate a private key in association with the scanned component(s). The private key can include an access code that can be used to complete the checkout process and activate the gift card combination. The private key and the public key may not be accessible until the gift card component 152 is scanned and purchased at the POS terminal 110.

As described in reference to FIG. 1A, the card identifier and access code system 216 can validate the card combination (block I, 170) and associate the gift card component 152 with the envelope component 158 (block J, 172). The system 216 can provide the card combination information back to the POS terminal 110 in the checkout area 101. The guest can complete purchasing and activating the card combination in block K (174).

FIG. 2A is a system diagram of one or more system components used for performing the disclosed techniques. The system 200 can include the POS terminal 110, the card identifier and access code system 216, a card and envelope retention apparatus 202, an optional fraud detection system 112, a card redemption system 214, a scanning device 256, a potentially compromised cards and envelopes data store 260, an unpurchased cards and envelopes data store 258, and a purchases cards and envelopes data store 262. In some implementations one or more of the data stores 258, 260, and 262 can be part of a single data store, data repository, network of storage devices, and/or cloud storage system. The components 110, 216, 202, 112, 214, 256, 258, 260, and 262 can communicate (e.g., wirelessly, wired) via the network(s) 116.

The card and envelope retention apparatus 202 can be configured to retain separate gift card components 250 and separate envelope components 252 (e.g., decoupled gift card components) at a display in the retail environment. As described herein, in some implementations, the envelope retention apparatus 202 can be any other type of apparatus or mechanism configured to dispense, hold, or retain decoupled gift card components including but not limited to envelopes, wrappers, sleeves, skins, labels, and/or stickers. For merely illustrative purposes, FIG. 2A is described using gift cards and envelopes.

The POS terminal 110, as described in FIG. 1A, can be configured to process and/or complete purchases during a checkout process in the retail environment, such as a purchase of a gift card that is combined with or attached to an envelope from the card and envelope retention apparatus 202. A checkout area in the retail environment can include a plurality of POS terminals 110. The POS terminal 110 can include the scanning device 256, input devices (e.g., touch screens, keyboards, microphones, mice, payment-receiving devices), and output devices (e.g., display screens, speakers, printers). The POS terminal 110 can include an encryption mechanism 206, which can be configured to encrypt and/or decrypt identifying information for gift cards and envelopes that are combined, purchased, and activated using the system 200. The encryption mechanism 206 can store/maintain a public key 208 and/or a private key 210 that correspond to a combined gift card and envelope. The keys 208 and 210 can be used to secure identifying information for the gift card and/or the envelope as such information is stored and/or transmitted between components of the system 200.

The card identifier and access code system 216, as described in reference to FIG. 1A, can be any type of computing system configured to securely generate, validate, and/or associate the identifying information for the combined gift card and the envelope at a time that the combined components are being purchased.

The optional fraud detection system 244 can be configured to perform one or more techniques to determine whether communication between the system 200 components is compromised. The system 244 can identify patterns of gift card compromises at the retail environment to determine whether a particular POS terminal 110 in the retail environment is vulnerable (or most vulnerable) to being compromised. The system 244 may also be configured to check one or more unique identifiers for the cards 250 and the envelopes 252 against identifiers that are recorded in one or more of the data stores 258, 260, and 262. If the system 244 determines that a particular card has likely been or is compromised, the system 244 can generate one or more alerts (e.g., to be viewed and addressed by team members at the retail environment) and store a unique identifier associated with the particular card in the potentially compromised cards and envelopes data store 260. The data store 260 can be populated with information indicating unique card numbers that have been compromised.

The card redemption system 214 can be any type of computing system configured to determine and/or identify when and if a gift card has been activated and/or a remaining balance is available on the gift card. For example, the system 214 can be used to access and load identifying information for the gift card (e.g., a PIN and/or card number) to verify that such information has been associated with the gift card and/or a balance has been added to the gift card. A user of the gift card may also access or poll the system 214 (e.g., using their user computing device) to check the remaining balance of the gift card and/or use the gift card to make one or more purchases. Sometimes, the system 214 may be configured to activate the gift card once the card is successfully purchased and paid for at the POS terminal 110. The system 214 may activate the gift card using identifying information for the card and/or the combination of the card and the envelope, which can be retrieved from the unpurchased cards and envelopes data store 258 or the purchased cards and envelopes data store 262, or otherwise received from the card identifier and access code system 216.

Still referring to the system 200 in FIG. 2A, a customer 254 can remove a gift card 250 and an envelope 252 from the card and envelope retention apparatus 202, then attach the two components 250 and 252 (e.g., decoupled gift card components) to each other, or otherwise combine the components 250 and 252, in block A (220). As shown in the example of FIG. 2A, the card component 250 can be slid into the envelope component 252. Various other implementations are also possible as described throughout this disclosure.

The scanning device 256 at the POS terminal 110 can scan the card 250 and the envelope 252 in block B (222). As described in reference to FIG. 1A, the customer 254 can scan unique identifiers on the card 250 and the envelope 252 at the POS terminal 110 using the scanning device 256. In some implementations, a team member or other employee of the retail environment can scan the card 250 and the envelope 252 using the scanning device 256.

The POS terminal 110 can process card and/or envelope information for purchase in block C (224). Processing the card information can include receiving payment from the customer 254 to apply a balance to the gift card 250. Processing the card information can include processing the payment and completing the purchase of the gift card 250 as described herein. Processing the card information can include, in some implementations, generating the public key 208 and the private key 210 for the particular gift card 250 and envelope 252 combination using the encryption mechanism 206.

Figure 7:
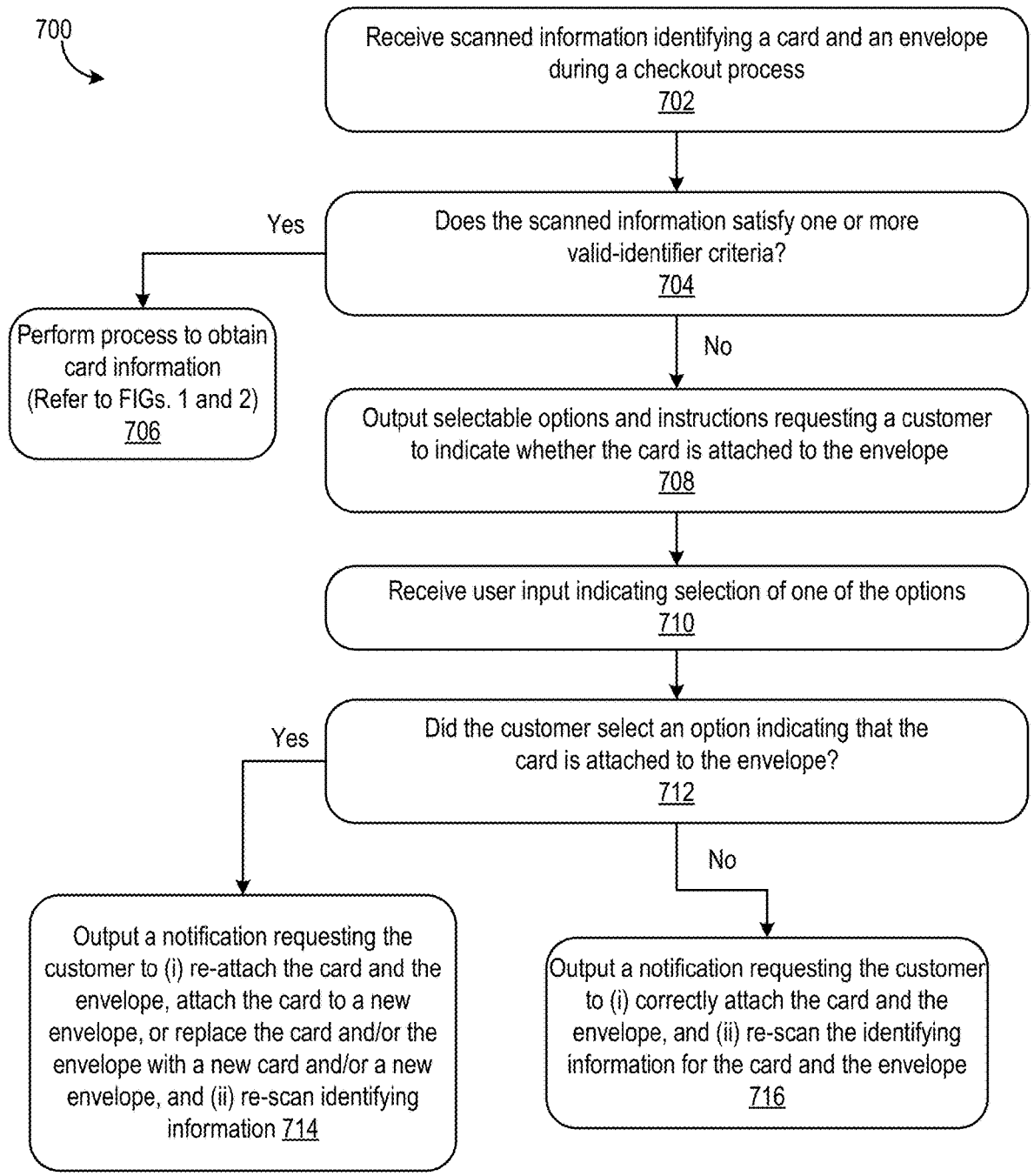
FIG. 7 is a flowchart of a process for checking valid assembly of a physical gift card and an envelope during a checkout process.

As part of processing the card information, the POS terminal 110 can check the assembly of the card 250 and the envelope 252 (block D, 226). Refer to FIG. 7 for further discussion about the process to check and validate the assembly. Once the POS terminal 110 determines that the card 250 and the envelope 252 are properly assembled, the POS terminal 110 can request a unique card number and/or PIN for the gift card 250 from the card identifier and access code system 216 (block E, 228). The encryption mechanism 206 of the POS terminal 110 can provide the public key 208 in the request to the system 216.

The system 216 can verify the card 250 and/or the envelope 252 in block F (230). The system 216 can use the public key 208 to identify an association between the gift card 250 and existing identifying information for the card 250. Verifying the card 250 and/or the envelope 252 can include comparing the scanned information with data stored in the potentially compromised cards and envelopes data store 260 and the unpurchased cards and envelopes data store 258. For example, the system 216 can determine whether a barcode that was scanned for the card 250 appears as an entry in the unpurchased cards and envelopes data store 258, which would indicate that the card 250 has not previously been used and thus is available for activation and use. The system 216 can also determine whether the barcode that was scanned for the card 250 appears as an entry in the potentially compromised cards and envelopes data store 260, which would indicate that the card 250 might have been compromised in the past and thus should be removed from the customer 254's purchase. Refer to FIG. 7 for further discussion about operations that are performed based on determining that the card 250 has potentially been compromised.

Once the system 216 verifies the card 250 and the envelope 252 in block F (230), the system can associate the card 250 and envelope 252 combination in block G (232). For example, the system 216 can create a data entry in the purchased cards and envelopes data store 262 that indicates an association between scanned information for the card 250 and the envelope 252. One the association is made, the card 250 and the envelope 252 combination may not be purchased by other customers. For example, an identifier for the gift card 250 and an identifier for the envelope 252 can be paired and stored in the data store 262. The paired identifiers can be transmitted to the card redemption system 214 and used to redeem the card 250, as described further below.

Sometimes, the system 216 may generate a card number and/or PIN for the gift card 250 and/or the envelope 252 as part of blocks F and G (230 and 232, respectively). Sometimes, the system 216 can randomly generate such identifiers. Sometimes, the system 216 can select one or more previously-generated values for these identifiers.

The system 216 can encrypt association and/or verification information using the public key 208 (block H, 234) so that the system 216 can securely transmit the encrypted information back to the POS terminal 110 in block I (236).

The encryption mechanism 206 of the POS terminal 110 can be configured to decrypt the information using the private key 210 (block J, 238).

Once decrypted, the POS terminal 110 can complete purchase of the card 250 and the envelope 252 combination in block K (240). The POS terminal 110 may also activate the card 250 based on the decrypted information.

The customer 254, the team member, or any other relevant user (such as a person who receives the gift card as a gift from the customer) can access the card redemption system 214 to activate, redeem the balance, and/or check the balance of the gift card 250 (block L, 242). The system 214 can access information from the purchased cards and envelopes data store 262 and/or the card identifier and access code system 216 (refer to block G, 232) in order to redeem and/or check the balance of the card 250 in block L (242).

In some implementations, the fraud detection system 244 can be configured to optionally perform one or more fraud detection check(s) to determine whether the card 250 and/or the combination of the card 250 and the envelope 252 have been compromised (block X, 246). Block X (246) can be performed before, during, or after any of the blocks described in FIG. 2A. For example, block X (246) can be performed before, during, or after transmission of encrypted information between system components.

Figure 2B:
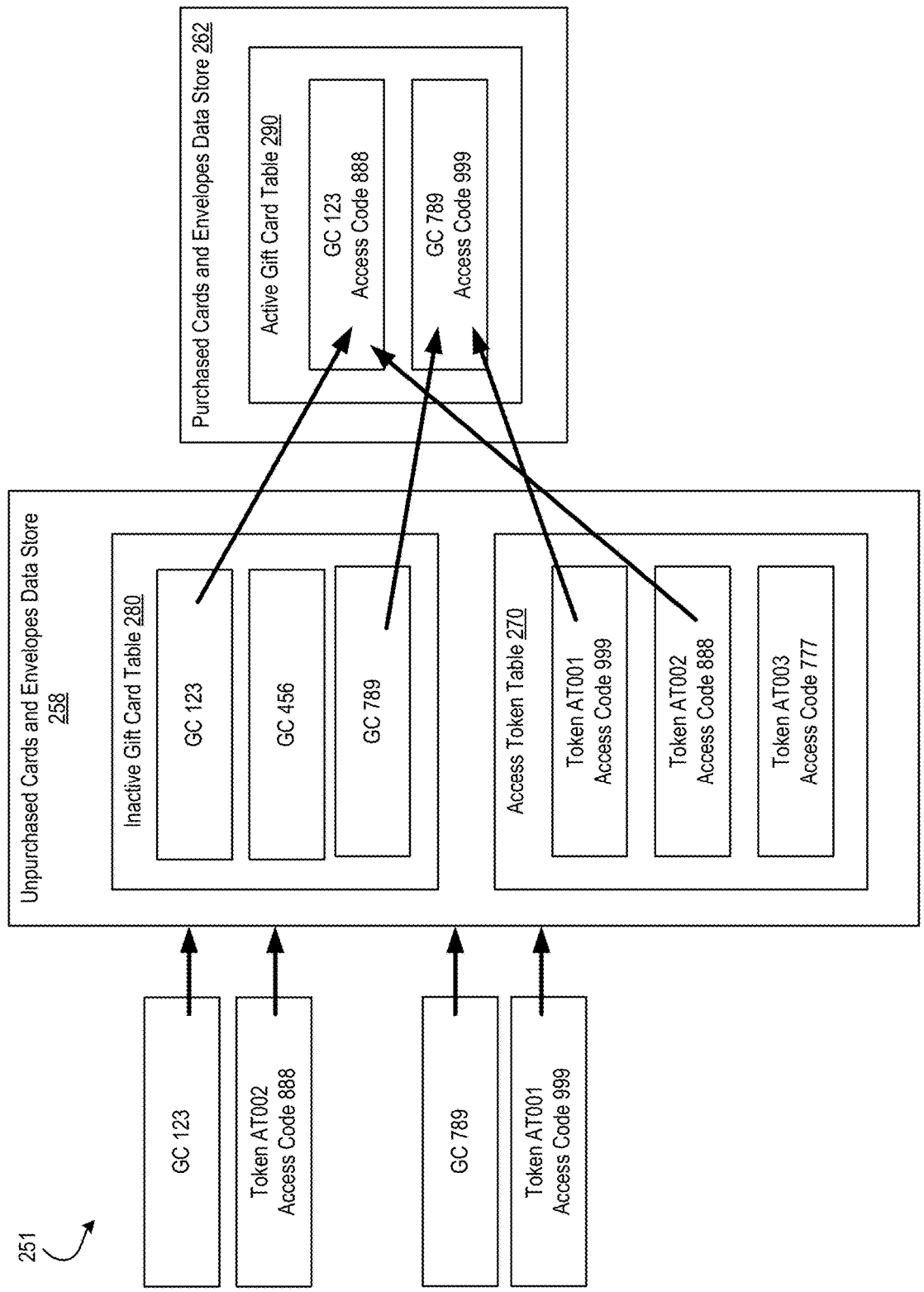
FIG. 2B illustrates an example technique for associating information of decoupled card components with each other to activate a physical gift card.

FIG. 2B illustrates an example technique for associating information of decoupled card components with each other to activate a physical gift card. Such technique and similar techniques are described further in U.S. Provisional Patent Application No. 63/699,575, entitled "Decoupled Gift Cards and Process for Activation and Validation," which was filed on Sep. 26, 2024, and is incorporated herein by reference in its entirety.

In example 251 of FIG. 2B, a gift card number 123 can be scanned along with a label token AT002 in a first transaction or checkout process. In some implementations, instead of a label, the token AT002 can be affixed to an envelope, sleeve, wrapper, sticker, or other decoupled gift card component that can be combined with or otherwise affixed to a physical gift card component. In the illustrative example of FIG. 2B, the label token AT002 can be scanned in response to affixing the corresponding label to a gift card having the gift card number 123.

In a second illustrative transaction or checkout process, a gift card number 789 can be scanned along with a label token AT001 for a corresponding label that has been affixed to a gift card having the gift card number 789. The first and second transactions can be independent of each other and performed at different times. Both transactions are shown in FIG. 2B as a merely illustrative example.

The access token values on the labels can have a format that is different than the gift card numbers. For example, every access token value can start with "AT" followed by a random string of numbers. The access token values can be used to activate a gift card, such as the gift card 123 or the gift card 789 when that gift card is purchased in a retail environment. The labels, envelopes, or other second physical gift card components described herein can include access codes printed thereon (e.g., 8 digit access codes), which can be hidden from view by a scratch-off material. The respective access codes of the labels can also be stored in association with the labels in the unpurchased cards and envelopes data store 258 or another data store, for example in an access token table 270. An access code can therefore be retrieved from the access token table 270 when both a gift card number on a gift card and an access token on a label are scanned during a checkout process. The retrieved access code can be used to associate the label with the gift card and activate the gift card for use. The retrieved access code can be used as the access code for redeeming the gift card.

As shown in FIG. 2B, the data store 258 can maintain an inactive gift card table 280 and the access token table 270. The purchased cards and envelopes data store 262 can maintain an active gift card table 290. In some implementations, one or more of the tables 270, 280, and 290 can be maintained in a same data store. The inactive gift card table 280 can be configured to maintain data entries (e.g., attribute information) about each gift card component (e.g., decoupled gift card components) that can be sold in one or more retail stores described throughout this disclosure. In the illustrative example 251, the inactive gift card table 280 maintains gift card numbers for 3 example gift cards. The table 280 can maintain additional information for many other gift cards that may be sold and available for purchase in the one or more retail stores.

The access token table 270 can include data entries about each label component that can be sold in the retail stores and affixed to the gift card components at time of purchase. In the illustrative example 251, the table 270 can maintain information such as access token values and access codes corresponding to each of the access token values. The access token values can be globally unique references to the corresponding access codes. In some implementations, the access token values and/or the corresponding access codes can be made up of combinations of letters and/or numbers.

The active gift card table 290 can be configured to maintain information indicating associations between the gift card components and the labels (e.g., decoupled gift card components) that are scanned during the same checkout process. For example, the table 290 can include pairings of gift card numbers and access codes. The information that is maintained and updated in the table 290 can be accessed by other computer systems (e.g., third party retailer computing systems, POS systems in one or more different retail stores) when a user desires to redeem their decoupled gift card. The computer system can access the table 290 in the data store 262 and determine whether a scanned gift card number and/or access code correspond to each other in the table 290. If the values correspond to each other, then the decoupled gift card can be validated and redeemed.

In the example 251 of FIG. 2B, once the gift card number 123 and the access token value AT002 are scanned/received, a computer system as described herein can identify a data entry associated with the gift card number 123 in the inactive gift card table 280 and a data entry associated with the access token value AT002 in the access token table 270. The computer system can then marry the two data entries in the active gift card table 290. The computer system can designate or otherwise generate a new data entry in the table 290 that includes or otherwise pairs the gift card number 123 with the access code 888 that corresponds to the access token value AT002 in the access token table 270.

Similarly, when the gift card number 789 and the access token value AT001 are scanned/received, the computer system can identify the data entry corresponding to the gift card number 789 in the inactive gift card table 280 and the data entry corresponding to the access token value AT001 in the access token table 270. The computer system can then designate or generate a new data entry in the active gift card table 290 that includes or otherwise pairs the gift card number 789 with the access code 999 that corresponds to the access token value AT001 in the access token table 270.

Once the pairings are made in the active gift card table 290, the inactive gift card table 280 and the access token table 270 can each be updated to reflect that the corresponding gift card and label with the access token value is no longer available to be paired with other components.

FIGS. 3A, 3B, 3C, 3D, 3E, 3F, 3G, 3H, and 3I illustrate example gift card and envelope components (e.g., decoupled gift card components) that can be attached to each other using the disclosed techniques.

Figure 3A:
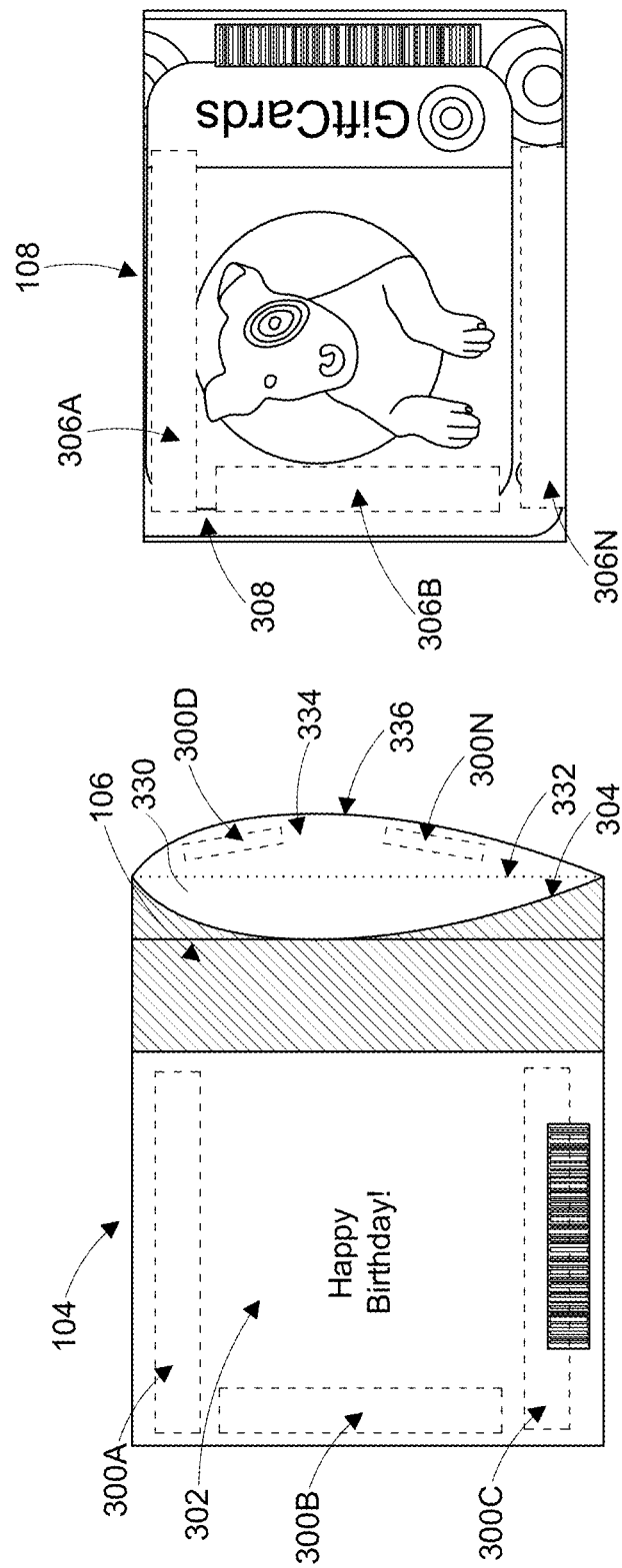
FIGS. 3A, 3B, 3C, 3D, 3E, 3F, 3G, 3H, and 3I illustrate example gift card and envelope components that can be attached to each other using the disclosed techniques.

FIG. 3A illustrates the gift card component 108 having one or more adhesives 306A-N on a front surface 308 of the card component 108 and the envelope component 104 as a sleeve having one or more adhesives 300A-N on an interior-facing side 304 of a front surface 302 of the envelope component 104. In some implementations, only the gift card component 108 may include one or more adhesives 306A-N. For example, the gift card component 108 can include the adhesive 306A, which can be a sticker-type attachment. When the gift card component 108 is slid into an enclosure of the envelope component 104 that is defined by an opening 330, the gift card component 108 can stick/attach to the interior-facing side 304 of the front surface 302 of the envelope component 104. Sometimes, only the envelope component 104 may include one or more adhesives 300A-N. For example, the envelope component 104 may include at least one adhesive 300 on the interior-facing side 304 of the front surface 302 of the envelope component 104. When the gift card component 108 (which may or may not have respective adhesives 306A-N) is slid into an opening 330 of the envelope component 104, the adhesive 300 on the interior-facing side 304 of the front surface 302 of the envelope component 104 can affix the envelope component 104 to the front surface 308 of the card component 108.

The adhesives 300A-N and/or 306A-N can be positioned anywhere on respective surfaces of the envelope component 104 and the gift card component 108. In some implementations, the adhesives 300A-N and 306A-N can line up with each other and thus mate in order to securely attach the card component 108 to the envelope component 104. In some implementations, the adhesives 300A-N and/or 306A-N can be placed on back surfaces of one or more of the envelope component 104 and the gift card component 108.

As shown in FIG. 3A, the envelope component 104 can include the opening 330 along an edge of the transparent window 106. In some implementations, the opening 330 can be defined along one or more other edges of the envelope component 104. The envelope component 104 can include a back surface 336 opposite the front surface 302. The back surface 336 can include an interior-facing side 334, which may be positioned against a back surface of the card component 108 when the card component 108 is slid into the opening 330 of the envelope component 104. The front surface 302 and the back surface 336 of the envelope component 104 can create an enclosure for retaining the card component 108 such that the card component 108 may not be removed from the envelope component 104 once assembled/affixed to each other.

In some implementations, the interior-facing side 334 of the back surface 336 of the envelope component 104 may include one or more of the adhesives 300D-N. Sometimes, the envelope component 104 may only have the adhesives 300D-N and not the adhesives 300A-C. Additionally or alternatively, the envelope component 104 may only have the adhesives 300D-N and the card component 108 may not have any of the adhesives 306A-N.

As an illustrative use case, a customer can select the gift card component 108 and the envelope component 104 from a display in a retail environment. The customer may slide the gift card component 108 into the opening 330 defined by the envelope component 104. To secure the gift card component 108 in place (and thus not permit the gift card component 108 to be detached from the envelope component 104), the guest can fold over a portion of the back surface 336 having the adhesives 300D-N along a seam 332 so that the adhesives 300D-N couple to the front surface 302 of the envelope component 104 (e.g., the transparent window 106), thereby securing the gift card component 108 inside the envelope component 104. The adhesives 300D-N on the folded-over portion of the back surface 336 can be removable adhesives that are configured to attach to the front surface 302 of the envelope component 104.

The adhesives 300A-N and 306A-N can be glue. The adhesives 300A-N and 306A-N can be a type of sticky material that, alone, may not stick to other materials, but when combined or otherwise affixed to each other (e.g., the adhesive 300A mates with the adhesive 306A), the combination of adhesives becomes permanent. In other words, the card component 108 and the envelope component 104 may not be detached from each other without causing damage to one or the other.

As shown and described herein, the transparent window 106 of the envelope component 104 can be sized to view a portion of the gift card component 108, such as a portion that includes identifying information associated with the gift card component 108 (e.g., a barcode). The envelope component 104 can be sized to be small enough to fit into a wallet and/or thin enough so that the combined envelope and card resemble a similar size/shape of a credit card, government-issued ID, etc.

Figure 3B:
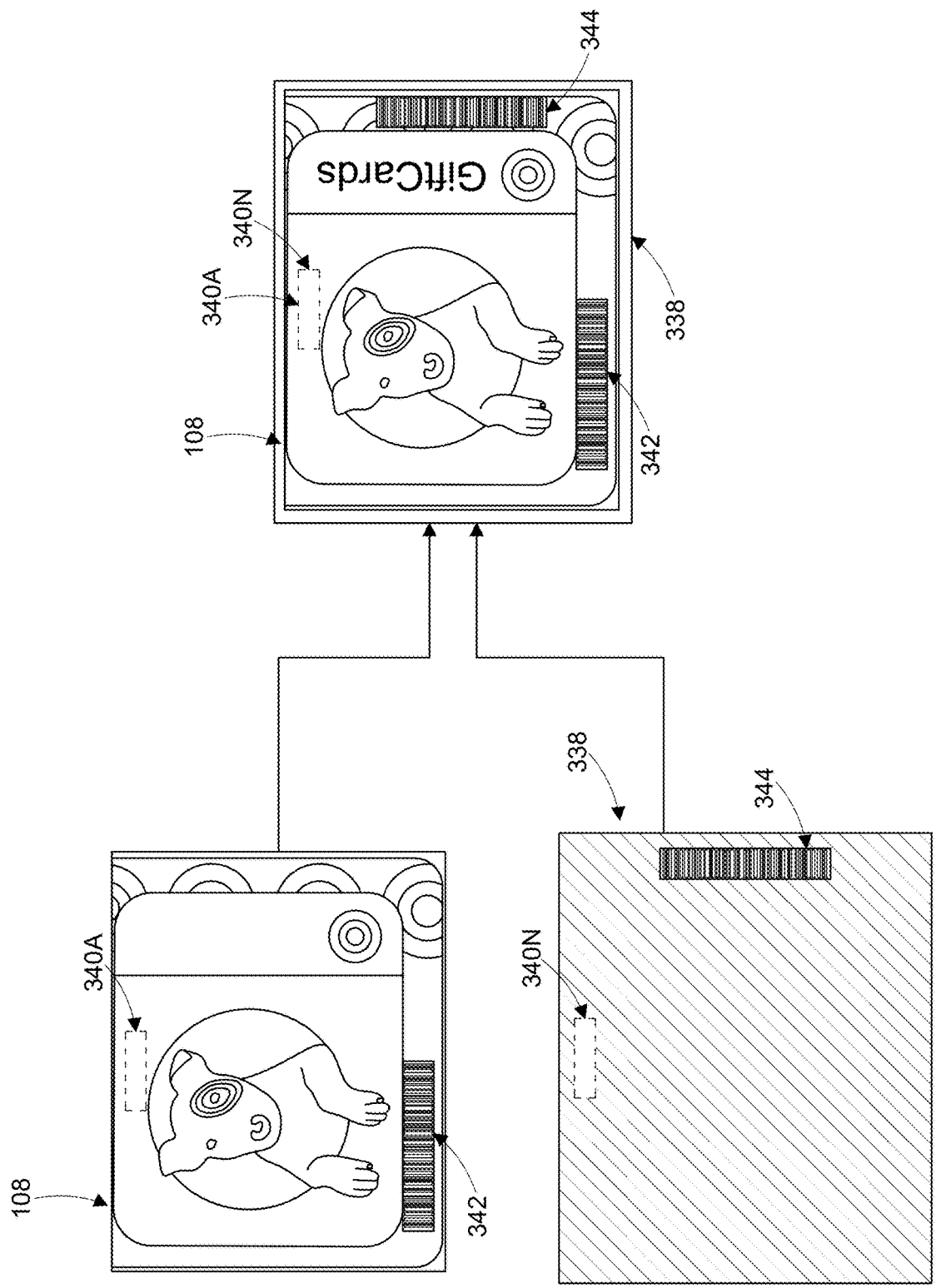

FIG. 3B illustrates the gift card component 108 having a barcode 342 and an adhesive 340A. FIG. 3B also illustrates a film component 338, which is similar to the envelope component 104 described herein. The film component 338 can be translucent and/or at least partially transparent. The film component 338 can be a same or similar size as the gift card component 108 so that the film component 338 can simply be attached to an upper surface of the gift card component 108. In some implementations, the film component 338 may be attached to a back surface of the gift card component 108. The film component 338 can include an adhesive 340N and a barcode 344. The barcode 344 of the film component 338 and the barcode 342 of the gift card component 108 can be at different positions on the respective surfaces so that when the film component 338 is applied or otherwise attached to the gift card component 108 (e.g., via the adhesives 340A-N), both barcodes 342 and 344 may be visible and scannable. As a result of scanning the combination of barcodes 342 and 344, the gift card 108 can be considered safe from potential gift card scams.

Figure 3C:
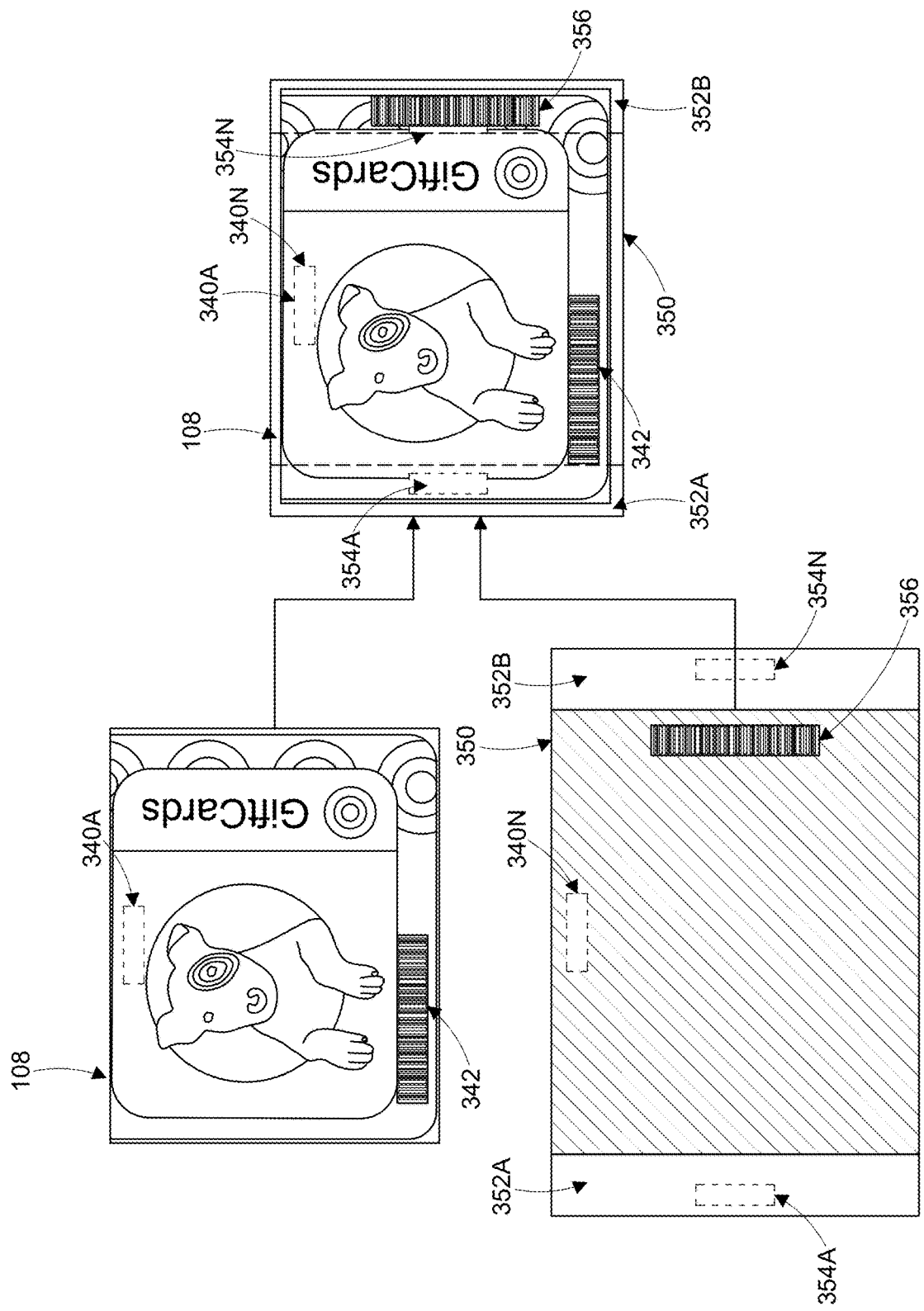

FIG. 3C illustrates the gift card component 108 of FIG. 3B and a sleeve component 350 that is configured to wrap around at least one edge of the card component 108. Here, the sleeve component 350 can include one or more flaps 352A-N. Each of the flaps 352A-N can include one or more respective adhesives 354A-N. The sleeve component 350 may also include a barcode 356.

To attach the gift card component 108 with the sleeve component 350, a customer can align the sleeve component 350 with a top surface of the gift card component 108 so that the flaps 352A-N extend beyond opposing edges of the gift card component 108 (e.g., left and right sides of the gift card). The flaps 352A-N can then be wrapped around the respective opposing edges of the gift card component 108 and secured to a back surface of the gift card component 108 using the adhesives 354A-N. In some implementations, the gift card component 108 may also have the adhesive 340A and the sleeve component 350 may have the corresponding adhesive 340N. When the gift card component 108 is paired with the sleeve component 350, the adhesives 340-N can be aligned and mated so that the components are not detached from each other.

Figure 3D:
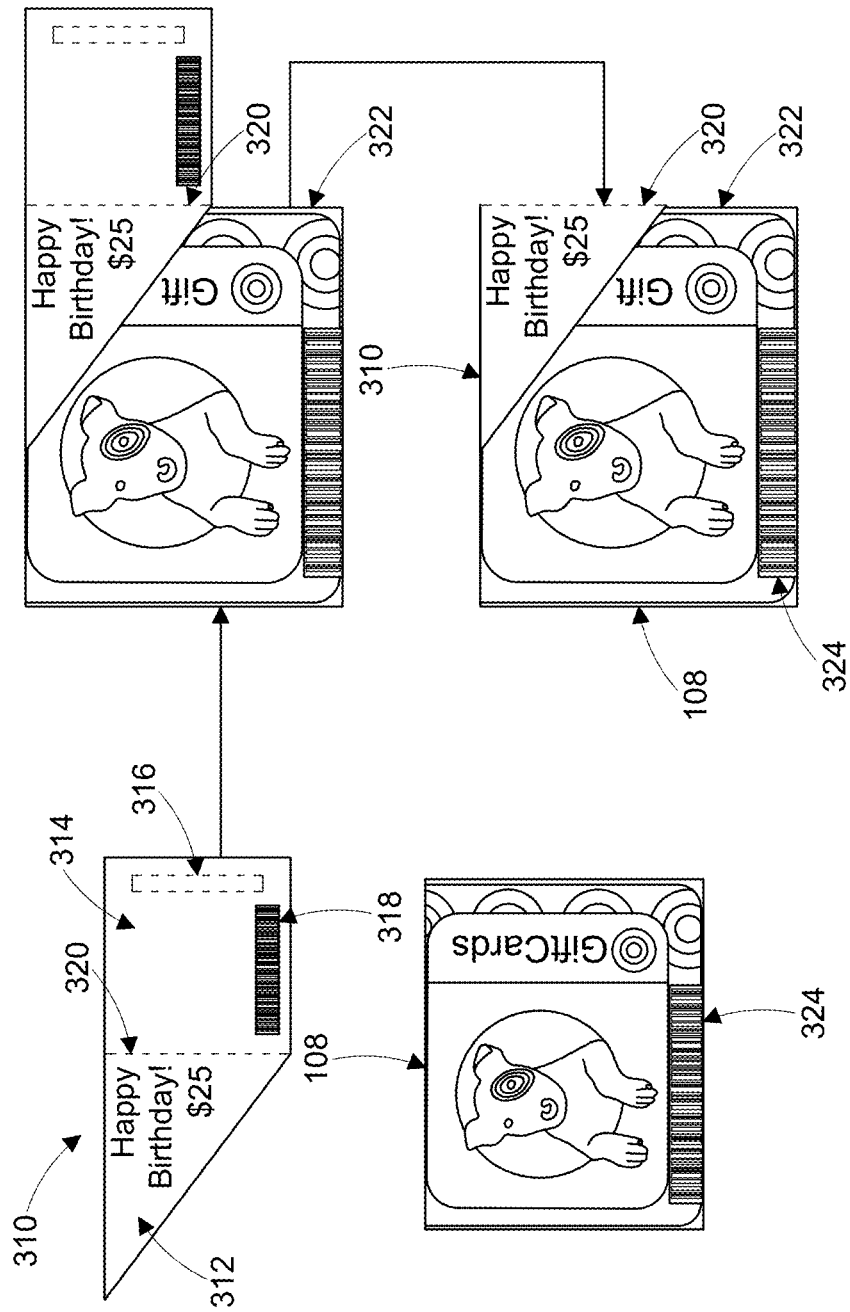

FIG. 3D illustrates the example gift card 108 having the barcode 324 and a sleeve 310. The sleeve 310 can be the same as or similar to the envelopes described throughout this disclosure. The sleeve 310 can wrap around at least one edge of the gift card 108 and attach to the gift card 108 so that it may not be removed. In some implementations, the sleeve 310 can be sized to fit over/wrap around a particular edge, corner, and/or side of the gift card 108. In some implementations, the gift card 108 may be missing a portion (such as a top right corner) and the sleeve 310 can be a size and shape that matches the missing portion of the gift card 108. As a result, when the gift card 108 and the sleeve 310 are attached to each other, the combined components create a size and shape of a card, such as a gift card, ID, and/or credit card.

In the example of FIG. 3D, the sleeve 310 includes a first surface 312, which can include text, a graphic, a design, etc. The sleeve 310 also includes a second surface 314, which can have at least one adhesive 316. In some implementations, the second surface 314 may include a barcode 318 or other unique identifier for the sleeve 310. The sleeve 310 can be placed along and aligned with an edge 322 of the gift card 108 at a seam 320 of the sleeve 310. Once aligned, the second surface 314 can fold along the seam 320 and over the edge 322 of the gift card 108. The adhesive(s) 316 on the second surface 314 can retain the second surface 314 of the sleeve 310 to a back surface of the gift card 108. In some implementations, the sleeve 310 may include one or more additional adhesives on a back-facing side of the first surface 312 so that when placed against the gift card 108, the first surface 312 of the sleeve 310 may affix to the gift card 108 so that it cannot be removed. As shown in FIG. 3D, when the sleeve 310 is properly placed and attached to the gift card 108, the barcode 324 of the gift card 108 may be fully visible and thus unobstructed.

Figure 3E:
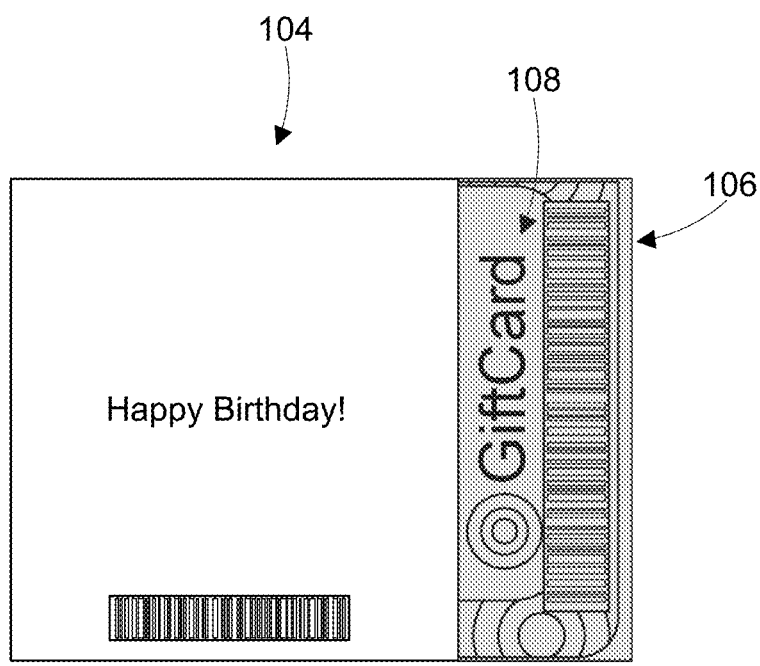

FIG. 3E illustrates the envelope 104 of FIGS. 1 and 2 with the transparent window 106 through which to view a portion of the gift card 108 when placed inside and sealed within the envelope 104. The envelope 104 of FIG. 3E may also be the same as the envelope 104 shown and described in reference to FIG. 3A.

In some implementations, the envelope 104 may have a design, images, and/or text that appears like a gift card and/or card for a special occasion (e.g., birthday, graduation, anniversary, holiday). The gift card 108 may have a design, images, and/or text that corresponds to the design, images, and/or text of the envelope 104 so that when the gift card 108 is placed inside the envelope 104, the combined components create a cohesive design for the special occasion. The cohesive design can also help customers easily put together the gift card 108 and the envelope 104. After all, if the gift card 108 is not oriented properly before being slid into the envelope 104, then the pattern, images, text, and/or other information on the gift card 108 may not be visible through the transparent window 106.

For example, a right side of the gift card 108 may include text indicating that the card 108 is a gift card and a total quantity on the card 108. A left side of the card 108 may be a white box without any text, images, or identifying information. If the gift card 108 is slid into the envelope 104 such that the right side of the gift card 108 is put in first and the left side of the card 108 having the white box is exposed/visible through the transparent window 106, then the customer may realize that they improperly set up the gift card 108 and the envelope 104. If the customer has not yet sealed the envelope 104 to secure the gift card 108 therein, then the customer can remove the gift card 108 and position it in the correct orientation/placement within the envelope 104 before sealing the envelope 104. If, on the other hand, the customer has sealed the envelope 104, then the customer may be required to pick up another gift card and envelope from a display in a retail environment, attach the newly-picked up card and envelope to each other, and then proceed to purchase the newly-combined components. The design and configuration of the gift card 108 inside the envelope 104 may be intuitive and thus cause the customer (and/or recipients of the combined components) to not want to disassemble or attempt disassembling the card 108 and the envelope 104.

As shown in FIG. 3E, when the gift card 108 is placed inside the envelope 104, identifying, scannable information for the gift card 108, such as a barcode, SKU, or QR code, can be visible through the transparent window 106.

Figure 3F:
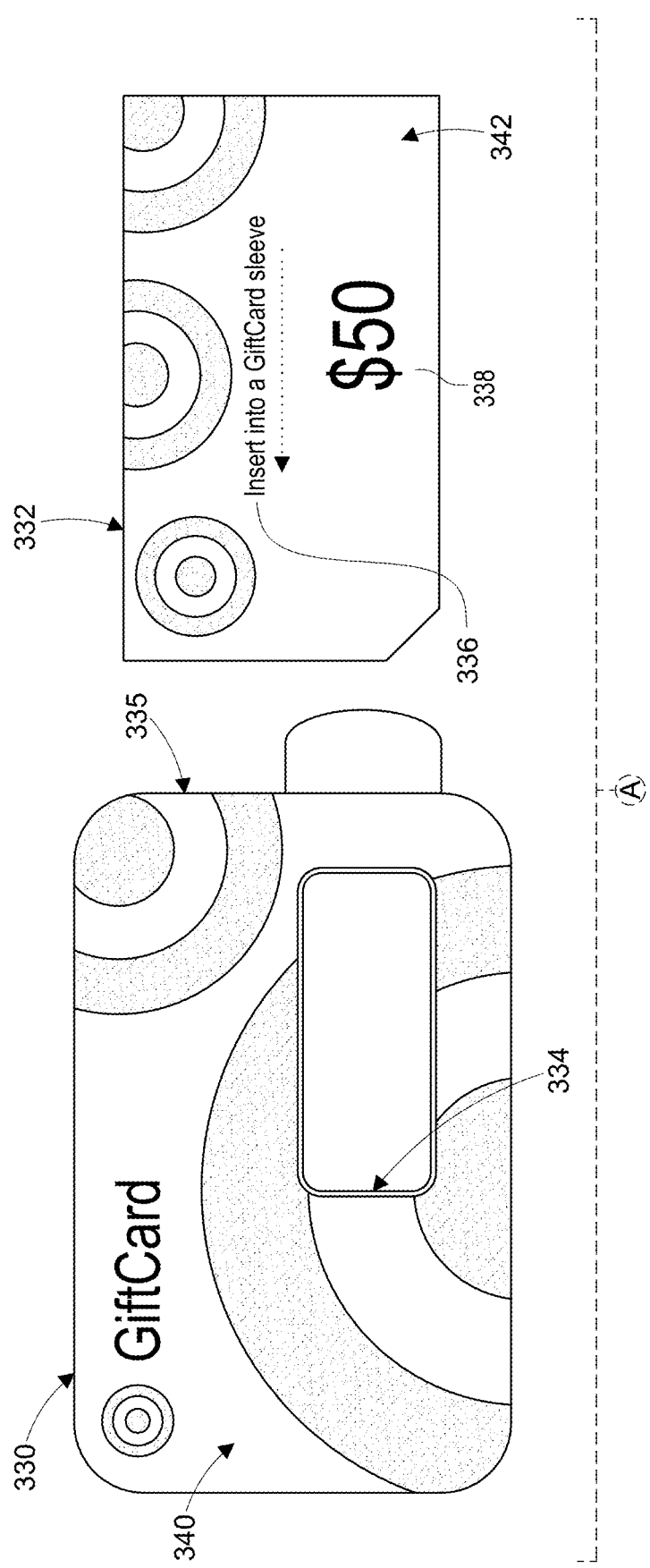
Figure 3F:
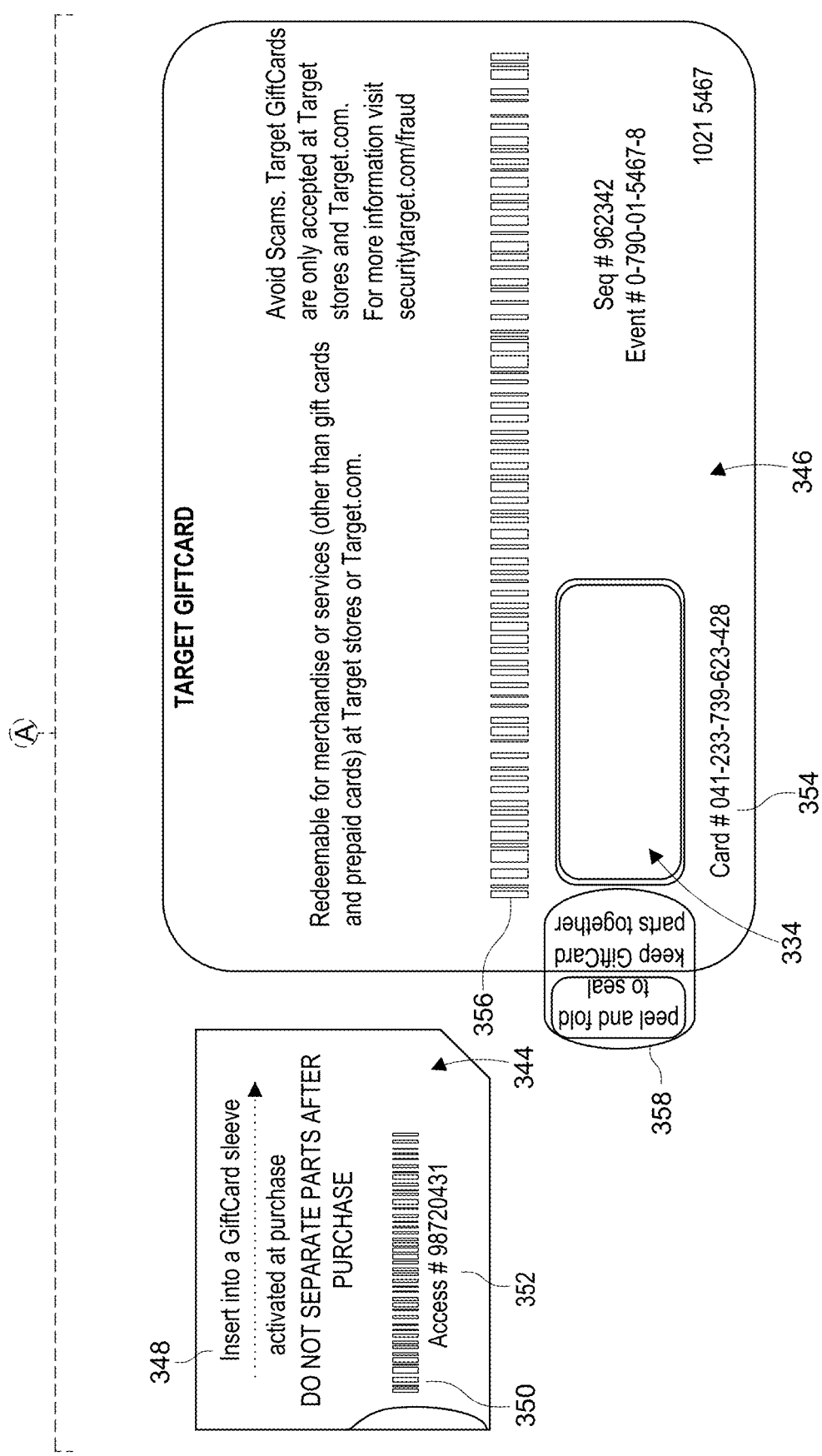

FIG. 3F illustrates an example sleeve component 330 and gift card component 332. The sleeve component 330 may be similar to one or more of the envelope components described throughout this document. The sleeve component 330 can include a front surface 340 and a back surface 346. The sleeve component 330 can include an opening 334, which can extend through the sleeve component 330 from the front surface 340 to the back surface 346 of the sleeve component 330. The sleeve component 330 may also include a tab 358, which can be configured to bend or fold at an edge of the sleeve component 330 and seal against the back surface 346 of the sleeve component 330, thereby securing the gift card component 332 inside the sleeve component 330. The gift card component 332 can be slid into the sleeve component 330 via an opening 335 of the sleeve component 330 and the tab 358 can fold over the edge of the sleeve component 330 having the opening 335.

The back surface 346 of the sleeve component can include information such as a barcode 356 and/or a card number 354. The card number 354 can be associated with a unique code, such as an access code 352 of the gift card component 332. Sometimes, the association can be predetermined, stored, and accessible in a computer system described herein. In some implementations, the association can be made during a checkout process, once the gift card component 332 and the sleeve component 330 are scanned at a POS terminal.

The gift card component 332 can include a front surface 342 and a back surface 344. The front surface 332 can include information including but not limited to instructions 336 for combining with a sleeve component and/or a value 338. The instructions 336 can help a guest to combine the gift card component 332 with a sleeve component, further indicating that neither gift card component 332 nor the sleeve component 330 can be purchased without first being combined. The value 338 can be visible through the opening 334 of the sleeve component 330, as shown and described in FIG. 3G.

The back surface 344 of the gift card component 332 can include information including but not limited to instructions 348 for combining with the sleeve component, a barcode 350, an access code 352, and/or other identifying information. When the gift card component 332 is inserted into the sleeve component 330, the barcode 350 and/or the access code 352 can be visible through the opening 334 of the sleeve component 330.

Figure 3G:
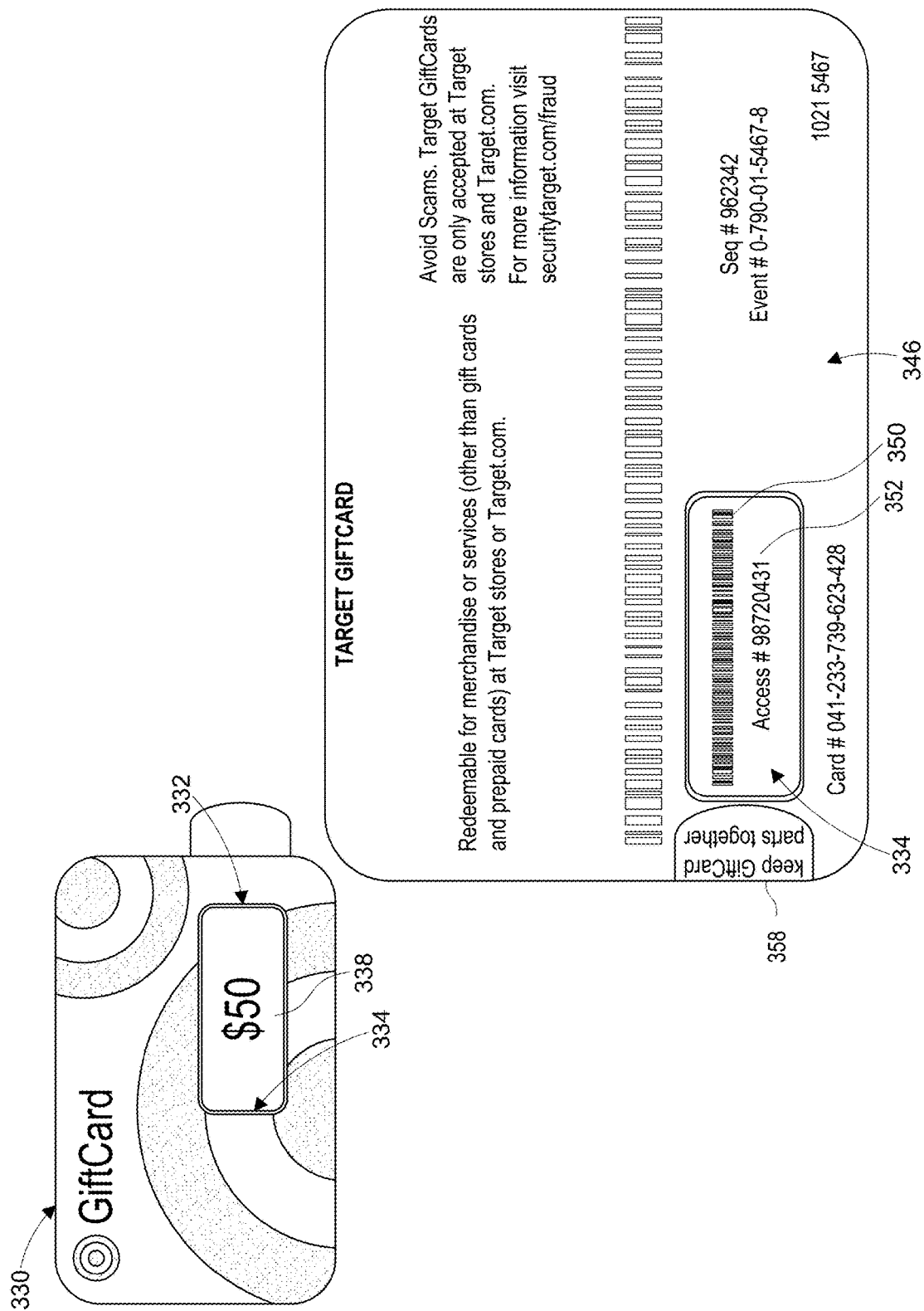

FIG. 3G illustrates the gift card component 332 and the sleeve component 330 once combined. As shown, the value 338 printed onto the gift card component 332 is visible through the opening 334 of the sleeve component 330. Similarly, on the back surface 346 of the sleeve component 330, the barcode 350 and/or the access code 352 are visible through the opening 334. The tab 358 has also been folded over the edge of the sleeve component 330 having the opening for receiving the gift card component 332, thereby securing the gift card component 332 within the sleeve component 330.

As shown in FIGS. 3F and 3G, the sleeve component 330 can be designed with physical features, such as the opening 334 and the tab 358, to make visually clear that the sleeve component 330 is not complete unless the gift card component 332 is inserted into the sleeve component 330 and the value 338 is visible through the opening 334 on the front surface 340 of the sleeve component 330. In some implementations, the front surface 342 of the gift card component 332 can include artwork or other printed matter to aid a guest in proper alignment, insertion, and assembly of the gift card component 332 in the sleeve component 330. As an illustrative example, artwork can be printed on a portion of the gift card component 332 that would only be visible through the opening 334 of the sleeve component 330. Therefore, a guest may know that they appropriately inserted the gift card component 332 into the sleeve component 330 if they can see the artwork on the gift card component 332 through the opening 334.

In some implementations, the access code 352 may not be printed onto the gift card component 332. Instead, the access code can be generated for the gift card component 332 during the checkout process, once the guest scans any of the identifying information (e.g., barcode 350) on the gift card component 332 and/or the sleeve component 330. Therefore, the access code 352 may be unknown before the checkout process.

Figure 3H:
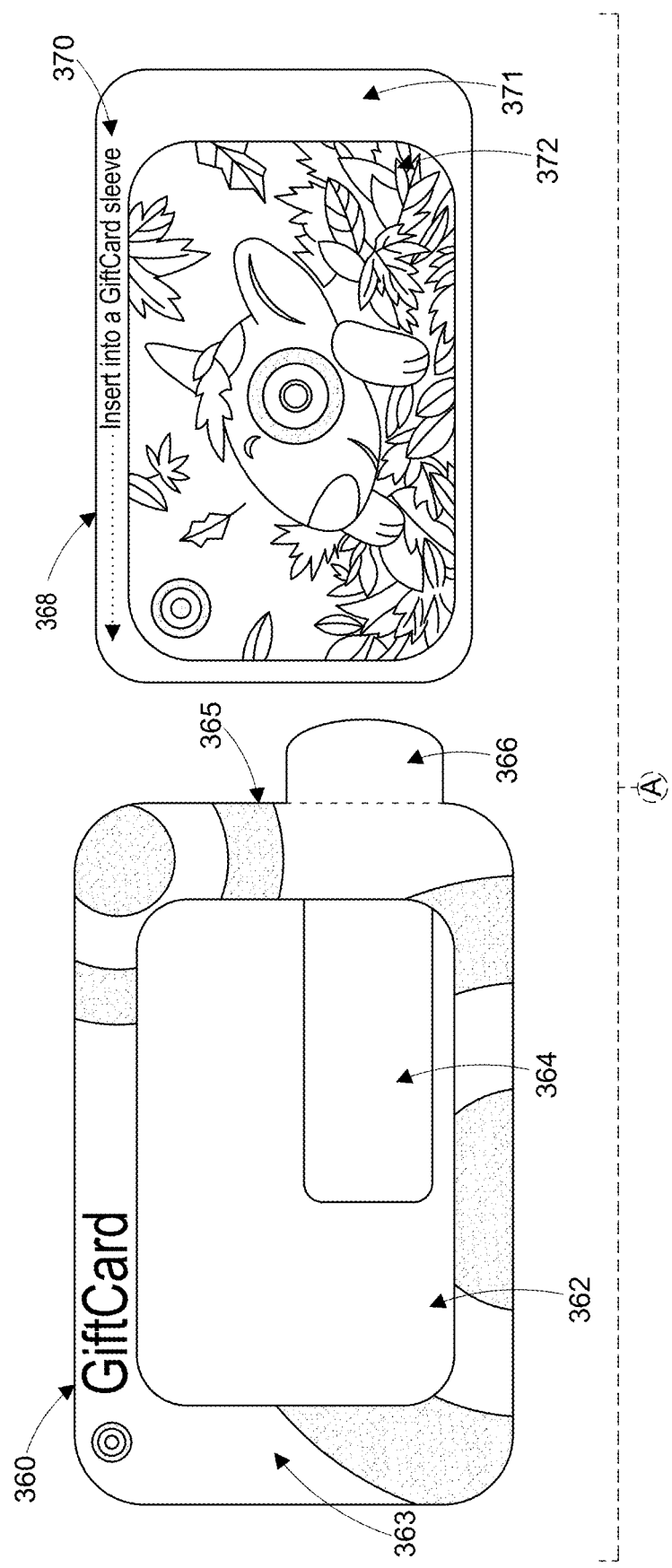
Figure 3H:
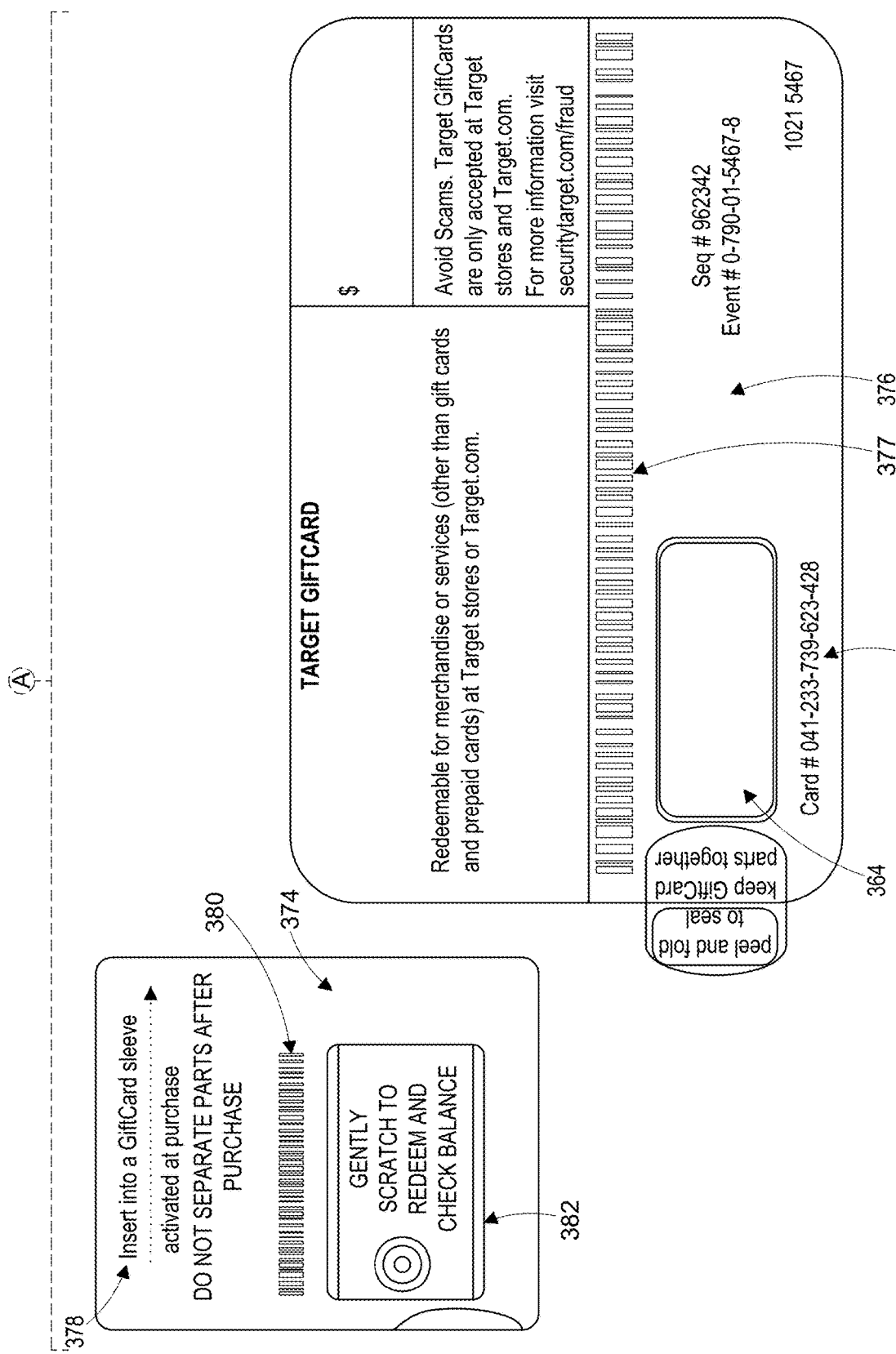

FIG. 3H illustrates an example gift card component 368 and sleeve component 360, which can be combined to create a gift card for purchase and activation in a retail environment/store. In comparison to the gift card component 332 and the sleeve component 330 of FIGS. 3F and 3G, the gift card component 368 in FIG. 3H includes artwork 372, which can be visible through an opening 362 on a front surface 363 of the sleeve component 360. The sleeve component 360 may include a second opening 364 on a back surface 376 of the sleeve component 360. The second opening 364 can be smaller than the opening 362 on the front surface 363 of the sleeve component 360. The differently sized openings 362 and 364 can provide visual indicators to a guest that the sleeve component 360 must be combined with a gift card component in order to generate a completed gift card for purchase and activation. The differently sized openings 362 and 364 can also visually guide and assist the guest to correctly assemble the gift card component 368 with the sleeve component 360.

The sleeve component 360 may further include an opening 365 along at least one edge of the sleeve component 360 that is sized to receive the gift card component 368. The sleeve component 360 may further include a tab 366, which can seal over a portion of the edge having the opening 365 to seal the gift card component 368 inside the sleeve component 360. Refer to FIGS. 3F and 3G for further discussion.

The back surface 376 of the sleeve component 360 may include information, including but not limited to a card number 386. In some implementations, the card number 386 may be printed onto a back surface 374 of the gift card component 368 instead of on the sleeve component 360. Additionally or alternatively, a barcode 377 can be printed on the back surface 376. The barcode 377 can be a pointer to an actual value that is stored (in a data store and/or computer system described throughout this disclosure) in association with and identifying the sleeve component 360. Accordingly, the barcode 377 itself may not be a value that identifies the sleeve component 360. In some implementations, the barcode 377 may identify the sleeve component 360, instead of pointing to an actual stored value that identifies the sleeve component 360.

On a front surface 371 of the gift card component 368, instructions 370 can be printed thereon. The instructions 370 can provide guidance to the guest for easily and correctly assembling the gift card component 368 with the sleeve component 360. When the components 368 and 360 are properly assembled, the instructions 370 may no longer be visible. For example, the instructions 370 may not be visible through the opening 362 on the front surface 363 of the sleeve component 360 but the artwork 372 on the front surface 371 of the gift card component 368 may be visible through the opening 362.

On a back surface 374 of the gift card component 368, instructions 378 may be printed thereon. The instructions 378 can provide guidance to the guest for easily and correctly assembling the gift card component 368 with the sleeve component 360. Similarly to the instructions 370, the instructions 378 may no longer be visible once the components 368 and 360 are properly assembled.

The back surface 374 of the gift card component 368 can further include a barcode 380 and/or a scratch-off material 382. The barcode 380 can be a one-time-use identifier that uniquely identifies the gift card component 368. The barcode 380 can be scanned during the checkout process to associate access code information hidden by the scratch-off material 382 with the gift card component 368 and/or the sleeve component 360. The scratch-off material 382 can cover an access code, PIN, barcode, or other identifying information for the gift card component 368. The information hidden by the scratch-off material 382 can be different than the barcode 380 shown on the gift card component 368. The barcode 380 and the scratch-off material 382 can be arranged on the back surface 374 of the gift card component 368 to provide a visual indicator to the guest that the gift card component 368 has been properly assembled with the sleeve component 360 when both the barcode 380 and the scratch-off material 382 are visible through the opening 364 on the back surface 376 of the sleeve component 360. Any other material can be applied as the material 382 to obscure, cover, or otherwise protect the access code, PIN, or other identifying information from being visible. Once the material 382 is removed, the access code, PIN, or other identifying information may be visible and remain visible.

In some implementations, the scratch-off material 382 can be part of a label (e.g., insert) having access code information, which can be a pre-printed label and applied to the gift card component 368 at time of sale by a team member. Therefore, the access code information may not be printed onto the back surface 374 of the gift card component 368. The label may include a barcode and the scratch-off material 382, which can cover the access code information printed onto the label. During the checkout process, the barcode on the label can be scanned to associate the access code information hidden by the scratch-off material 382 with the gift card component 368. The barcode on the label can be a unique one-time-use identifier for the label. As a one-time-use identifier, the barcode on the label may not be multiplied or re-used, thereby securing gift cards and reducing risk of counterfeiting or compromised access codes for gift cards. Moreover, a malicious active may not reasonably predict which card number on an access code label may be applied to a card if the malicious actor compromised the label, thereby keeping the card information to label information combination safe and secure for the guest purchasing the gift card component 368. Once the scratch-off material 382 is removed from the label, the access code information is permanently visible. In some implementations, removing the scratch-off material 382 may also expose another barcode, which may correspond to the access code information and be different than the barcode printed onto the label that is used to initially scan and associate the label with the gift card component 368.

Similar to the barcode 377 of the sleeve component 360, the barcode 380 of the gift card component 368 may be a pointer instead of an actual value that identifies the gift card component 368. During a checkout process, when the barcode 380 is scanned by a scanning device at a POS terminal, a pointer value for the barcode 380 can be identified from the scan and used by the POS terminal to identify an actual value that identifies the gift card component 368 and is stored in a data store or other computer system described herein. This configuration can be beneficial to securely identify the gift card component 368 when the PIN, access code, or other identifying information for the gift card component 368 is hidden or covered by the scratch-off material 382. The actual reference value that is identified by using the pointer from scanning the barcode 380 can be a different value than the PIN, access code, or other identifying information that is hidden by the scratch-off material 382. Therefore, when the gift card component 368 is identified using the scan of the barcode 380 and the associated reference value that is predetermined and stored for the gift card component 368, the PIN, access code, or other identifying information that is hidden by the scratch-off material 382 may not be compromised.

In some implementations, the PIN, access code, or other identifying information for the gift card component 368 may be visible. When the barcode 380 is scanned, the POS terminal can determine whether the reference value associated with the barcode 380 is already associated with the PIN for the gift card component 368. This can be a way to ensure that the correct gift card component 368 is being purchased and thus has not been compromised by a potentially malicious actor in the retail environment.

If the POS terminal determines that the reference value associated with the barcode 380 is associated with a PIN of a different card component (e.g., a card that has already been purchased, a card that has been associated with a different sleeve or envelope component), then the POS terminal can return an alert, request the guest to pick a different gift card component, cancel the checkout process, call over a team member to assist with the checkout, etc.

During the checkout process, the guest can scan the barcode 377 of the sleeve component 360 and the barcode 380 of the gift card component 368. The POS terminal can determine whether values associated with the scanned barcodes 377 and 380 are already associated with each other and/or with other components. If the scanned barcodes 377 and 380 have not yet been associated with any components, the POS terminal can determine the components can be associated with each other and then proceed with the purchase/activation process. If the scanned barcodes 377 and 380 are already associated with each other, the POS terminal may also determine that this is a proper assembly of components and proceed with the purchase/activation process. If the scanned barcodes 377 and 380 are associated with other components, the POS terminal can determine that one or both of the components have been compromised. The POS terminal can generate an alert as described above and/or prompt the guest to select one or both different components to combine and purchase.

In some implementations, the gift card component 368 may not include the scratch-off material 382 because the gift card may not have a PIN or access code printed thereon. Thus, when the POS terminal determines that the components can be associated with each other and the POS terminal proceeds with the purchase/activation process, the POS terminal (or a backend computer system described herein, such as the system 216), can generate a PIN, access code, or other identifying information for the gift card component 368 (which otherwise would have been predetermined for the gift card component 368 and potentially printed onto the component 368 and covered by the scratch-off material 382). The generated value can be guest-assigned and stored in a data store or other computer system described herein, in association with the combined components 368 and 360. In some implementations, the PIN may not be printed onto the gift card component 368 but can be predetermined for the component 368 and stored in the data store or other computer system. Once the POS terminal or other computer system determines that the component 368 is properly combined with the sleeve component 360 as described above, the POS terminal can retrieve the predetermined PIN for the gift card component 368 and associate the predetermined PIN with the combined components 368 and 360.

Figure 3I:
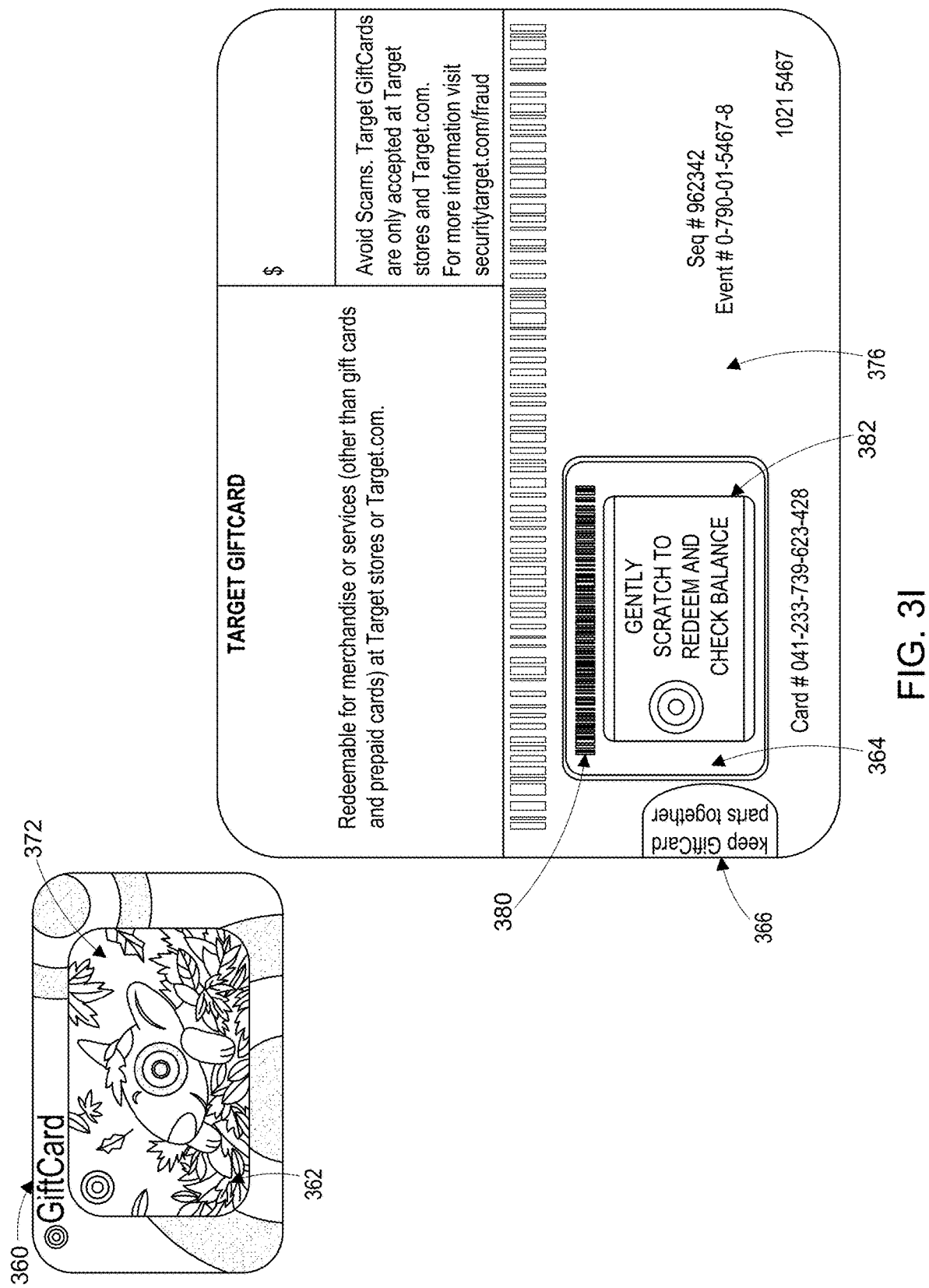

FIG. 3I shows the gift card component 368 and the sleeve component 360 of FIG. 3H when they are properly assembled with each other. As shown and described herein, the artwork 372 of the gift card component 368 is clearly visible through the opening 362 of the sleeve component 360, visibly indicating that the components 368 and 360 have been properly assembled. Similarly, the barcode 380 and the scratch-off material 382 of the gift card component 368 are visible through the opening 364 on the back surface 376 of the sleeve component 360, visibly indicating that the components 368 and 360 have been properly assembled. The tab 366 has also been folded over an edge of the sleeve component 360 that defines an opening through which the gift card component 368 was received, thereby sealing the gift card component 368 inside the sleeve component 360.

Figure 4A:
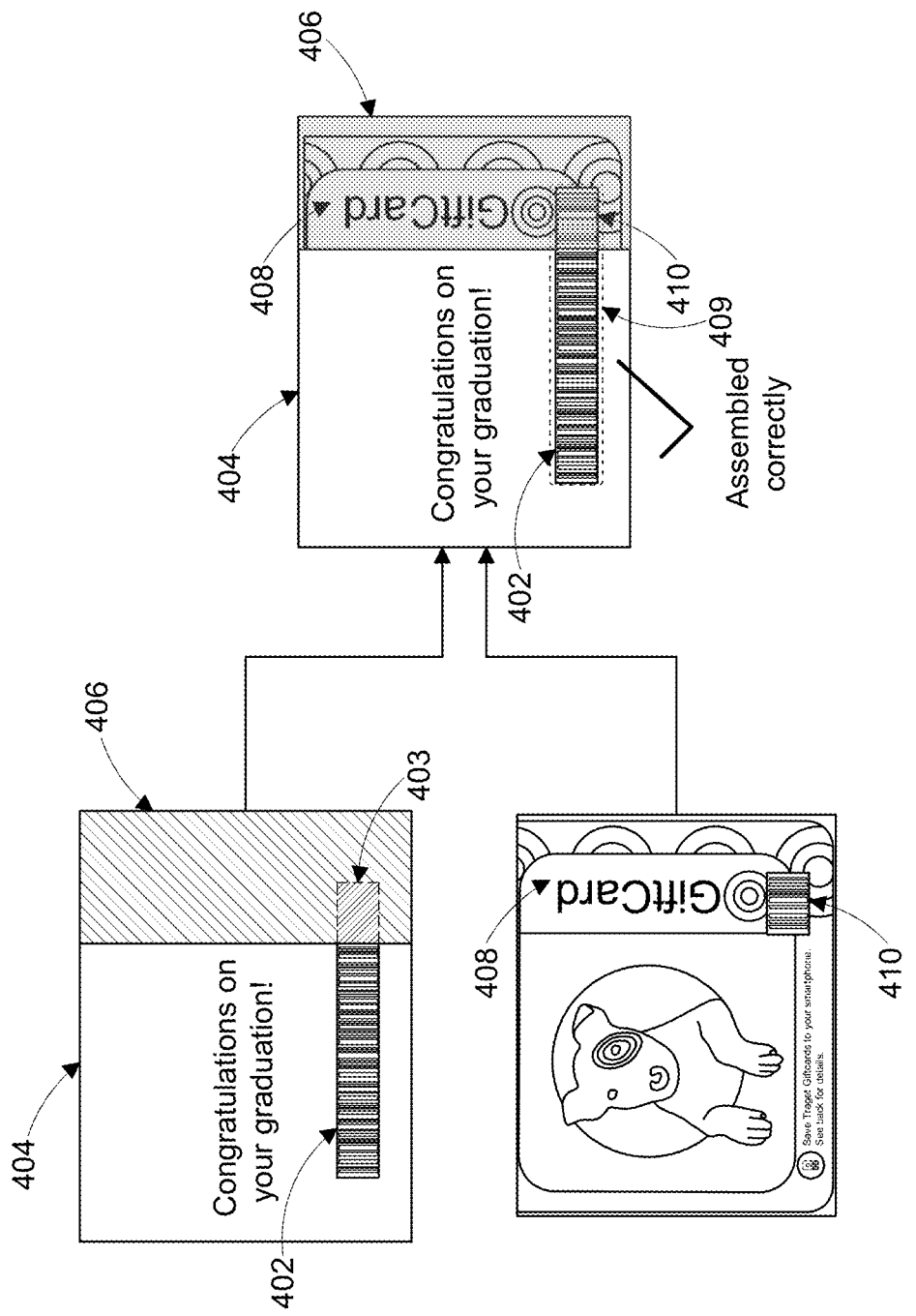
FIGS. 4A, 4B, 4C, and 4D illustrate example assemblies of gift card and envelope components that can be affixed to each other using the disclosed techniques.

FIGS. 4A, 4B, 4C, and 4D illustrate example assemblies of gift card and envelope components (e.g., decoupled gift card components) that can be affixed to each other using the disclosed techniques. FIG. 4A is a conceptual diagram of an example gift card component 408 sliding into and being appropriately attached to an envelope component 404 having a window 406, which is similar to the envelope and card components of FIG. 3E.

Here, the envelope component 404 may include an incomplete barcode 402. If the incomplete barcode 402 is scanned by a scanning device (such as during a checkout process), the envelope component 404 may not register or the scanning device can return an error message indicating that an incomplete barcode has been scanned. The barcode 402 of the envelope component 404 can be made complete by aligning and pairing the barcode 402 with a barcode 410 of the gift card 408. The barcode 410 may also be an incomplete barcode such that scanning only the barcode 410 may also cause the scanning device to return an error message or other similar alert.

The envelope component 404 may include an indication 403 on a portion of the envelope component 404, such as the transparent window 406. The indication 403 can provide a visualization of where the barcode 410 of the gift card 408 may be placed to align with the barcode 402 of the envelope component 404 and thus create a complete barcode 409. The indication 403 may also provide a visualization to help customers understand and know how to attach or otherwise combine the gift card 408 with the envelope component 404. Once the gift card 408 is correctly placed inside the envelope component 404 and the barcode 410 of the gift card 408 aligns with the barcode 402 (e.g., by positioning the barcode 410 of the gift card 408 within the indication 403 printed on the envelope component 404), the combined barcode 409 can be scanned by the scanning device to purchase the combined gift card 408 and envelope 404. In other words, the barcodes 402 and 410 can be scanned/read at the same time to register and purchase the combined gift card 408 and envelope 404.

In some implementations, the barcodes 402 and 410 can make up portions of a QR code. When the envelope 404 and the card 408 are affixed to each other, the barcodes 402 and 410 can create one combined QR code, as described above in reference to the combined barcode 409.

Figure 4B:
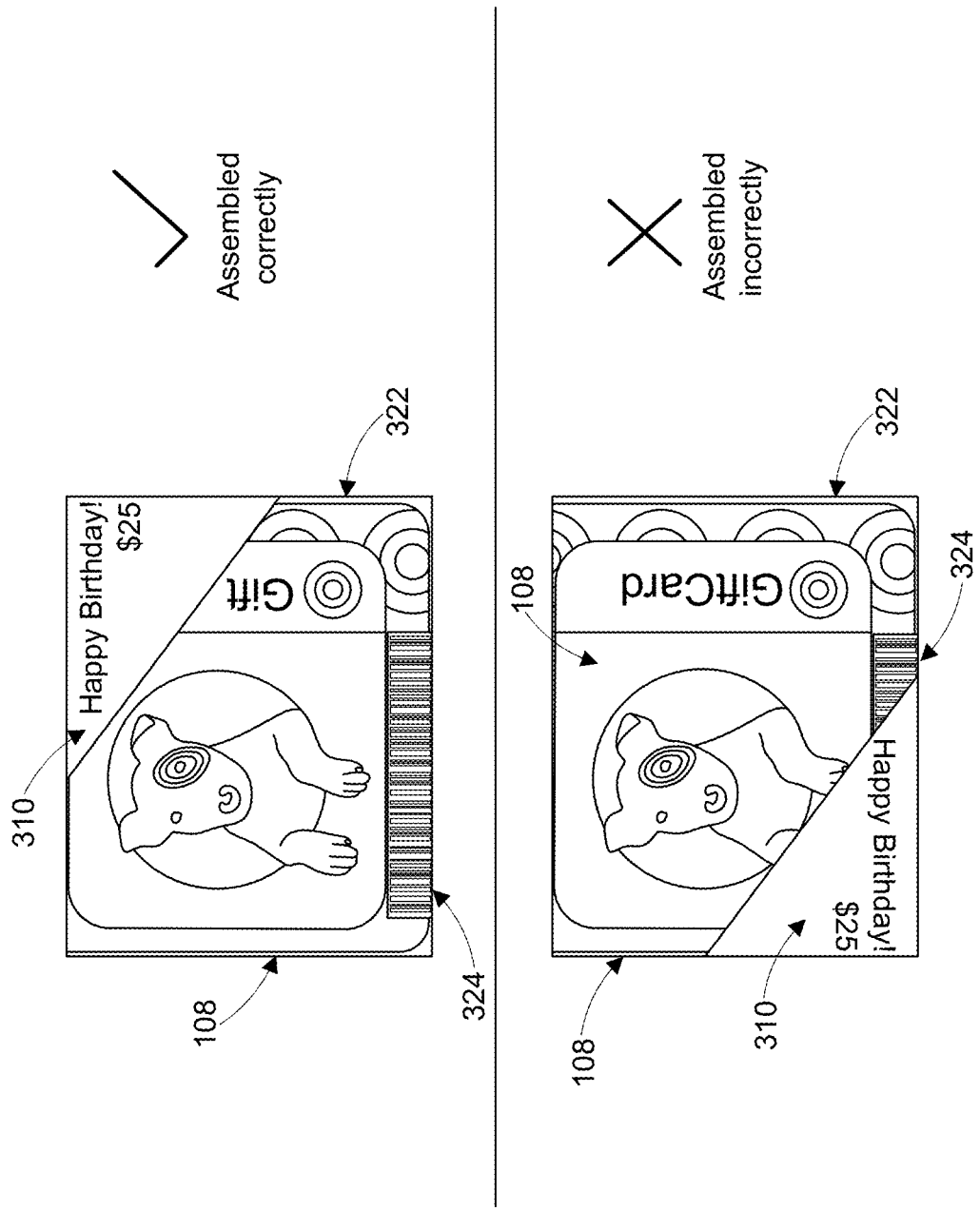

FIG. 4B is a conceptual diagram of example assemblies of the gift card component 108 and the envelope component 310 that wraps around at least one edge 322 of the gift card 108, as shown and described further in reference to FIG. 3D. A correct assembly of the gift card 108 and the envelope 310 is when the envelope 310 is positioned and attached to a top right corner of the gift card 108 along the edge 322 of the gift card 108. In this position, the barcode 324 of the gift card 108 is fully visible, and thus can be accurately scanned to purchase the combined gift card 108 and envelope 310. If the envelope 310 is positioned and attached to a bottom left corner of the gift card 108 (or a bottom right corner of the gift card 108), then the envelope 310 may cover a portion of the barcode 324 of the gift card 108. If the barcode 324 is covered, then the barcode 324 may not be scanned to purchase the combined gift card 108 and envelope 310. If a customer decides to attach the envelope 310 to the top left corner of the gift card 108, then any text or design on the envelope 310 may appear upside down or inverted. Although the placed envelope 310 may not cover up/obscure the barcode 324, the text on the envelope 324 may not be easily read. Thus, the assembly may be incorrect, which can help the customer to intuitively determine a correct orientation for attaching the envelope component 310 to the gift card 108.

In some illustrative examples, the gift card 108 and/or the envelope component 310 may have a graphic element and/or additional barcode that can be used to visually determine whether the customer appropriately attached the gift card 108 and the envelope component 310. If the graphic element and/or the additional barcode is visible after attachment of the components 108 and 310, then it can be determined that the components 108 and 310 were not correctly attached to each other. As another example, two barcodes can be applied to the gift card 108 and/or the envelope component 310. Both barcodes can be formatted differently. Only one of the barcodes may be scannable. Therefore, if the scannable barcode is covered up and the unscannable barcode is not covered, then the attachment of the components 108 and 310 is incorrect. As yet another example, the barcode 324 of the gift card 108 can be longer than a typical, scannable barcode. The envelope component 310 may be correctly attached to the gift card 108 if it covers a designated portion of the barcode 324, such as a portion of the barcode 324 that is not scannable. When the unscannable portion of the barcode 324 is covered, the remaining portion of the barcode 324 can be read/scanned, thereby indicating that the assembly of components 108 and 310 is correct.

Figure 4C:
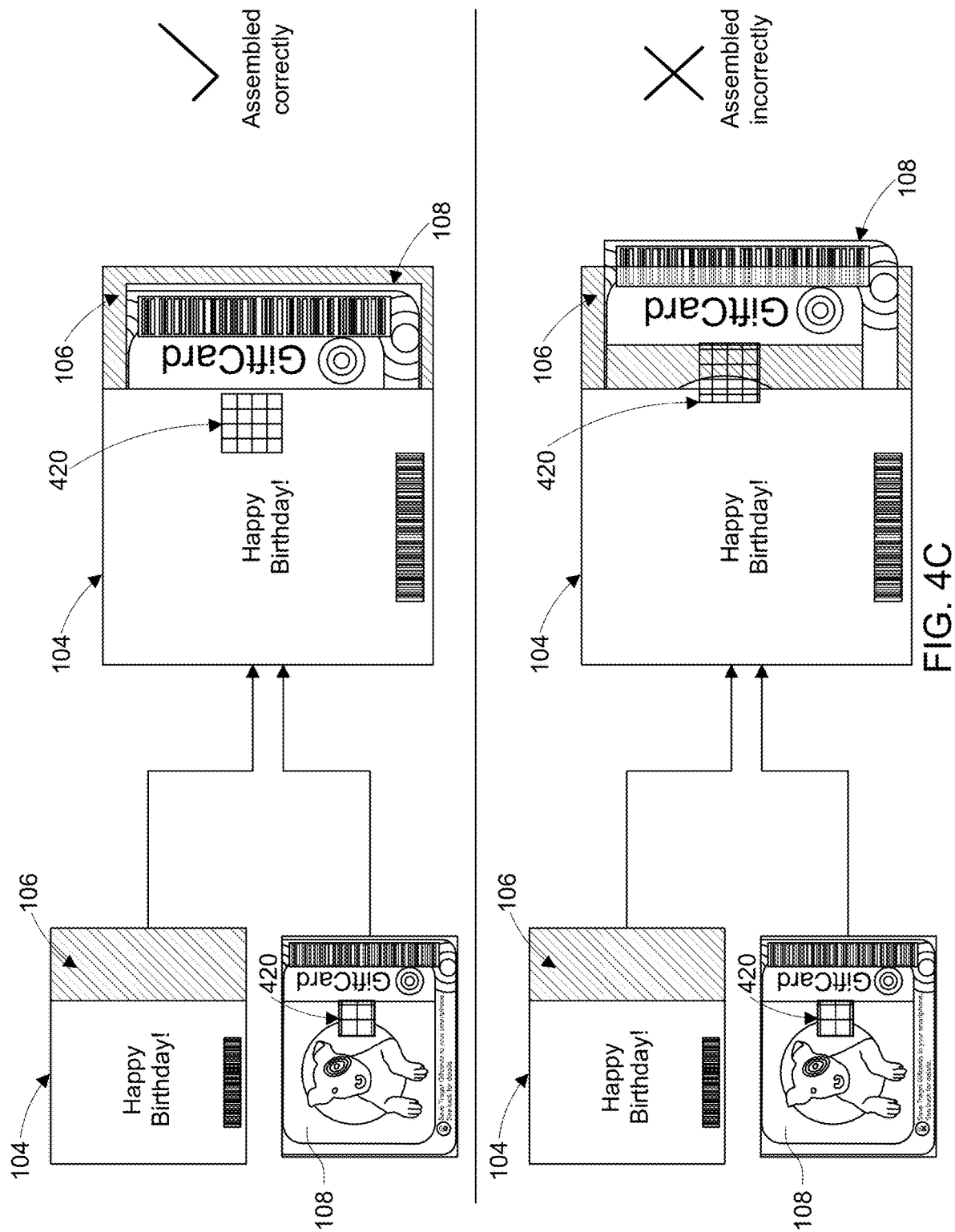

FIG. 4C is a conceptual diagram of example assemblies of the gift card component 108 and the envelope component 104, where the gift card component 108 includes an alignment indicator 420. The gift card component 108 and the envelope component 104 may be correctly assembled if the alignment indicator 420 on the gift card component 108 is no longer visible once the card component 108 is positioned inside envelope component 104 as described herein.

On the other hand, if any portion of the alignment indicator 420 is visible once the gift card component 108 is placed inside the envelope component, then the components 108 and 104 may not be assembled correctly.

Figure 4D:
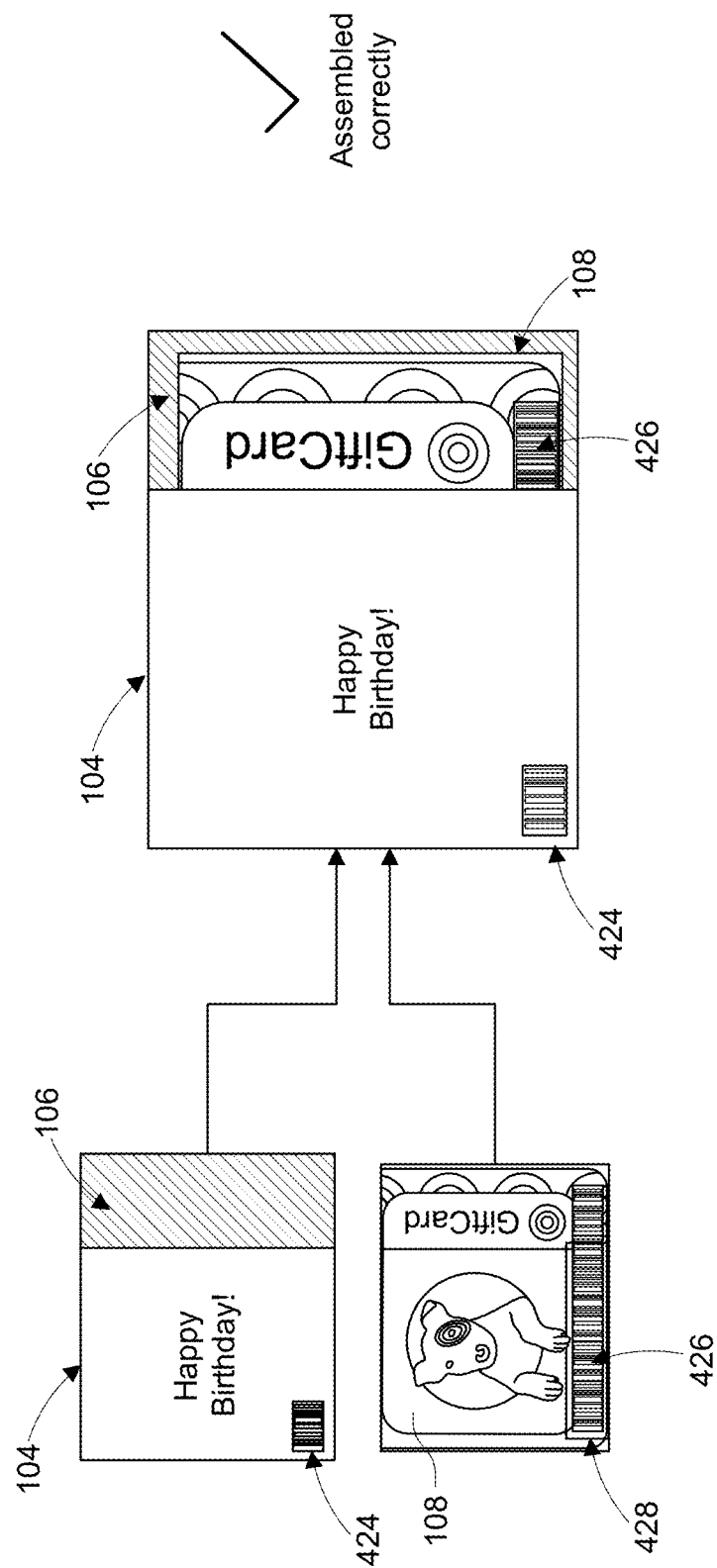

FIG. 4D is a conceptual diagram of an example assembly of the gift card component 108 and the envelope component 104 where a portion 428 of the barcode 426 of the gift card component 108 must be covered in order for a proper scan of the gift card component 108 to be made. The portion 428 of the barcode 426 may be surrounded by a visual indicator to show that the portion 428 should be covered by the envelope component 104 once the gift card component 108 is placed inside the envelope component 104. The envelope component 104 may also have its respective barcode 424, which can remain visible once the components 104 and 108 are combined. As a result the barcode 426 that is not covered by the envelope component 104 and the barcode 424 of the envelope component 104 may be scanned to purchase the combined components 104 and 108.

Figure 5A:
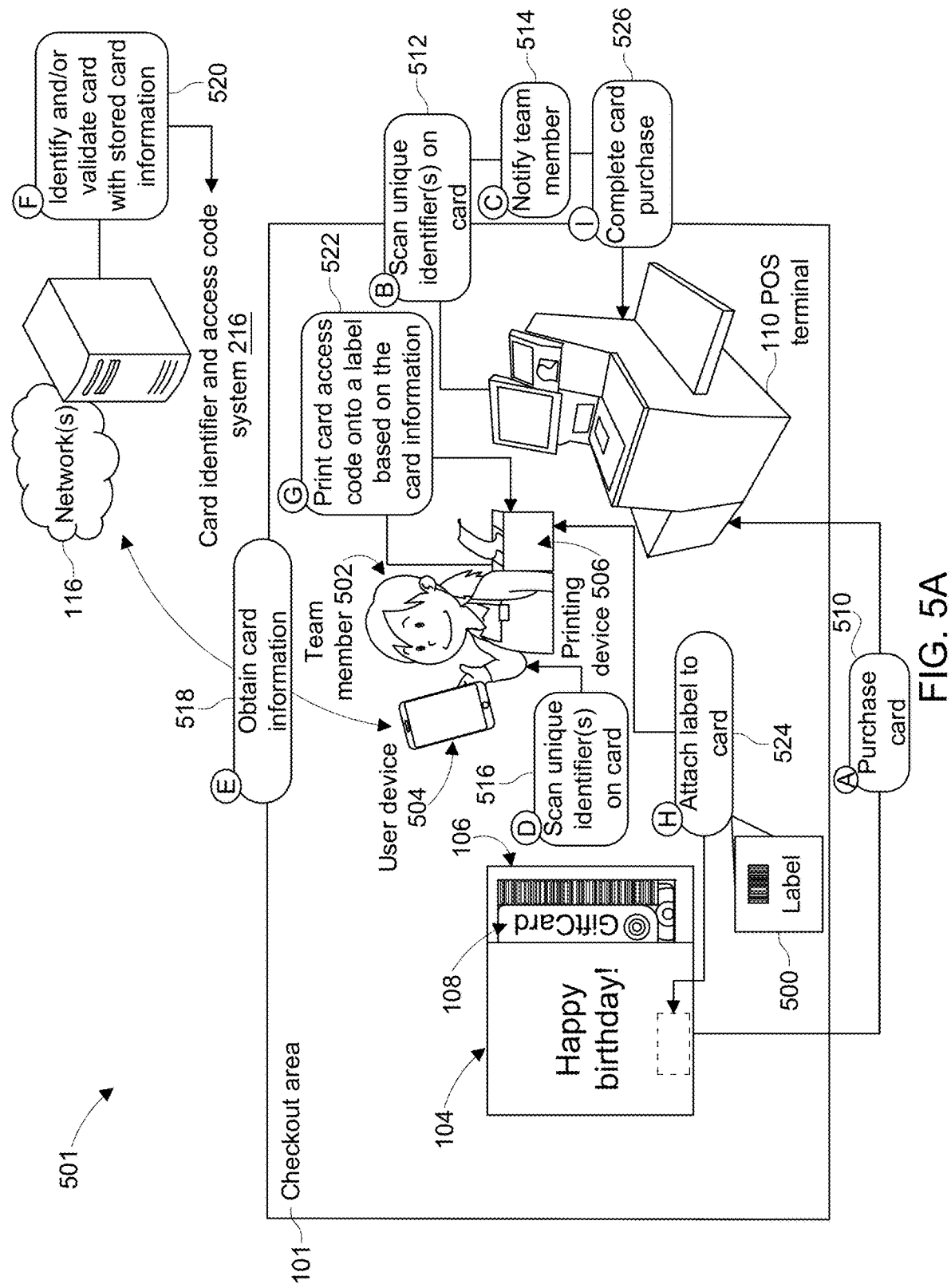
FIG. 5A is a conceptual diagram of a system for purchasing and activating a gift card component affixed to an envelope component using printable labels during a checkout process.

FIG. 5A is a conceptual diagram of a system 501 for purchasing and activating the gift card component 108 affixed to the envelope component 104 using printable labels 500 during a checkout process (e.g., decoupled gift card components). At time of purchase during the checkout process, a label having a barcode or other unique identifier can be printed and applied to the combined components 104 and 108, which can be used to complete the purchase during the checkout process and activate the card.

In the system 501 of FIG. 5A, a customer can bring a combined gift card 108 and 104 to the POS terminal 110 in the checkout area 101. The customer can begin a checkout process to purchase the combined card 108 and envelope 104 (block A, 510). A unique identifier on the card 108 can be scanned at the POS terminal 110, as described in reference to FIG. 1A (block B, 512). The POS terminal 110 may register that a gift card has been scanned, and thus notify a team member 502 to assist the customer with completing the purchase of their gift card (block C, 514).

The team member 502 may approach the customer at the POS terminal with their user device 504. The user device 504 can include one or more scanning devices and/or cameras, which can be used to view information about the scanned card 108, generate and/or print labels for gift cards that are being purchased, etc. The team member 502 may also have a printing device 506, which can be a label printer. The printing device 506 can be mounted on the team member 502's hip. The printing device 506 can be in communication (wired, wireless) with the user device 504 via the network(s) 116 and configured to receive instructions from the user device 504 to print labels with barcodes and/or other unique identifiers.

The printing device 506 can be any variety of printers in the retail environment. The printing device 506 can, in some implementations, include a label printer, which can be positioned in the checkout area 101 at each belted checkout lane (e.g., each manual checkout lane that is operated by a team member). A fast and reliable connection can be established between the printing device 506 and the POS terminal 110 and/or the printing device 506 and the user device 504. For example, connectivity can be established via a USB connection and/or a network connection (e.g., cable, wired, wireless, WIFI, BLUETOOTH). The USB connection can be a fast, less complex, and reliable communication means. The network connection can allow each network-connected printer to be installed at a checkout lane and associated by name and/or IP address to the POS terminal 110 in the lane. Print requests from the POS terminal 110 can then be sent through the network to the printing device 506 in the same checkout lane as the POS terminal 110. Sometimes, a cabled Ethernet network connection can be made, which can provide reliable and secure connectivity. In some implementations, a WIFI network connection may be established. In yet some implementations, a BLUETOOTH connection can be established, such as between the user device 504 and the printing device 506. The BLUETOOTH connection can be advantageous where the printing device 506 is a hip-mounted or mobile printer that is carried by the team member 502. The hip-mounted printer may be dedicated to the task of printing labels and can have specific label stock paper loaded into the printer for performing such tasks. The hip-mounted printer can then be brought to any checkout lane in the checkout area 101 for rapid and efficient printing of labels for gift cards being purchased.

The team member 502 can use their user device 504 to scan the unique identifier(s) on the gift card 108 (block D, 516). The scanned information can be transmitted from the user device 504 to the card identifier and access code system 216 via the network(s) 116 to obtain card information (block E, 518). The card identifier and access code system 216 can identify and/or validate the card 108 with stored card information according to the scanned information from the user device 504 (block F, 520). The card identifier and access code system 216 can transmit the card information back to the user device 504 (block E, 518). Once the user device 504 receives the card information, the team member 502 can select options presented in a graphical user interface (GUI) display at the user device 504 to print a card access code (e.g., a PIN) onto a label based on the card information (block G, 522). The user device 504 may generating printing instructions, which are then transmitted to and executed by the printing device 506 to print the card access code on the label 500.

Sometimes, the card access code may already be associated with the particular card 108 and stored in a data store. The card access code can then be retrieved from the data store by the card identifier and access code system 216 when identifying and/or validating the card in block F (520). As another example, the system 216 can determine in block F (520) that the scanned card identifier is not yet associated with any stored card information. Accordingly, the system 216 may generate a new access code in block F (520) and transmit that access code back to the user device 504 to be printed on the label 500.

Once the label 500 is printed with the access code for the particular card 108 (block G, 522), the label 500 can be attached to the card 108 and/or the envelope 104 (block H, 524). For example, the envelope component 104 may include a visual indication indicating where the label 500 should be placed. In some implementations, the label 500 can be placed/affixed to any surface (e.g., front or back) of the envelope component 104. In examples where the gift card component 108 is not fully enclosed within the envelope component 104, the label 500 can be affixed directly to the card 108.

The customer can then complete purchase of their card 108 at the POS terminal 110 (block I, 526). For example, the customer can scan the access code (e.g., barcode, QR code) using a scanning device at the POS terminal 110. The access code can be scanned in combination with the barcode or other unique identifier already affixed to the card component 108 (and/or already affixed to the envelope component 104). Sometimes, the POS terminal 110 can communicate with the card identifier and access code system 216 as described in reference to FIG. 1A to verify that the access code on the label 500 is associated with the particular card component 108 and thus authorize the purchase and activation of the card 108.

In some implementations, the customer may approach the POS terminal 110 in the checkout area 101 with the card component 108 and the envelope component 106 as separate components, rather than assembled. Once the label 500 is printed and attached to either the card 108 or the envelope 106, the components 108 and 106 can be assembled as described herein. The label 500 may include adhesion properties that permit it to be permanently affixed to the card 108 and/or the envelope 106. For example, the label 500's adhesion properties may include but is not limited to one or more types of tape, double-sided tape, and/or glues. The adhesion properties may also correspond to a type of material used for the card 108 and/or the envelope 106. For example, if the card 108 is made of a paper cardstock, then the label 500 can include adhesion properties that allow for permanent attachment to the type of paper cardstock material of the card 108.

In some illustrative examples, the envelope component 104 may not be accessible by customers on displays in a retail environment. The envelope component 104 may be provided via a dispenser and/or by the team member 502 once the customer scans the identifier(s) on the card 108 in block B (512). The team member 502 can then retrieve the envelope component 104 once the card identifier and access code system 216 identifies and/or validates the card 108 in block F (520). The team member 502 can subsequently apply the label 500 to the retrieved envelope component 104 before the customer or the team member 502 permanently affixes the gift card component 108 to the envelope component 104.

In some illustrative examples, the printing device 506 can be configured to receive the gift card component 108 and/or the envelope component 104 directly. Then, executing the print instructions can cause the printing device 506 to print the label 500 (or the card access code) directly onto the received gift card component 108 or the envelope component 104. As mentioned above, the access code can be generated in real-time, during the checkout process at the POS terminal 110.

Figure 5B:
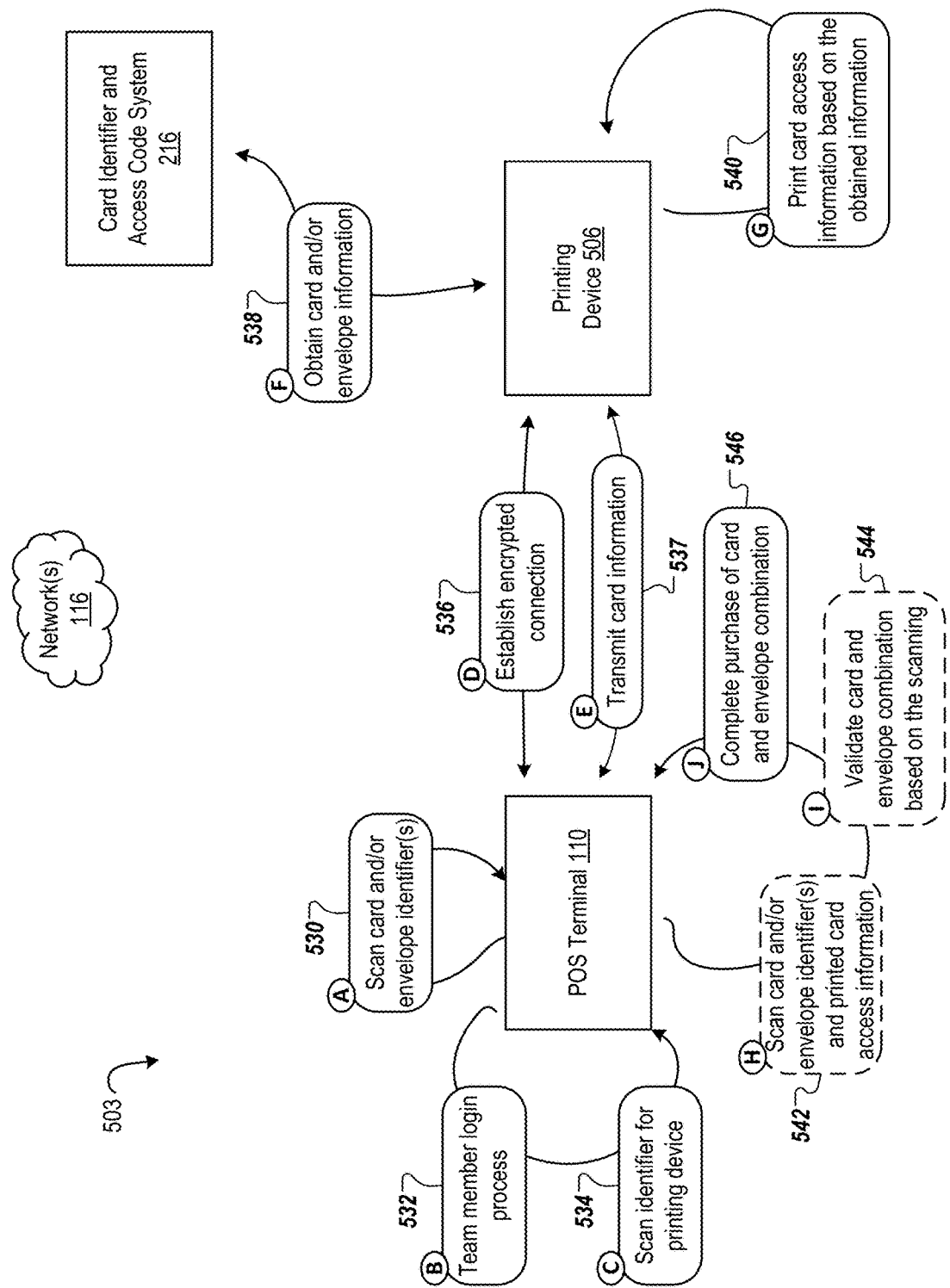
FIG. 5B is a conceptual diagram of a system for establishing a secure network connection to print card access information on a gift card component during a checkout process.

FIG. 5B is a conceptual diagram of a system 503 for establishing a secure network connection to print card access information on a gift card component during a checkout process. The system 503 is similar to the system 501 and may include same, similar, and/or different components than described in the system 502 of FIG. 5A. In FIG. 5B, the system 503 includes the POS terminal 110, the printing device 506, and the card identifier and access code system 216, all of which may communicate (e.g., wired, wirelessly) via the network(s) 116.

Before a secure network connection can be established between the POS terminal 110 and the printing device 506, a checkout process begins at the POS terminal 110. A guest at a self-checkout lane or a team member at a regular checkout lane can scan a gift card and/or envelope (e.g., sleeve) component identifier(s) (block A, 530), as described throughout this disclosure.

Scanning the identifier(s) at the POS terminal 110 can prompt an alert, notification, or instructions for a team member login process to be performed in block B (532). Block B (532) can be performed during a self-checkout process. In some implementations, the team member may not be prompted to login at the POS terminal 110 if the team member is already performing the checkout process at a regular, manual checkout lane. The login process can be performed whenever a gift card is being purchased and/or activated and before the purchase and activation can be completed. The team member can provide their login credentials and/or access information at the POS terminal 110 in block B (532). Once the team member provides their credentials, the POS terminal 110 can verify those credentials in order to allow the team member to take control of the checkout process at the self-checkout lane. In some implementations, the POS terminal 110 can securely transmit the team member's credentials to a backend computer system. The backend computer system can be configured to verify the team member's provided credentials against records indicating credentials for different team members in the retail environment. The backend computer system can return a notification to the POS terminal 110 of whether the team member's credentials are verified In response to logging in, the team member can be prompted at the POS terminal 110 to scan an identifier for the printing device 506 in block C (534) using a scanning device at the POS terminal 110. The printing device 506 can include a QR code, SKU, barcode, or other identifier that can be printed onto a surface of the printing device 506 and/or digitally displayed on a screen of the printing device 506. The team member can scan that QR code of the printing device 506 in block C (534).

Once the team member is logged in and the identifier for the printing device 506 is scanned, the POS terminal 110 can establish an encrypted tunnel connection between the POS terminal 110 and the printing device 506 (block D, 536). The connection can be established over a secure local store network. The encrypted tunnel connection can be established to complete the pairing process between the POS terminal 110 and the printing device 506. Information transmitted through this connection can be secured from interception by potentially malicious actors or other users. The information transmitted through this connection can include but is not limited to card and/or envelope identifying information and printing instructions.

In some implementations, instead of pairing the POS terminal 110 with the printing device 506, the same or similar operations can be performed to securely pair the printing device 506 with the user device 504 described in FIG. 5A. Printing instructions and/or card/envelope identifying information can then be securely transmitted and encrypted between the user device 504 and the printing device 506.

Still referring to FIG. 5B, card information can be transmitted securely between the POS terminal 110 and the printing device 506 in block E (537). This information can include the scanned identifier(s) in block A (530). Sometimes, the information that is being transmitted can include a card access number, a card number, or a combination thereof. The printing device 506 can establish a secure/encrypted connection with the card identifier and access code system 216 to obtain card and/or envelope information in block F (538). The information can be obtained by providing/using the scanned identifier(s) or other card information from block E (537). Sometimes, the POS terminal 110 can establish a secure and encrypted connection with the system 216 to obtain the card and/or envelope information in block F (538), then transmit the obtained information to the printing device 506 in block E (537) using the secure and encrypted connection.

Using the card and/or envelope information, the printing device 506 can print card access information in block G (540). As described herein, the printing device 506 can receive the card and/or envelope and print the access information directly onto the card and/or envelope. For example, the access information can be printed on one or both sides of the card. As another example, the access information, such as an access code can be printed on a portion of a back surface of the card. Even if the access code is generated during the checkout process as described in some implementations herein, this generated access code can be printed onto the card, envelope, and/or a label. Sometimes, the card may not have any information on it, and identifying information can be printed onto the card in block G (540). Rather, the card may have a barcode encoded with an identifier for an image printed on the card, the encoded identifier being used to identify the card and associate the card with the access information to be printed onto the card. Such an implementation can secure the card further by ensuring that sensitive card information is not available on the card while the card is on display, before a checkout process. As another example, the card may have only some information already printed on it before sensitive information, such as a card access code, is printed onto the card using the printing device 506. Sometimes, the printing device can print the access information onto a label, which then is applied to the card and/or envelope. Refer to FIGS. 5A and 5C for further discussion about printing the access code. Because the access information can be printed during the checkout process in the retail environment, such access information may be secure and inaccessible before purchase of the card and envelope.

In some implementations, printing instructions can be generated at the POS terminal 110 and transmitted to the printing device 506 via the encrypted connection as part of the card information in block E (537). Sometimes, the printing instructions can be generated by the system 216 and transmitted to the printing device 506 via the secure connection as part of the obtained information in block F (538). In yet some implementations, the printing instructions can be generated by the printing device 506 and in response to receiving the card information from the POS terminal 110 in block E (537) and/or the information from the system 216 in block F (538).

The printing device 506 can transmit a notification back to the POS terminal 110 using the secure connection and once the access information has been printed (block E, 537). The POS terminal 110 may optionally prompt the guest to scan the card and/or envelope identifier(s) as well as the printed card access information (block H, 542). The POS terminal 110 can optionally validate the card and envelope combination based on the scanning performed in block H, 542 (block I, 544). Validating the combination can be performed using any of the techniques described herein. The purchase of the card and envelope combination can then be completed in block J (block 546), based on validating the combination, adding value to the combination, and/or activating the combination.

Advantageously, the system 503 can provide for creating and/or associating identifying information for the card, envelope, or combination thereof at the point of sale, during the checkout process. As a result, the card, envelope, or combination thereof can be secured from potentially malicious activity. The disclosed system 503 also implements durable and familiar card components are used in the retail environment, ensuring a seamless transition to these secure techniques in the retail environment. The card components may be sustainable paper-based materials, in some implementations. The disclosed system 503 still may ensure that an initial card value is printed on the card, even if the access information is not printed onto the card until during the checkout process. Therefore, guests can select the card having the value that they desire before they begin the checkout process. Although the checkout process may be different or new using the disclosed gift card components, the card may still appear familiar to guests because the card has the initial value printed thereon, which can help the guests seamlessly transition to the new checkout process.

In some implementations, existing technology in the retail environment may be implemented in the system 503, thereby allowing for efficient and simple implementation of the disclosed technology in retail environments. For example, the printing device 506 can be existing printers at the POS terminal 110, in a checkout area, and/or mobile/carried by the team members in the retail environment (e.g., a hip-mounted printer). In some implementations, the printing device 506 can include a check printer at one or more checkout lanes. Inks used by the printing device 506 can include permanent inks that may not wash away or be tampered with. The printing device 506 can use any other variety of inks and/or printing techniques, including but not limited to thermal inks, ribbons with wax coatings, impact printers, etc.

In self-checkout implementations, the card access information can be printed onto the card using a user device of a team member. For example, the user device, instead of the POS terminal 110, can generate and transmit printing instructions to the printing device 506 to print the card access information on the card. The printing device 506 can be a mobile printer that is carried by the team member and in secure network communication with the user device. In checkout implementations where a team member performs a checkout process for the guest, the team member may establish the secure connection between the POS terminal 110 and the printing device 506, which may be local at or otherwise part of the POS terminal 110.

FIG. 5C is a conceptual diagram of a process 570 for printing card access information onto a label 560 for a gift card component 552 during a checkout process. The card access information can be printed onto the label 560 (or directly onto the gift card component 552) using the printing device 506 described in reference to at least FIGS. 5A and 5B. In some implementations, the printing device 506 can be a mobile printer, which can be carried by a team member in a retail environment. The printing device 506 can then connect with one or more other devices in the retail environment, such as a POS terminal and/or a user device of the team member, to establish a secure connection for transmitting card access information and printing instructions between the devices, as described in reference to FIGS. 5A and 5B.

In the example process 570, a scanning device 551 can be used by a team member or other relevant user in the retail environment to scan an identifier 554 on the gift card component 552 (block A, 550). The identifier 554 can include, in some implementations, a barcode. The identifier 554 can include one or more other machine readable values, including but not limited to QR codes, labels, SKUs, card numbers, etc. In some implementations, a card number or other identifier can be printed on the card in values that do not include numeric characters. Human readable characters or other values can then be printed as the card access information on the label 560 as described herein.

The scanning device 551 can securely transmit card information based on the scan to the printing device 506 (block B, 556). A secure network connection may already be established between the scanning device 551 and the printing device 506, as described in reference to FIG. 5B. The card information can include a value corresponding to the scanned identifier 554. For example, the scanned identifier 554 can be a pointer that points to a card number, access number, or other human readable identifier for the gift card component 552 that is stored in a data store or computer system described herein. In some implementations, the scanned identifier 554 can be the card number or other identifying information for the gift card component 552.

As described herein, the card information transmitted in block B (556) can include an access number/code or PIN that is predetermined and stored in association with the gift card component 552, the access number being identifiable via the scanned identifier 554. As another example, the card information transmitted in block B (556) can include an access number/code or PIN that is generated in real-time, in response to scanning the identifier 554 of the gift card component 552 during a checkout process.

The card information transmitted in block B (556) can include printing instructions. The printing device 506 can execute the printing instructions to print card access information onto the label 560 (block C, 558). The label 560 can be a sticker or other material that can be affixed to a portion of the gift card component 552. The printing instructions can cause the printing device 506 to print at least an access number 562 (e.g., access code, PIN) onto the label 560. Additionally or alternatively, the printing instructions can cause the printing device 506 to print a barcode 564 or other identifier onto the label 560. In some implementations, the barcode 564 can be preprinted onto the label 560 and the printing instructions may cause the printing device 506 to print only the access number 562 onto the label 560. Sometimes, the barcode 564 can be a pointer to the card number, the access number 562, or other identifying information that is stored in association with the gift card component 552. In yet some implementations, the printing instructions can cause the printing device 506 to print the card number or other identifying information on the label 560.

Once the card access information is printed onto the label 560, the label 560 can be applied to the gift card component 552 (block D, 566). The label 560 can be affixed to the gift card component 552 with adhesives so that the label 560 may not be removed.

The checkout process can then be completed by validating and activating the gift card component 552. For example, the access number 562, the barcode 564, or a combination thereof can be subsequently scanned by the scanning device 551 at the POS terminal to verify and validate that the appropriate label 560 was affixed to the gift card component 552.

Figure 5D:
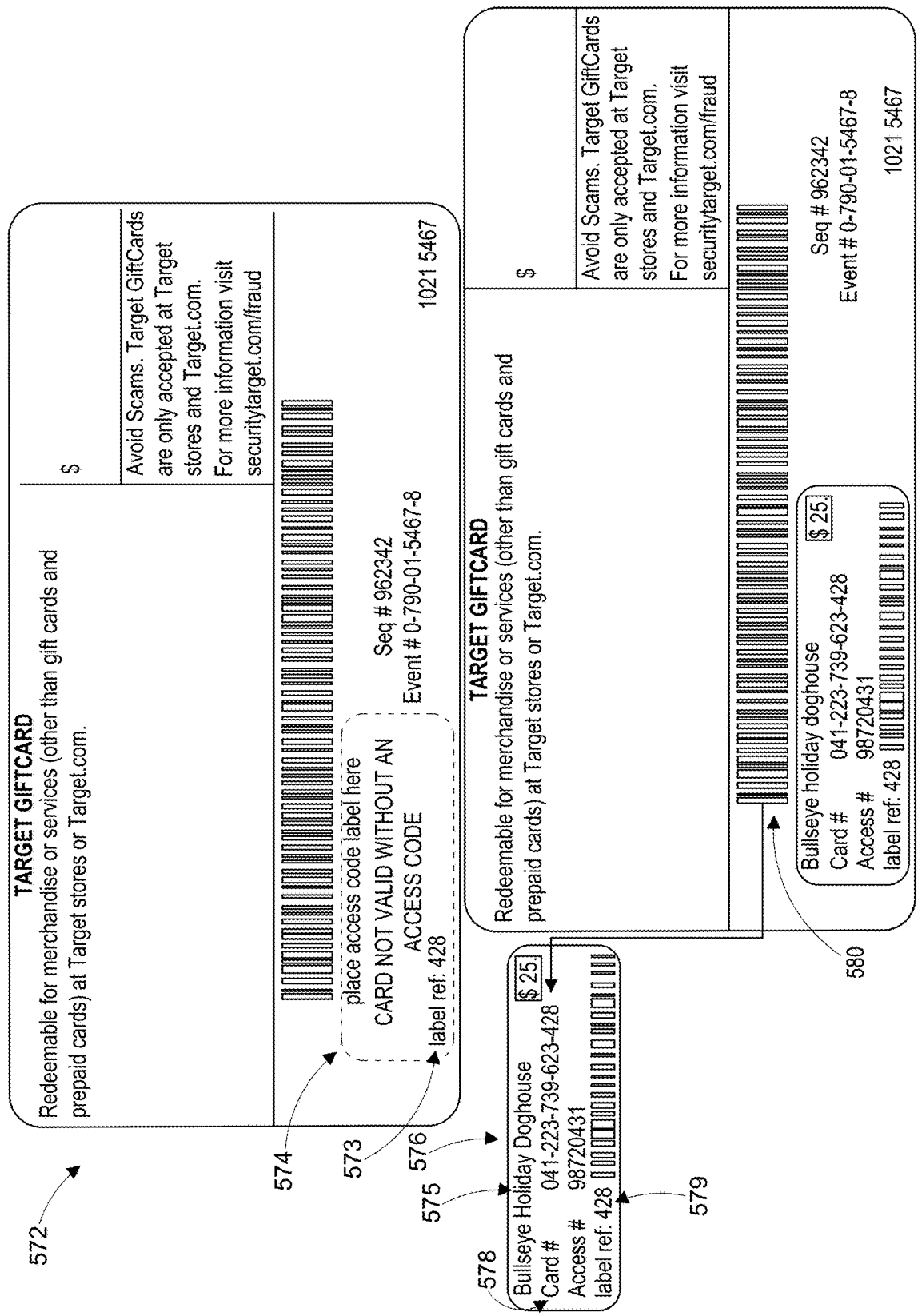
FIGS. 5D and 5E are conceptual diagrams of example access code labels that can be printed and applied to gift card components during a checkout process.

FIG. 5D is a conceptual diagram of an access code label 576 that can be printed and applied to a gift card component 572 during a checkout process. The techniques shown and described in FIG. 5D can provide solutions to assist team members and other relevant users in applying correct access code labels to respective gift card components, such as when a guest purchases multiple gift cards at a time. In some implementations, once the label 576 is printed using the techniques described herein and then applied to the gift card component 572, the gift card component 572 may not need to be combined with other components, such as an envelope or sleeve component.

The gift card component 572 can include a designated space 574 for receiving the label 576, once the label 576 is printed during the checkout process. The designated space 574 may include instructions to relevant users indicating how and/or where to attach the label 576 to the gift card component 572. The instructions may additionally or alternatively include information identifying a label that should be printed and applied to the gift card component 572. The instructions may additionally or alternatively include information indicating that the gift card component 572 may not be complete until the label 576 is applied to the gift card component 572 (and thus covering the instructions printed in the designated space 574).

During the checkout process, a barcode 580 printed onto the gift card component 572 can be scanned at a POS terminal. The barcode 580 may include a department-class-item identifier and/or a card number. Once scanned, a guest or a team member performing the checkout process can be prompted to identify a desired card value. The POS terminal can make a call to a backend computer system described herein to securely transmit information about the scanned gift card component 572. The team member may then initiate a secure connection between the POS terminal or a respective user device and a printer in the checkout area (e.g., a hip-mounted printer). Once the connection is established, the team member can scan the barcode 580 using their user device. The user device (or the POS terminal) can request access code information for the gift card component 572 from the backend computer system and using the scanned barcode 580. The backend computer system can perform a lookup process in a data store to identify the access code information that was already generated and associated with the gift card component 572. The access code information and the guest-desired card value can then be returned to the POS terminal or the user device of the team member. This information can be transmitted securely to the printing device with a label print command. The printing device can execute the label print command to print the label 576 with information such as the guest-desired card value, a card number 578 (which corresponds to the barcode 580), an access code, a barcode, and/or a label reference identifier. The team member can peel the label and apply it to the designated space 574 on the gift card component 572. The team member may further scan the access code barcode printed onto the label 576, which can be used by the POS terminal to test and/or verify that the label 576 was printed successfully and is in fact associated with the gift card component 572.

The label 576 can be of a stock material designed for durability. For example, the label 576 can include polypropylene direct thermal labels. The stock material can include durable, direct-thermal label stock, which prints directly from a printhead and may not require additional wax resin ribbon thermal-transfer supplies in a printer that is configured to print the label 576. The gift card component 572 can be made of a stock material having strong adhesion properties when the label 576 is applied thereto, thereby ensuring that the label 576 remains permanently affixed to the gift card component 572.

As shown in FIG. 5D, the designated space 574 can include a label reference 573. The label 576 can be printed with a label reference 579, which can correspond to the label reference 573 in the designated space 574. When the barcode 580 is scanned by a team member at the POS terminal, the POS terminal can use an API to access data stored in a database and identify information associated with the scanned barcode 580. That information can include a card access number and/or a value for the label reference 573. This retrieved information can be used to associate the label 576 with the gift card component 572 and also to print information such as the value for the label reference 573 as a value for the label reference 579 to be printed on the label 576.

Accordingly, the label reference 573 and 579 can be used to visually and easily match the label 576, once printed, with the appropriate card component 572. The label 576 can also include a textual description 575, which can correspond to identifying information for the gift card component 572, the identifying information being encoded into the barcode 580 of the gift card component 572 as described above. The textual description 575 can be pulled from the database described above, and printed onto the label 576 to provide a human-readable and easy-to-identify indicator for determining a gift card component for which to apply the label 576 (e.g., the textual description 575 can include a name or title that describes artwork or other information already printed onto the particular gift card component 572). In some implementations, the label reference 573 and 579 can be one or more digits from the card access number that has been generated and/or assigned for the gift card component 572 (e.g., last one or more, such as three, digits of the card access number).

Figure 5E:
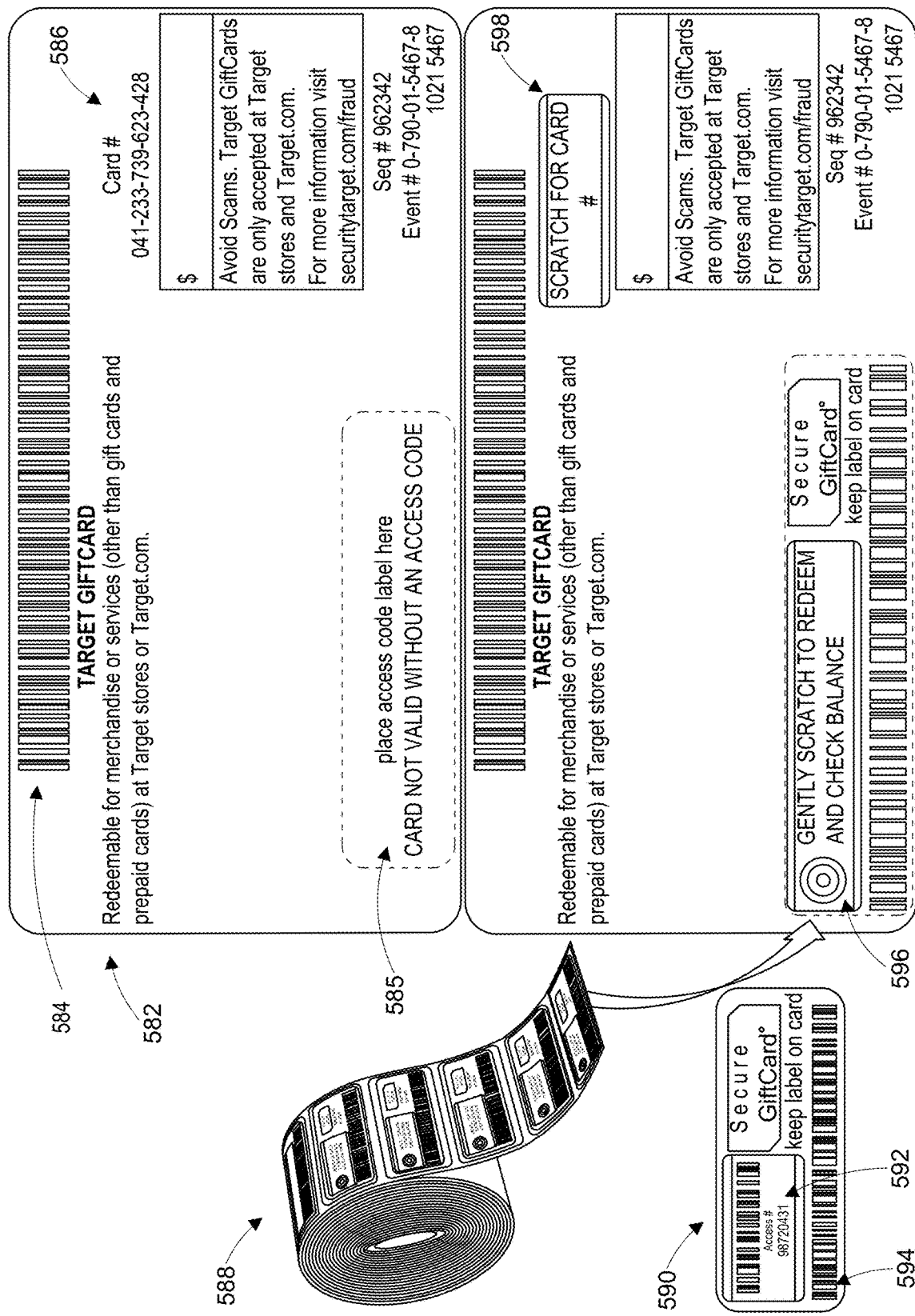

FIG. 5E is another conceptual diagram of an access code label 590 that can be printed and applied to a gift card component 582 during a checkout process. Here, the gift card component 582 can include a barcode 584, an area 585 for receiving the access code label 590, and a card number 586. A scratch off material 598 can be placed over the card number 586 to prevent it from being visible before or during the checkout process.

Labels such as the access code label 590 can be generated, printed, and available in a roll of labels 588 during the checkout process. A team member can, for example, remove the access code label 590 from the roll of labels 588 and attach the access code label 590 to the area 585 of the gift card component 582 during the checkout process. A scratch off material 596 can also be applied over the access code label 590 once attached to the gift card component 582, thereby securing information printed on the access code label 590 from view. Each access code label 590 can include predetermined/pre-generated information, such as an access number 592 and a barcode 594. The barcode 594 can provide a unique, one-time-use identifier for the respective access code label 590. The identifier encoded into the barcode 594 can be used to track the label 590 and identify an access code that has previously been associated with the label 590. The access code therefore can be hidden and protected from potentially being compromised before, during, or after the checkout process. Scratching off or removing the material 596 can reveal the access number 592 (which may also include an access number barcode), which can be different than the barcode 594 of the label 590.

As shown in FIG. 5E, the gift card component 582 may not have an access code printed on it. Rather, a POS terminal during the checkout process can identify the component 582 by a card number encoded into the barcode 584 (by scanning the barcode 584). Sometimes, the card number encoded into the barcode 584 can be the same as the card number 586, but the card number 586 may be hidden from view by the scratch off material 598. The card number 586 can indicate a type of the gift card component 582 without an access code already printed on it.

During the checkout process, the POS terminal can prompt the team member to peel the access code label 590 from the roll of labels 588 and apply the label 590 to the area 585 of the gift card component 582. The POS terminal can also prompt the team member to scan the barcode 594 on the label 590. Using the scanned barcode 594, the POS terminal can access, via an API, a database and retrieve information associated with the scanned barcode 594, as well as information associated with the barcode 584 of the gift card component 582, which can be scanned at the start of the checkout process. The POS terminal can generate an association between the gift card component 582 and the access code label 590. Sometimes, the POS terminal can use the API to ensure that both the card number 586 and an access code identifier associated with the scanned barcode 594 are associated with a same store identifier.

In some implementations, the barcode 584 of the gift card component 582 can be 26 digits in barcode 128 format. The code can include one or more of the following: a company code for all gift cards, a two-digit marketing code, a ten-digit sequence, a one-digit checksum, one or more zeros and the card component's nine-digit DPCI, and/or one or more additional one-digit checksums. In some implementations, the barcode 594 of the access code label 590 can include 26 digits in barcode 128 format. The code can include one or more of the following: a company code, a two-digit marketing code that can be reserved for access code barcodes, a random ten-digit number, a one-digit checksum, one or more zeroes and a nine-digit DPCI to identify access code barcodes, and/or one or more additional one-digit checksums. Sometimes, if the DPCI is not needed, one or more additional digits can be added to the code for increased security (e.g., up to eleven additional digits). The code can additionally or alternatively include 21 random digits and/or one or more additional one-digit checksums.

Figure 6:
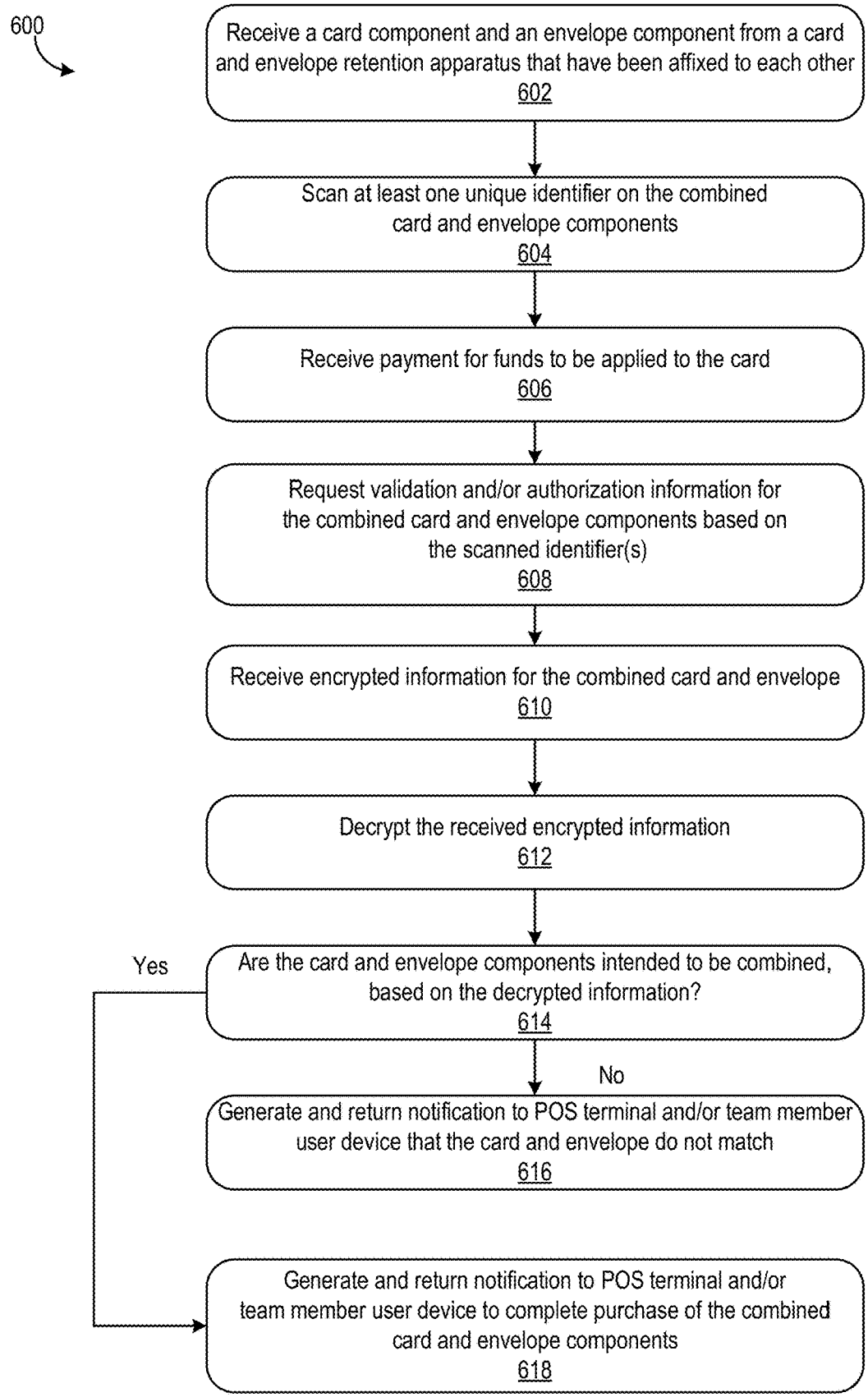
FIG. 6 is a flowchart of a process for purchasing and activating a physical gift card component affixed to an envelope component by scanning identifying information associated with each component during a checkout process.

FIG. 6 is a flowchart of a process 600 for purchasing and activating a physical gift card component affixed to an envelope component by scanning identifying information associated with each component during a checkout process. The process 600 can be performed to ensure that identifying information for a gift card is not exposed until the card is purchased and paid for during the checkout process. The process 600 can be performed by one or more system components described herein, such as the POS terminal 110, the card identifier and access code system 216, the card redemption system 214, the fraud detection system 244, and/or the user device 504. One or more blocks in the process 600 may be performed by relevant users, such as a worker or other employee at a POS terminal or checkout lane in a retail environment. The process 600 can also be performed by one or more other computing systems, devices, computers, networks, cloud-based systems, and/or cloud-based services. For illustrative purposes, the process 600 is described from the perspective of a computer system.

Referring to the process 600, the computer system can receive a gift card component and an envelope component from a card and envelope retention apparatus that have been affixed to each other in block 602. The card component and the envelope component can be permanently attached to each other as described in reference to FIGS. 3-4 by a customer who desires to purchase the gift card. The customer can attach the components to each other before bringing the combined components to a POS terminal in a checkout area of a retail environment. Refer to FIG. 1A for further discussion about the retention apparatus. Refer to at least FIG. 2A for further discussion about attaching the components to each other. In some implementations, as described in reference to at least FIG. 5A, the card and envelope components may not be attached to each other when the checkout process begins in block 602. Instead, the components may be attached to each other once the card component has been validated.

In block 604, at least one unique identifier on the combined card and envelope components can be scanned. The unique identifier(s) can include but is not limited to a barcode, QR code, SKU, etc. The identifier(s) can be scanned using one or more scanning devices at the POS terminal in the checkout area (e.g., handheld scanning devices, barcode readers, imaging devices, user computing devices). Refer at least to FIG. 1A for further discussion.

The computer system can receive payment for funds to be applied/added to the card in block 606. For example, customer purchasing the card can designate at the POS terminal how much money they would like to put onto the card. The customer can select the amount of money from a list of various dollar amounts (or other currencies), such as $10, $15, $20, $25, $50, $100, etc. The customer can manually input the amount of money desired using a key pad, touchscreen, or other type of input device at the POS terminal. The customer can also tell an employee (e.g., team member) at the POS terminal (such as in checkout lanes that are operated by the employees or other team members in the retail environment) the amount of money to add to the card, and then the employee can apply the customer-designated amount to the card. The customer then may provide payment, such as a credit card, mobile wallet, cash, etc., at the POS terminal to apply the amount of money (e.g., funds) to the card. Once the payment is received and processed, the computer system can verify the purchase of the gift card and proceed to apply the funds to the card. In some implementations, the block 606 can be performed before, during, or after one or more other operations in the process 600. The funds can be applied to the card, for example, once the card has been validated and/or authorized in bock 608.

For example, the computer system can request validation and/or authorization information for the combined card and envelope components based on the scanned identifier(s) in block 608. The request can be made to a computer system that checks whether the card and the envelope have been associated with other cards and/or envelopes in a data store/data repository for the retail environment. The computer system can be the card identifier and access code system 216 described in FIG. 2A. As described in FIG. 2A, the system 216 can compare the scanned identifier(s) for the card and/or the envelope to data entries stored in the data store. The comparison can be performed to check whether the scanned card and/or envelope have already been associated with another customer, purchase, and/or funds. The comparison can also be performed to check whether the scanned card and/or envelope have already been identified as potentially compromised (and thus unusable for the current customer's purchase). Sometimes, as described in FIG. 2A, the computer system can encrypt the request, then transmit the request to the system 216. The request can include, for example, an encryption key used for encrypting and/or decrypting information associated with the scanned gift card and/or envelope.

In block 610, the computer system can receive encrypted information for the combined card and envelope components. The encrypted information can be received from the card identifier and access code system 216 described further in FIG. 2A. The system 216 can be configured to use the encryption key to access information (e.g., stored in the data store) that has been associated with the gift card, such as a PIN and/or gift card number. This PIN and/or gift card number may be used to provide access to the funds that have been added to the card during the checkout process. The encryption key can also be used by the system 216 to encrypt the accessed information for the gift card before transmitting such information to the computer system. In some implementations, the gift card may not already be associated with unique information, such as the PIN and/or gift card number.

Rather, the computer system, or another system receiving the request from block 608, can generate the unique information in response to receiving the request. The unique information can be randomly generated. The unique information can also be generated using one or more machine learning techniques, rulesets, and/or algorithms. For example, the computer system may integrate date of printing, intended recipient retail environment/region, location/vendor that printed the card, version of number generation algorithm, and/or serial number as information/inputs for generating the new PIN and/or card number for the gift card. In some implementations, the computer system can generate the PIN as a one-way hash of a serial number for the gift card. In other words, the PIN can be validated against the serial number, but the PIN may not be generated from the serial number, which may be similar to abbreviated checksum techniques.

The computer system can decrypt the received card information (block 612). The computer system can decrypt the information using a private key or other encryption key that is known to the computer system and securely stored there.

In block 614, the computer system can determine whether the card and envelope components are intended to be combined, based on the decrypted information. Sometimes, determining whether the components are intended to be combined can include determining whether the components are appropriately affixed to each other. Refer to FIGS. 4A, 4B, 4C, 4D, and 7 for further discussion about correct assemblies of the components. As another example, determining whether the components are intended to be combined can include assessing the decrypted information according to one or more rules.

As an illustrative example of block 614, the decrypted information may indicate that the card has been identified as potentially compromised. Accordingly, the computer system may determine that the card and the envelope are not intended to be combined and that the customer must get a new gift card from the retention apparatus to attach to the envelope component and complete the purchase. As another example, the decrypted information may indicate that the card is not compromised but has already been associated with another envelope component. The computer system may then determine that the card and the envelope are not intended to be combined and that the customer should get a new card and a new envelope from the retention apparatus.

As yet another example, the decrypted information may indicate that the card and the envelope have not been previously identified/associated with other components and thus can be combined. The computer system can therefore determine that the card and the envelope are intended to be combined with each other. Any of these determinations can be made by the computer system in response to checking the decrypted information against the rules mentioned above.

If the computer system determines in block 614 that the card and envelope components are not intended to be combined, the computer system proceeds to block 616, in which the computer system can generate and return a notification to the POS terminal and/or an employee/team member user device hat the card and envelope do not match.

The notification can prompt the customer to return to the retention apparatus and select a new card component and/or envelope component. The notification can prompt the customer to bring the card and envelope components to a customer service location in the retail environment, where relevant team members in the customer service location may dispose of these components. As another example, the notification can prompt the customer to throw out the card and/or the envelope components. In some implementations, the notification can include automatically cancelling a transaction having the card and envelope components. The notification at the team member's user device can prompt the team member to approach the customer at the POS terminal in the checkout area and assist the customer in completing their purchase and checking out (e.g., by collecting a new card and/or envelope, by canceling a transaction with the scanned card and/or envelope). The notification can, in some implementations, also be generated to flag that the particular card and envelope do not match and that the transaction is cancelled. The flagging information can be stored in the data store and used to keep track of which cards and/or envelopes are compromised or unusable.

Referring back to block 614, if the computer system determines that the card and envelope components are intended to be combined, the computer system proceeds to block 618, in which the computer system can generate and return a notification to the POS terminal and/or the team member user device to complete the purchase of the combined card and envelope components. Once the purchase is completed, information can be stored in the data store indicating an association between the card and envelope components and that the card has been activated.

In some implementations, the gift card can be validated using one or more techniques. The gift card can be validated during the checkout process and/or during another time when the customer, or a recipient of the gift card desires to use the card to purchase one or more items in the retail environment. For example, any one or more identifying information on the card component and/or the envelope component can be scanned at the POS terminal and/or using a scanning device as described herein, then transmitted to a backend system such as the system 216 to identify and associate the scanned information for an already-activated card. As another example, a signature area can be located on the card component and/or the envelope component. The customer may sign in the signature area, and their signature can become a unique code for verifying that the card belongs to the customer when the customer tries using it to make future purchases. During the future purchases, for example, the signature in the signature area can be scanned/imaged, then compared against an image or copy of the signature that is stored in association with a unique identifier of the card in the data store to validate/verify the card.

As another example for validation purposes, the customer can be prompted to capture images of the card component and/or the envelope component at the time of purchase using their mobile device. The images can be stored in the data store in association with other identifying information corresponding to the card and envelope components. Over time, when the customer desires to use the card, they may be prompted to capture additional images of the card and/or envelope components using their mobile device. The additional images can be transmitted to a backend system, such as the computer system or other computer systems described herein. The backend system can perform image processing techniques and/or apply artificial intelligence (AI) and/or machine learning (ML) models to the images to compare the additional images to the original images of the components at the time of purchase. The comparison can be performed to identify and determine what modifications have been made to the card and/or envelope, what the card and/or envelope is supposed to look like, and subsequently verify the card.

In some implementations, the card and/or the envelope may separate from each other over time. The customer, or a user that receives the card from the customer, may accidentally separate the card and/or envelope. To validate either the card or the envelope that remains within the possession of the customer, the customer may present a receipt during checkout at the retail environment. The receipt can be scanned. Unique identifiers for the card and/or envelope can be identified on the receipt and checked against transaction information associated with the receipt and stored in the data store to verify the card and/or envelope. In some implementations, if the customer does not have the receipt, they can provide their user credentials (e.g., email, name, phone number, username) for a user account associated with the customer during the checkout process. Their user credentials can be accessed by the POS terminal or other computer system to identify orders/transactions associated with the user account and thus verify the card/envelope purchase for the customer. The customer may also provide a credit card or other form of payment that was used to purchase the card in order to verify the card during future checkout processes.

Figure 9A:
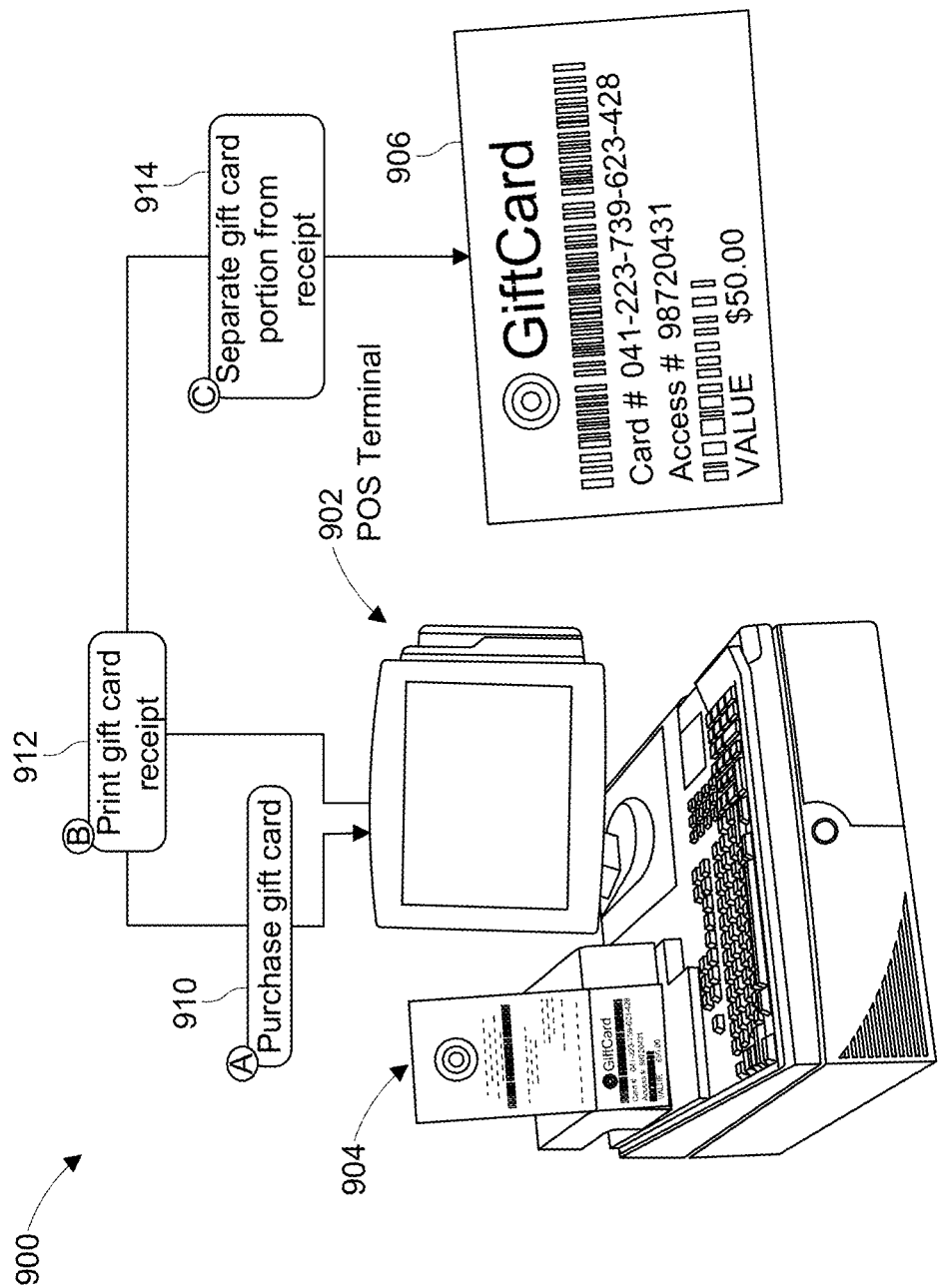

In yet some implementations, the receipt can be used as part of the combined envelope and card components, as shown and described further in reference to FIGS. 9A and 9B. For example, the receipt can be put into the envelope component with the card component. Sometimes, the gift card component may be the receipt, which can then be permanently affixed to the envelope component. Sometimes, the envelope component may be the receipt, which can then be permanently affixed to the card component. The receipt can be printed using ink, paper, or other materials that allows information presented on the receipt to persist over time. As a result, the information on the receipt may not wear off or fade as time continues. Refer to FIGS. 9A and 9B for further discussion.

In yet some implementations, the card and/or the envelope component can be printed with hidden ink or an invisible ink and/or invisible marker (e.g., a particular shape can be printed onto a surface of the card and/or envelope in hidden/invisible ink). The hidden or invisible components can then be scanned and compared against stored identifying information for the card to verify/validate the card. Since each card and/or envelope may include a hidden shape, marker, and/or characters, the cards and envelopes may not be easily reproduced, which further improves security of the components and may prevent or otherwise deter gift card scams.

The POS terminals and/or checkout lanes in the checkout area may include flatbed scanners that may be configured to identify different types of ink, such as invisible inks or other inks that may not be visible to the human eye. As a result, the card and/or envelope component can be validated/verified as it is moved across the flatbed scanner. In yet some implementations, the card and/or envelope component may have RFIDs, which can be used to further verify and/or validate the card during future checkouts in the retail environment.

FIG. 7 is a flowchart of a process 700 for checking valid assembly of a physical gift card and an envelope during a checkout process. The process 700 can be performed by one or more system components described herein, such as the POS terminal 110, the card identifier and access code system 216, the card redemption system 214, the fraud detection system 244, and/or the user device 504. One or more blocks in the process 700 may be performed by relevant users, such as a worker or other employee at a POS terminal or checkout lane in a retail environment. The process 700 can also be performed by one or more other computing systems, devices, computers, networks, cloud-based systems, and/or cloud-based services. For illustrative purposes, the process 700 is described from the perspective of a computer system.

Referring to the process 700 in FIG. 7, the computer system can receive scanned information identifying a card and an envelope during a checkout process (block 702). As described herein, a customer can scan one or more unique identifiers attached to the card and/or the envelope during a checkout process at a POS terminal in a checkout area of a retail environment. The scanned information can include unique identifiers, including but not limited to barcodes, QR codes, labels, etc.

The computer system can determine whether the scanned information satisfies one or more valid-identifier criteria in block 704. The one or more valid-identifier criteria can indicate rules that can be used to determine whether barcodes or other unique identifiers of the card and/or envelope are visible, scannable, and/or readable. These rules can further be used to determine whether the card and envelope are properly attached to each other. For example, the computer system can check a quantity of characters in the scanned information against an expected quantity of characters for the scanned card and/or envelope. The computer system may identify 14 digits in the scanned information for the card. However, the one or more valid-identifier criteria can indicate that a barcode for the card should have 10 digits. The computer system may determine that the scanned information does not satisfied the one or more valid-identifier criteria because the scanned information includes more digits than expected for the card. The computer system may subsequently determine that the card and envelope may not be appropriately attached to each other since the scanned information contained more digits than expected. As another example, the computer system can check a formatting of the scanned information against known/expected formatting rules for the card and/or envelope. If the formatting does not match, the computer system can determine that the one or more valid-identifier criteria is not met and the card and envelope are not appropriately attached to each other.

If, in block 704 the computer system determines that the scanned information satisfies the one or more valid-identifier criteria, computer system can perform a process to obtain card information in block 706. Refer to FIGS. 1 and 2 for further discussion about obtaining the card information. In other words, the computer system determines that the card and envelope are appropriately affixed to each other, since the complete barcode or other identifiers needed to verify/activate the card and/or the envelope are readable. Because the components are properly and permanently affixed to each other, the computer system can proceed through a process for completing checkout in which the customer purchases the combined card and envelope components.

Referring back to block 704, if the computer system determines that the scanned information does not satisfy the one or more valid-identifier criteria, then the computer system can output selectable options and instructions requesting a customer to indicate whether the card is attached to the envelope in block 708. The output can be presented on a display screen of a POS terminal where the customer is performing the checkout process. The output can be presented on a display screen of a mobile device of the customer, such as their smartphone.

The computer system may receive user input indicating selection of one of the options (block 710). The computer system can determine whether the customer selected an option indicating that the card is attached to the envelope (block 712).

If the customer selected the option indicating that the card is attached to the envelope, the computer system may generate and output a notification requesting the customer to (i) re-attach the card and the envelope, attach the card to a new envelope, or replace the card and/or the envelope with a new card and/or envelope, and (ii) re-scan identifying information for the card and/or envelope (block 714). In other words, the computer system determined that although the card and the envelope are attached to each other, the scanned information is not readable to verify and activate the card. If the card and envelope are not permanently attached to each other (e.g., not all adhesives have been applied to the card and/or envelope, the adhesive(s) is not permanently attaching the card and the envelope to each other), the customer can attempt to detach the components and realign them into a correct assembly. As another option, the customer may retrieve a new card component and/or a new envelope component (e.g., the notification to the customer may indicate which component needs to be replaced) to be used for completing the purchase during the checkout process. As another example, the customer may simply retrieve a new card and a new envelope to be used for completing the purchase. The customer can then re-scan information for the combined card and envelope components and iterate back through the process 700.

If the customer selected the option indicating that the card is not attached to the envelope in block 712, the computer system can generate and output a notification requesting the customer to (i) correctly attach the card and the envelope to each other and (ii) re-scan the identifying information for the card and/or the envelope. Sometimes, the notification can include instructions or steps indicating how to properly attach the card with the envelope. Refer to FIGS. 3-4 for further discussion about correct assemblies of the card and the envelope components. Once the customer appropriately attaches the card and the envelope to each other, the customer can rescan identifying information for either component and the computer system can iterate back through the process 700.

The computer system can iterate back through the process 700 until the scanned information satisfies the one or more valid-identifier criteria in block 704. Additionally or alternatively, the computer system may iterate through the process 700 until the customer tries to scan the card and/or envelope information more than a threshold amount of times. If the customer tries to scan the card and/or envelope information more than the threshold amount of times, the computer system can determine that a team member/employee should assist the customer at the POS terminal in the checkout area to complete the purchase of the card and envelope components or obtain one or more new components for purchase.

Figure 8:
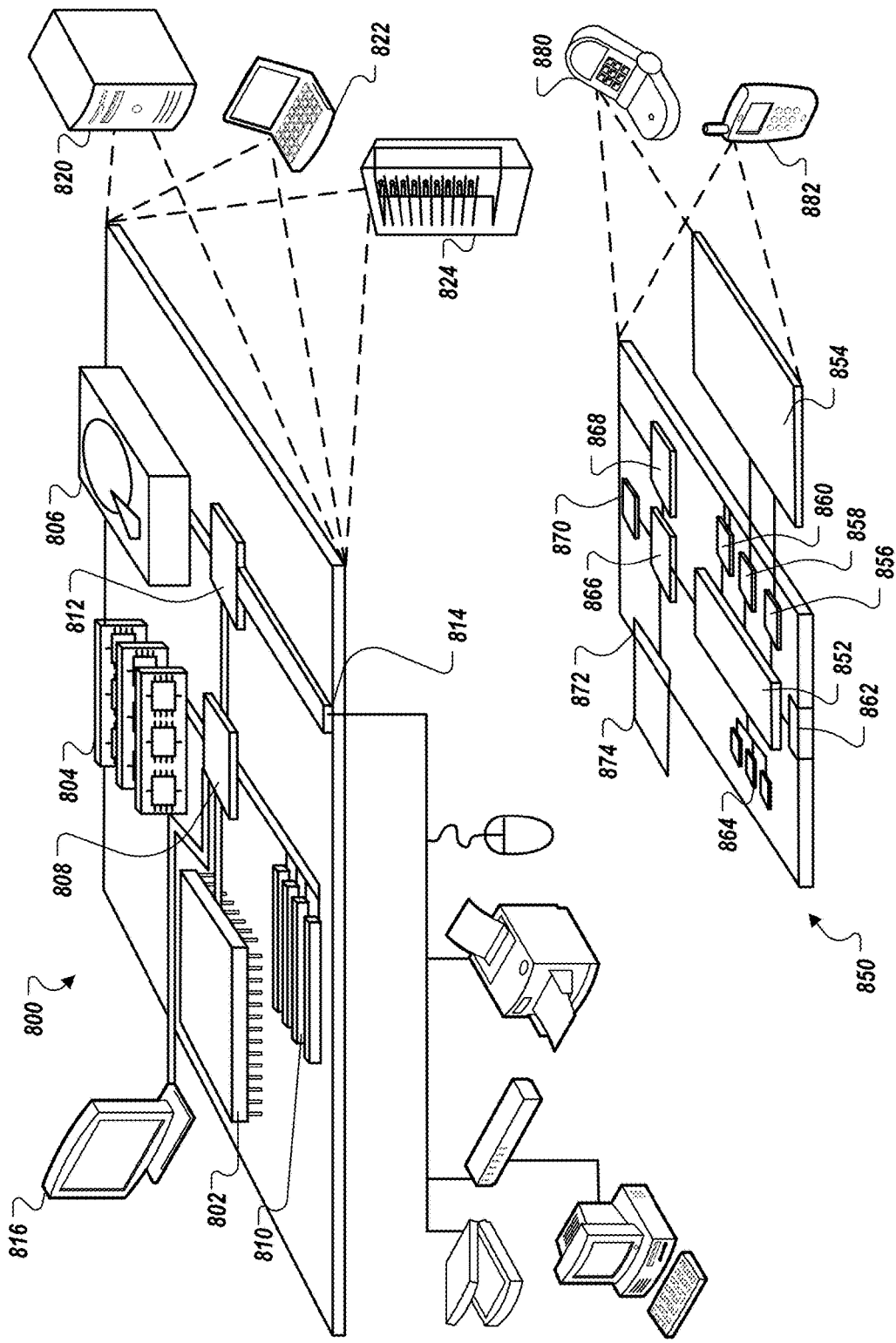
FIG. 8 is a schematic diagram that shows an example of a computing device and a mobile computing device.

FIG. 8 shows an example of a computing device 800 and an example of a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this disclosure.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880.

It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

FIGS. 9A and 9B are conceptual diagrams of a process 900 for using a gift card receipt 904 as part of a combined gift card during a checkout process. The process 900 can be performed in a self-checkout implementation. The process 900 can also be performed in checkout lane that is operated by a team member in a retail environment.

Referring to the process 900 in both FIGS. 9A and 9B, a gift card can be purchased at a POS terminal 902 in block A (910). The POS terminal 902 can be similar to or the same as the POS terminal 110 described herein. Purchasing the gift card can include the guest providing a value they desire on the gift card as well as payment. The guest may not provide a physical gift card component at the POS terminal 902. For example, the guest and/or the team member may not scan an identifier of a gift card component or an envelope component to initiate the purchase process. The gift card components may not be generated or provided to the guest until the purchase process is complete.

For example, once the guest provides payment and the payment is processed at the POS terminal 902, the POS terminal 902 can print the gift card receipt 904 (block B, 912). The gift card receipt 904 can include a gift card portion 906. Although printed together, the gift card portion 906 can be separable from the gift card receipt 904. Accordingly, the guest and/or the team member can separate the gift card portion 906 from the gift card receipt 904 in block C (914). The gift card receipt 904 can include perforations along which the guest and/or team member can tear apart or otherwise separate the gift card portion 906 from the gift card receipt 904. In some implementations, the gift card receipt 904 can include a printed line, instructions, or other indications indicating where the guest and/or team member can separate the gift card portion 906 from the gift card receipt 904.

The gift card portion 906 can include identifying information for the purchased gift card, which can be used to redeem and use the gift card by the guest or recipients of the gift card. The gift card portion 906 can include information such as a card number, an access number, an access code, a PIN, a barcode, and/or a value. One or more other information can be printed onto the gift card portion 906.

After separating the gift card portion 906 from the gift card receipt 904, the guest and/or the team member can insert the gift card portion 906 into an envelope component 918 (block D, 916). The envelope component 918 can be selected by the guest at a display in the retail environment, as described in reference to at least FIG. 1A. In some implementations, the envelope component 918 can be dispensed from a retention apparatus at the POS terminal 902/in the checkout area, as described in reference to at least FIG. 1B.

The envelope component 918 can include instructions printed thereon that can instruct the guest and/or team member about how to combine the gift card portion 906 with the envelope component 918. The envelope component 918 can include a window or opening 919 through which information printed on the gift card portion 906 can be viewed when the gift card portion 906 is properly assembled with the envelope component 918.

The envelope component 918 can be sealed to retain the gift card portion 906 therein in block E (920). The envelope component 918 may include one or more adhesives configured to close the envelope component 918 around the gift card portion 906. Once the envelope component 918 is sealed, the gift card portion 906 cannot be removed. If a user attempts to open the envelope component 918, such tampering would be visibly apparent. A guest would therefore be inclined to get a new gift card that has not been tampered with.

As shown in FIG. 9B, when the envelope component 918 is sealed around the gift card portion 906, information printed on the gift card portion 906 is visible through the opening 919. The opening 919 may be covered with cellophane 924, or another semi- or fully-transparent material. The cellophane 924 can protect the information printed on the gift card portion 906 from being tampered with, erased, removed, etc. In some implementations, the cellophane 924 can wrap around an entirety of the envelope component 918.

The opening 919 can be on a front surface 922 of the envelope component 918. The envelope component 918 may also include a back surface 926, which can be opposite the front surface 922. The back surface 926 can include artwork and/or other information that may identify the envelope component 918 and the gift card portion 906 as a gift card.

Advantageously, the process 900 described herein can ensure that identifying information of the gift card portion 906, such as the access number, access code, PIN, etc. is unknown before the purchase of the gift card portion 906. The process 900 may also allow for easy print and production at point of sales, requiring minimum or no changes to existing infrastructure in the checkout area. The process 900 can also provide a sustainable paper-based approach to securely printing and generating gift cards in the retail environment. The process 900 may also include minimal assembly of gift card components during the checkout process, providing for simple and easy-to-lean implementation of the disclosed technology in existing retail environments.

FIGS. 10A, 10B, 10C, and 10D illustrate an example access code label 1000 having an identifier 1010 that may not be visible until the label 1000 is affixed to a gift card component 1004. Referring to the FIGS. 10A, 10B, 10C, and 10D, the label 1000 can be printed using a paper 1002. The paper 1002 can include an adhesive-resistant coating (and/or composite material with paper or another substance that has an adhesive resistant layer bonded onto it). The paper 1002 can also be any other type of material for the label 1000. The paper 1002 can include 2 materials, 1001A and 1001B. The material 1001A can be opaque and can have information printed thereon for the label 1000, such as an access code or other identifier (which may be hidden by a scratch off material as shown and described throughout this document) printed in black ink. The material 1001B can be a transparent material. In some implementations, the paper 1002 can include a first layer of the opaque material 1001A that extends over an entirety of the paper 1002. The paper 1002 can also include a second layer of the transparent material 1001B, which extends over an entirety of the first layer of the opaque material 1001A. The entire label 1000 can then be printed on the second layer of the transparent material 1001B so that when the label 1000 is peeled away from the paper 1002, the entire label 1000, excluding the portions with printed information, can appear transparent or translucent.

As described herein, the label 1000 can be made of a paper material. Sometimes, the label 1000 can be made of one or more other materials or any combination thereof, including but not limited to Polyamide, Acrylic, Polyethylene, Polyolefin, and/or Polypropylene. The label 1000 may be entirely made of transparent material, such as the transparent material 1001B. Additionally or alternatively, the label 1000 can be composed of multiple materials, including but not limited to the materials 1001A and 100B. For example, an upper 75% portion of the label 1000 may be made of a white material (such as paper or polyester which may be more durable) and a lower 25% portion of the label 1000 can be another transparent material. The label 1000 can also be made up of a layered material. The layered material, in an illustrative example, can begin with a white material, which may not always be a full width of the paper 10002 that has identifying information printed upon it and underneath a scratch off material. A next layer can include a transparent material covering the layer of white material and overlapping to create an area on the label 1000 for printing the identifier 1010. A next layer can include the scratch off material, which can be printed over a portion of the label 1000 that needs the scratch off material to cause information printed on the label 1000 (and/or a card component) hidden. In some implementations, the transparent layer may already have the scratch off material on it prior to being laid on top of the white material layer. Advantageously, the printed information under the scratch off material can be protected by the transparent layer so that when the scratch off material is scratched away/removed, the print underneath the scratch off material is not also scratched or damaged. In yet some implementations, the scratch off material can be a separate label that is applied over the label 1000 after the label 1000 is generated (rather than the scratch off paint/material being printed on the label 1000 when generating the label 1000).

The identifier 1010 can be a barcode, or other identifier described herein. For example, the identifier 1010 can be, but is not limited to, a QR code, a number or other value, etc. The identifier 1010 can be printed on the transparent material 1001B of the paper 1002 used for the label 1000. For example, an inverse of the identifier 1010 can be printed on the transparent material 1001B using ink that is a same color as the material 1001A of the paper 1002. As a result, while the label 1000 with the printed identifier 1010 is attached to the paper 1002, the identifier 1010 may not be visible or scannable. This implementation can advantageously protect the identifier 1010 from being compromised by a potentially malicious actor. This implementation ensures that there is not sufficient contrast between the identifier 1010 and its background for a scanning device to scan the identifier 1010 until the label 1000 with the identifier 1010 is fixed to a card component (a background on the card component providing sufficient contrast with the identifier 1010 for it to be appropriately read by the scanning device). Thus, this implementation can also be used for hiding the identifier 1010 with transparency to prevent a team member at checkout from scanning the identifier 1010 on the label 1000 before the label 1000 is properly placed on the card. Since an association between the identifier 1010 and another identifier 1010 under a scratch off material on the label 1000 provides the card component with its access code, it must be ensured that the label 1000 is on the card before the identifier 1010 can be scanned. If the label 1000 were not on the card, then someone trying to redeem the card may not know the access code needed for redemption, especially if the identifier 1010 was scanned by the team member before the label 1000 was ever removed from a roll of identifiers and/or another paper material having at least the label 1000.

In some implementations, the identifier 1010 can represent a number or value that is used to retrieve a uniquely identifying number or access code in a data store using the techniques described herein. The identifier 1010 can be printed on an outer surface of the transparent material 101B of the label 1000. In some implementations, the identifier 1010 can be printed on an inner surface of the transparent material 1010B of the label 1000. In yet some implementations, the identifier 1010 can be printed on a middle layer of the paper 1002 used for printing/generating the label 1000. Printing the identifier 1010 in one or more layers on the label 1000, such as the middle layer, can advantageously provide additional security features—for example, such printing techniques can prevent a potentially malicious actor from using glare or infrared lights to try reading and capturing the identifier 1010 once it is printed on the label 1000 and the label 1000 remains attached to the paper 1002.

The gift card component 1004 can be a gift card or other card described herein. In some implementations, the gift card component 1004 can be an envelope, sleeve, or slip for receiving a card component. The gift card component 1004 includes a designated space 1006 for receiving the label 1000, as described herein. A portion 1008 can be printed onto the designated space 1006 in a location that aligns with the identifier 1010 once the label 1000 is properly aligned and affixed to the gift card component 1004. The portion 1008 can be printed in a color or indicia that is different than a color of the designated space 1006 of the gift card component 1004 and/or a color of the label 1000 (e.g., a color of the material 1001A of the paper 1002 used for generating/printing the label 1000. In the example of FIGS. 10A, 10B, 10C, and 10D, the color of the designated space 1006 (and/or the label 1000) is white and the color of the portion 1008 in the designated space 1006 is black. One or more other colors and/or indicia can be used with the disclosed gift card component 1004 and the label 1000.

Figure 10A:
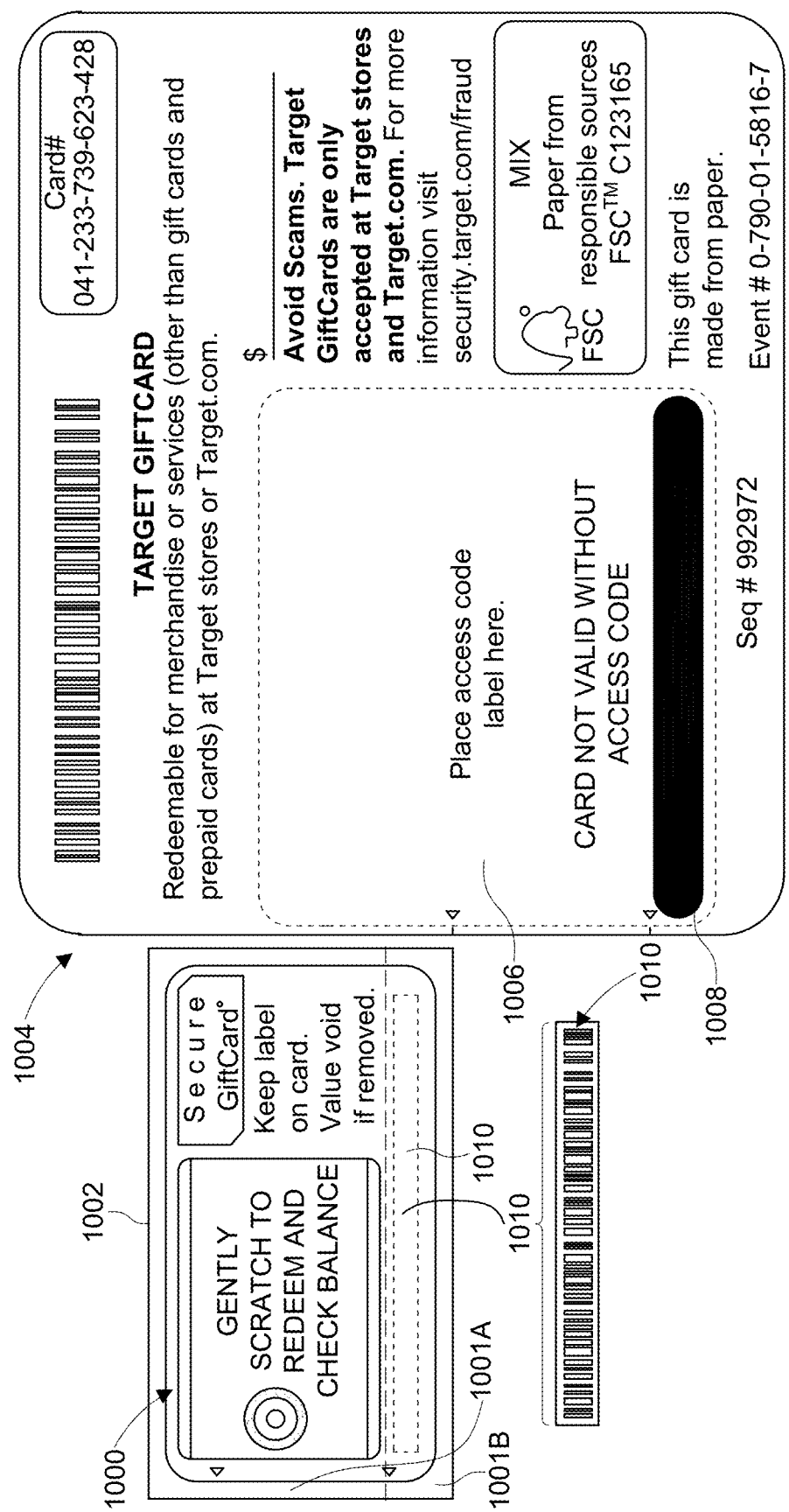
FIGS. 10A, 10B, 10C, and 10D illustrate an example access code label having an identifier that may not be visible until the label is affixed to a gift card component.

As shown in FIG. 10A, the label 1000 remains affixed to the paper 1002 used for printing the label 1000. Although the identifier 1010 is printed on the transparent material 1001B of the label 1000, the identifier 1010 is not visible on the label 1000 because color of print used for the identifier 1010 matches color of the paper 1002 (in this example, white).

Figure 10B:
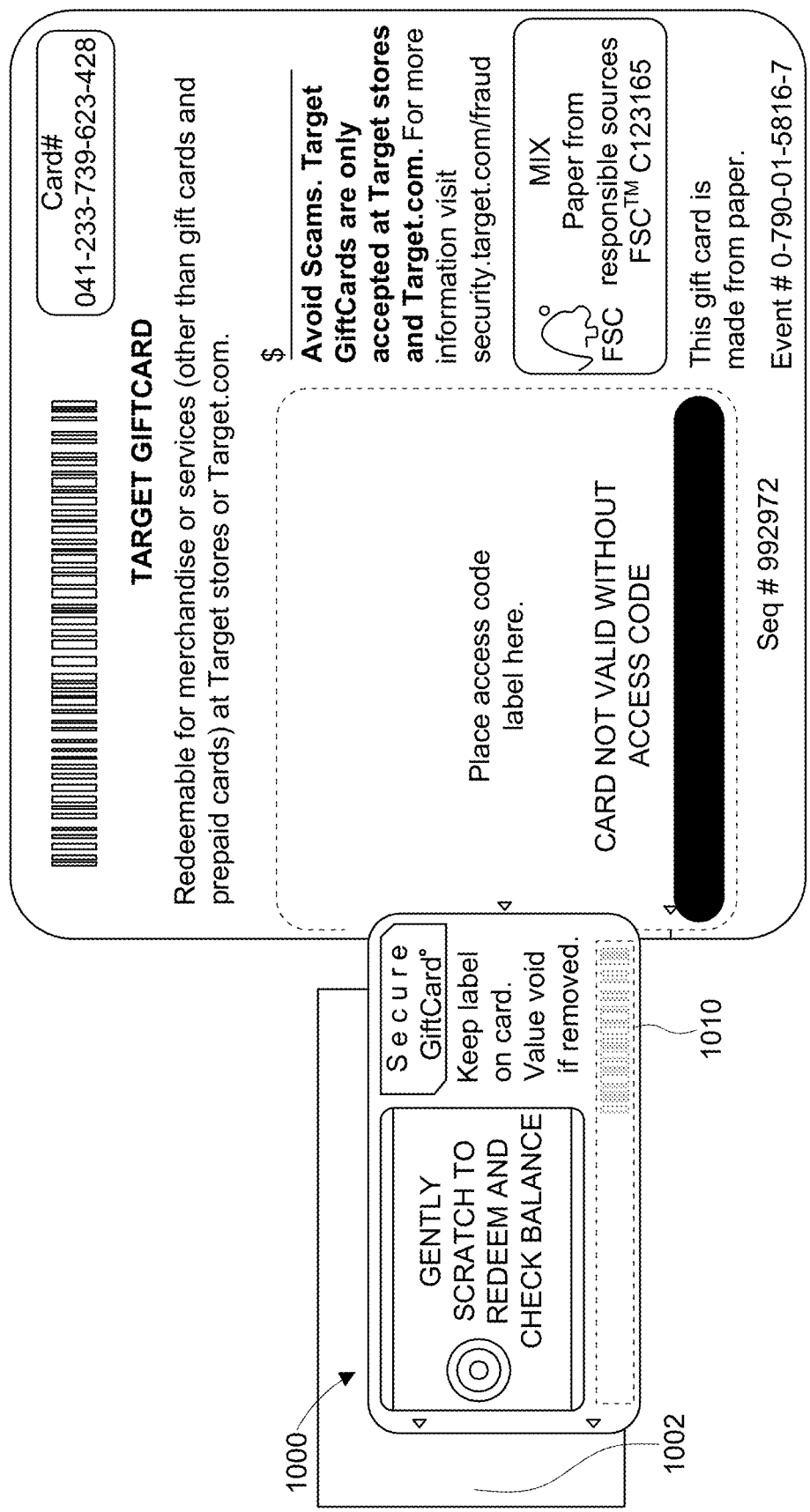

As shown in FIG. 10B, once the label 1000 is removed/peeled off of the paper 1002, the identifier 1010 begins to become visible because the identifier 1010 is printed on the transparent material 1001B portion of the label 1000 in inverse. In FIGS. 10A, 10B, 10C, and 10D, the identifier 1010 is a barcode in which bars in the barcode are printed with an ink that matches a color of the opaque material 1001A and/or the designated space 1006 of the gift card component 1004.

For example, the bars in the barcode can be printed on the transparent material 1001B portion of the label 1000 in white and the opaque material 1001A and/or the designated space 1006 can also be white. In some implementations, the bars of the barcode of the identifier 1010 may not be printed with ink on the transparent material 1001B of the label 1000.

As another example, spaces between the bars of the barcode can be printed with ink that matches the color of the opaque material 1001A and/or the designated space 1006 (e.g., white) on the transparent material 1001B of the label 1000. As a result, white ink can be printed for the spaces between the bars of the barcode and the transparent material 1001B of the label 1000 can remain transparent (unprinted) where the bars of the barcode are intended to be.

In some implementations, the same or similar printing techniques can be used for printing other identifying information on the label 1000, such as barcodes, card numbers, and/or access codes that may be printed on the label 1000 and hidden from view by a scratch off material. Refer to at least FIGS. 5D and 5E for further discussion about the identifying information that can also be printed onto the label 1000.

Figure 10C:
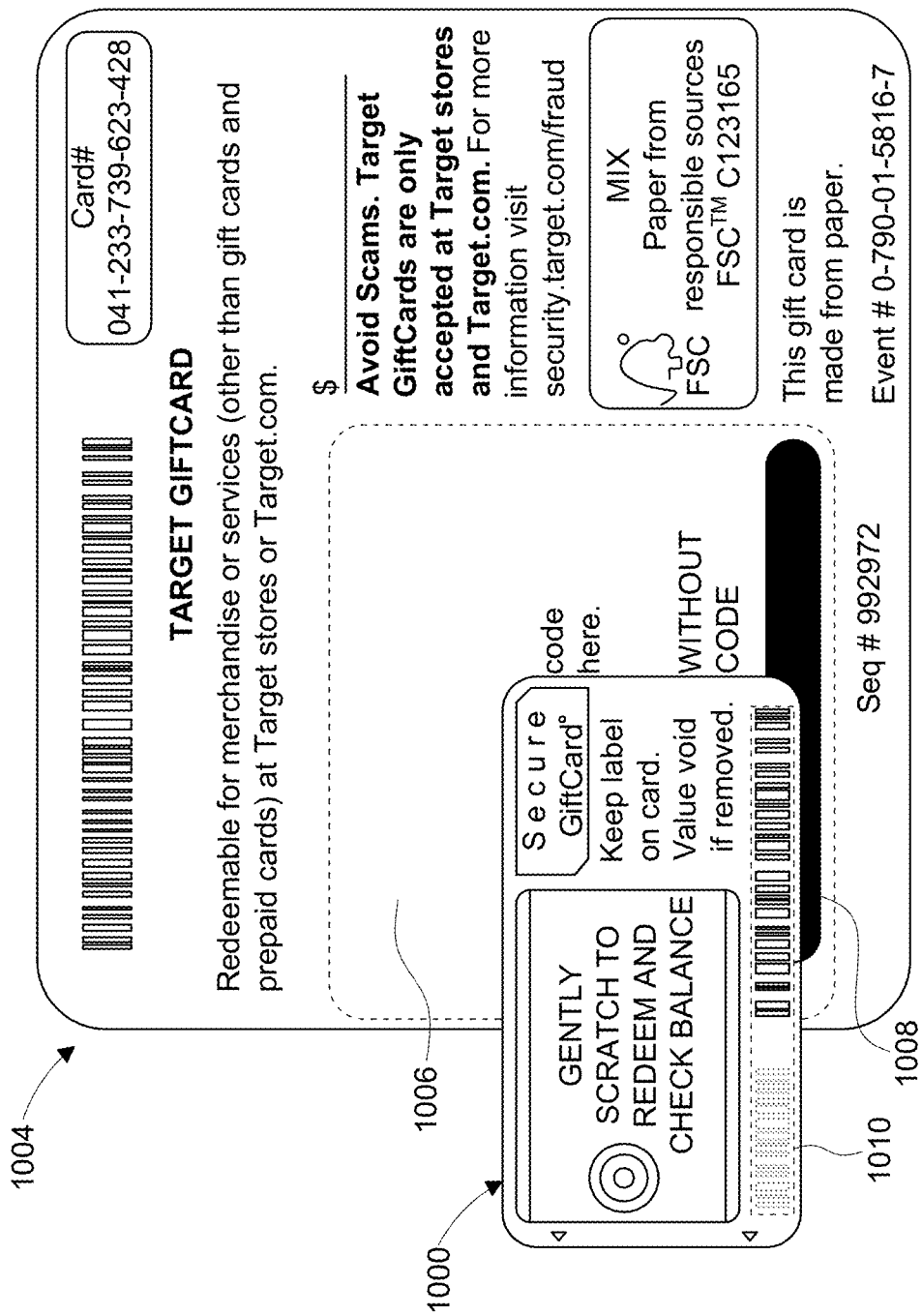

As shown in FIG. 10C, as the label 1000 is brought to overlay the designated space 1006 of the gift card component 1004, more of the identifier 1010 printed on the transparent material 1001B of the label 1000 can become visible, especially as the identifier 1010 is moved to come in alignment with the portion 1008 of the designated space 1006.

Figure 10D:
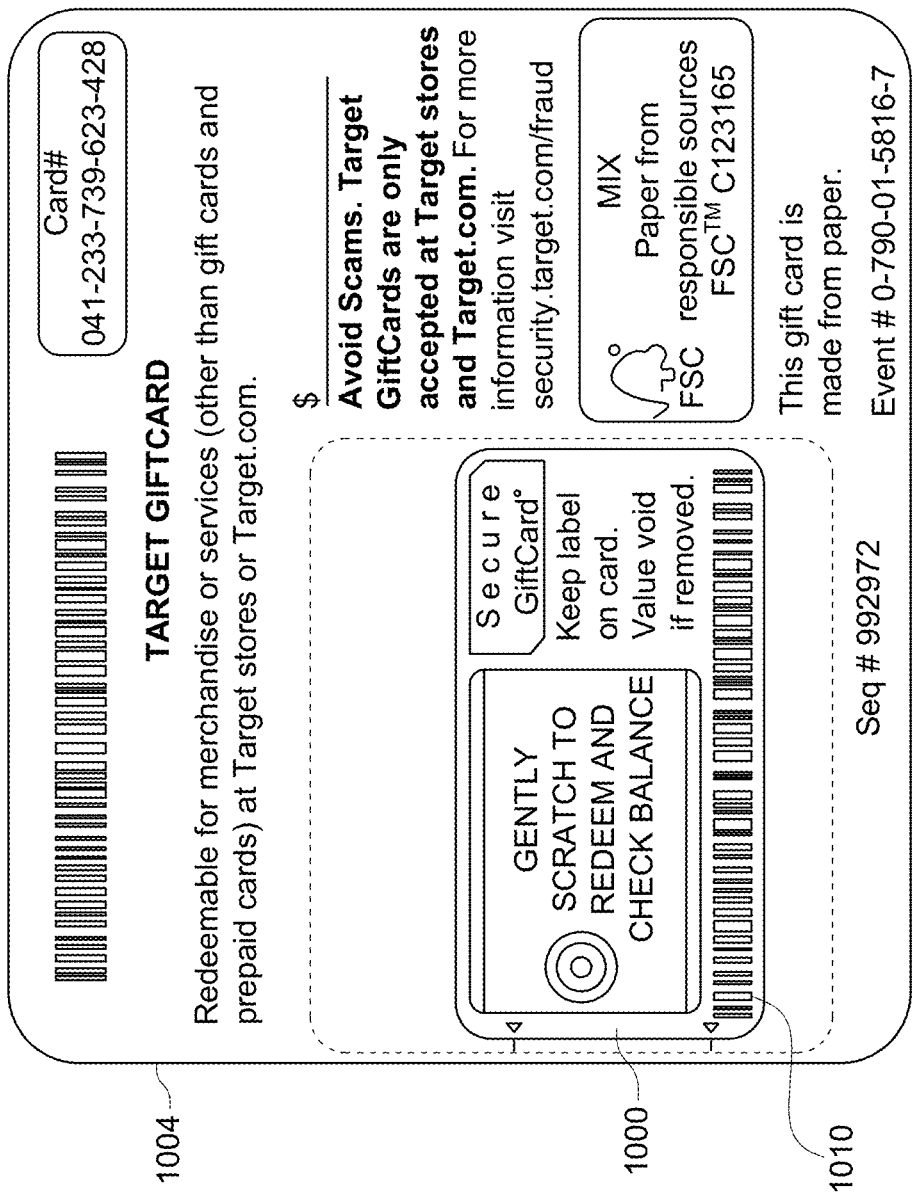

As shown in FIG. 10D, the label 1000 can be permanently affixed to the designated space 1006 of the gift card component 1004 such that the identifier 1010 is aligned with the portion 1008 of the designated space 1006. As a result, the identifier 1010 becomes fully visible and scannable by being properly aligned with and affixed to the black portion 1008 of the designated space 1006.

Figure 11A:
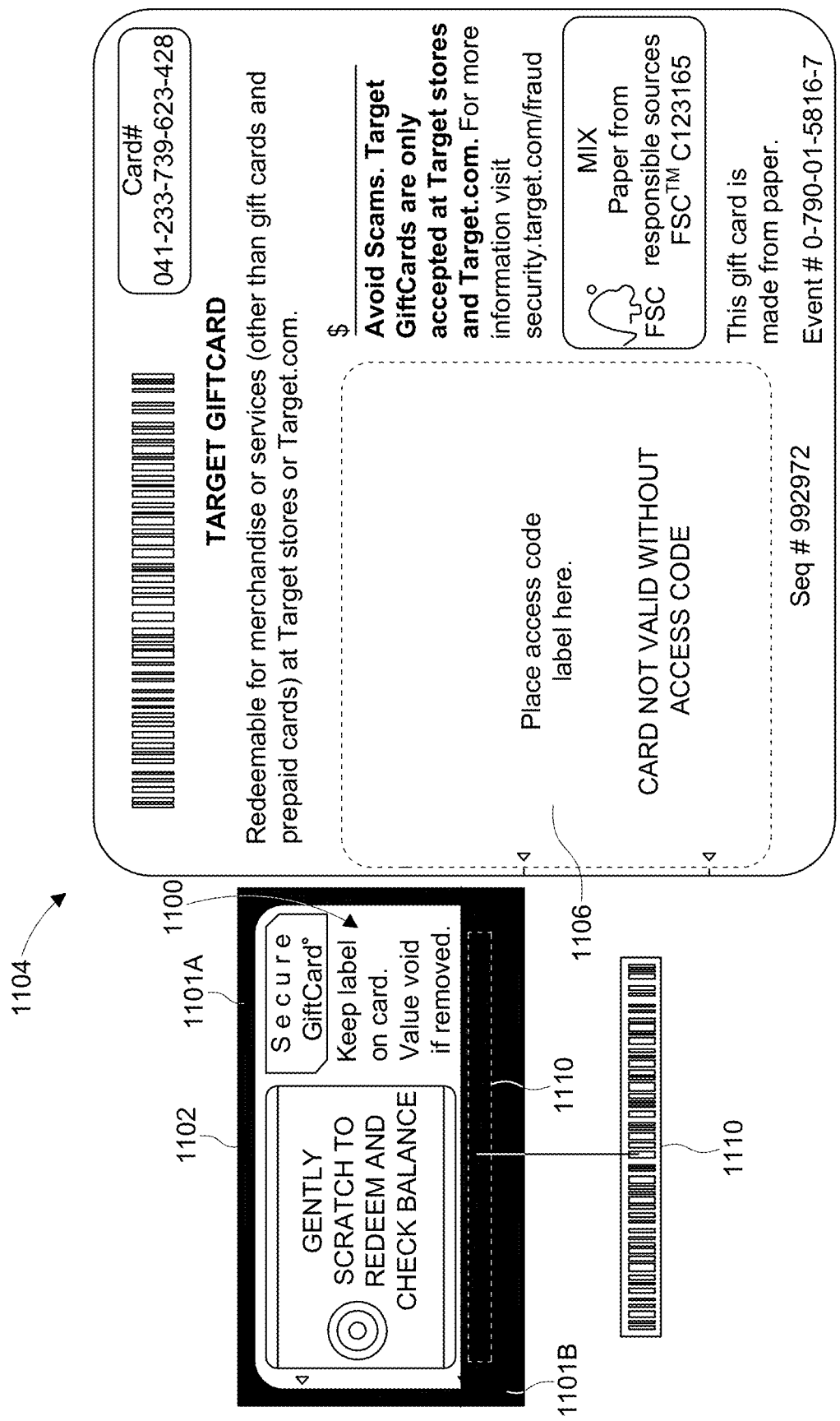
FIGS. 11A, 11B, and 11C illustrate another example access code label having an identifier that may not be visible until the label is affixed to a gift card component.
Figure 11B:
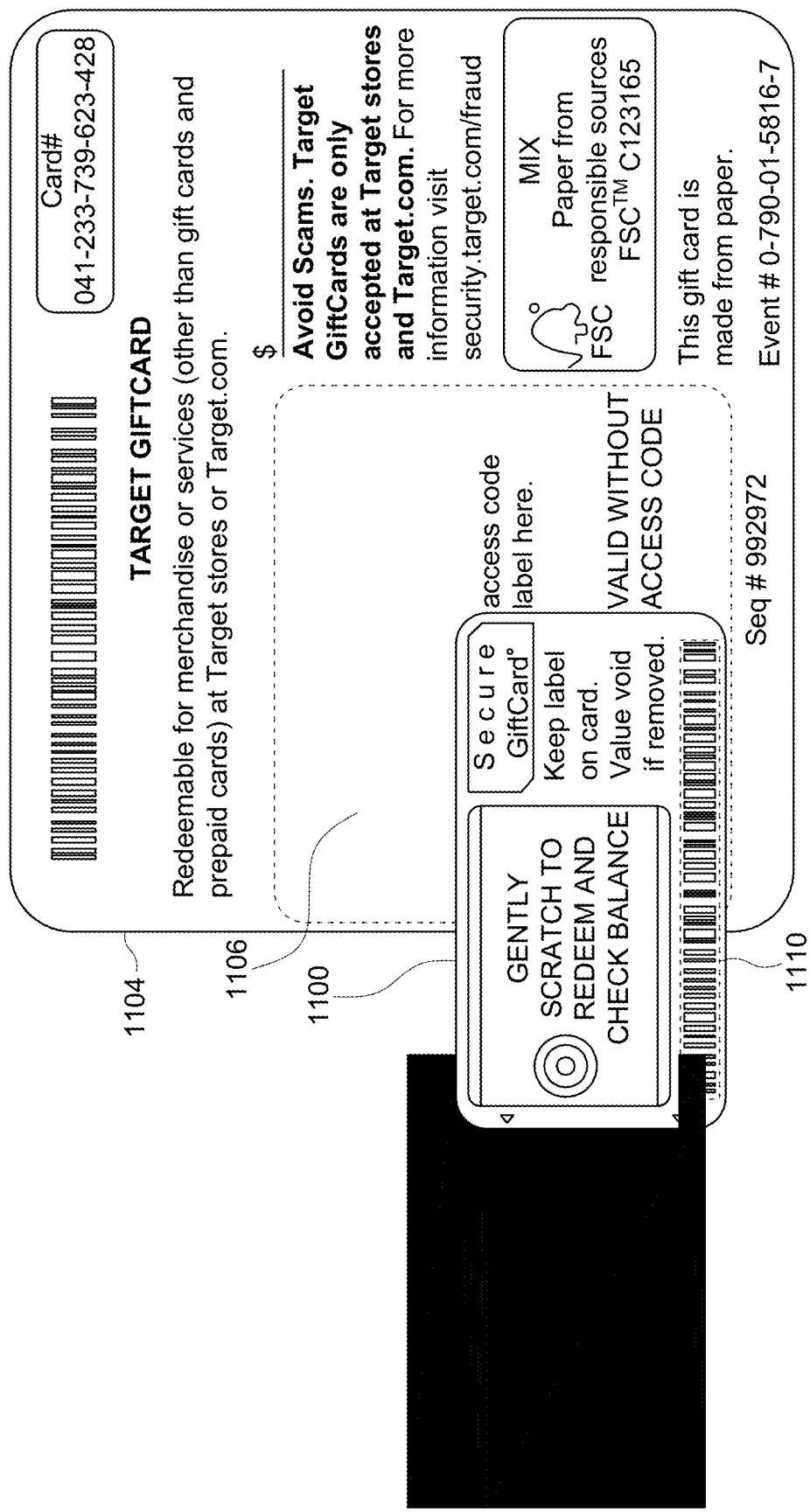
Figure 11C:
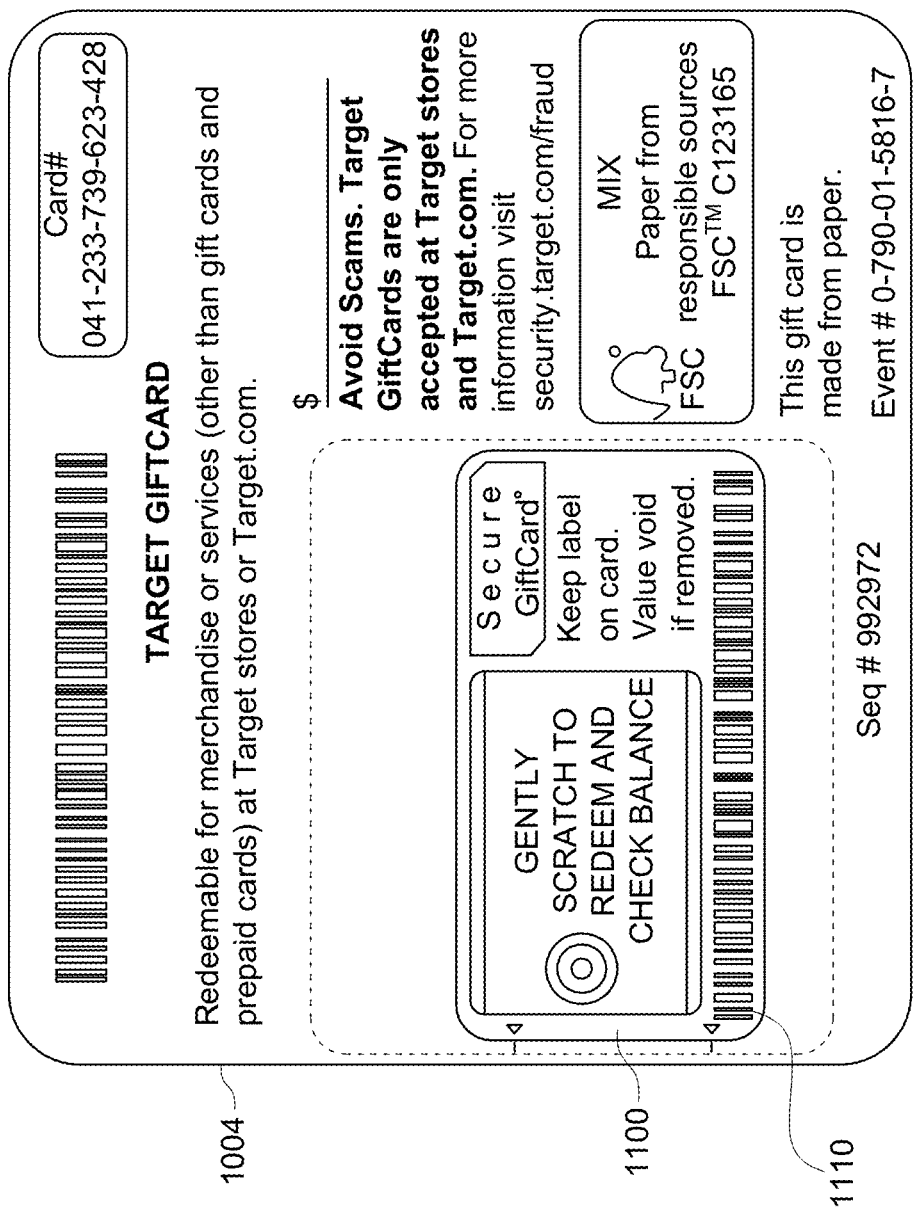

FIGS. 11A, 11B, and 11C illustrate another example access code label 1100 having an identifier 1110 that may not be visible until the label 1100 is affixed to a gift card component 1104. Referring to the FIGS. 11A, 11B, and 11C, the label 1100 can be printed using a paper 1102. The paper 1102 can include 2 materials, 1101A and 1101B. The material 1101A can be opaque and can have information printed thereon for the label 1100, such as an access code or other identifier (which may be hidden by a scratch off material as shown and described throughout this document) printed in black ink. In the example of FIGS. 11A, 11B, and 11C, the material 1101A is an opaque black-colored material. The material 1101B can be a transparent material. In some implementations, the paper 1102 can include a first layer of the opaque material 1101A that extends over an entirety of the paper 1102. The paper 1102 can also include a second layer of the transparent material 1101B, which extends over a portion of the first layer of the opaque material 110A or over an entirety of the first layer of the opaque material 1101A.

In some implementations, the label 1100 can include a portion that corresponds to the material 1101A, such as a portion of the label 110 that includes printed information (e.g., access code), and a portion that corresponds to the material 1101B, such as a portion of the label 1100 that includes the identifier 1110. In some implementations, entire label 1100 can be printed on the second layer of the transparent material 1101B so that when the label 1100 is peeled away from the paper 1102, the entire label 1100, excluding the portions with printed information (e.g., the identifier 1110, the access code), can appear transparent or translucent.

The identifier 1110 can be a barcode, or other identifier described at least in reference to FIGS. 10A, 10B, 10C, and 10D. The identifier 1110 can be printed on the transparent material 1101B of the paper 1102 used for the label 1100. For example, an inverse of the identifier 1110 can be printed on the transparent material 1101B using ink that is a same color as the material 1101A of the paper 1102 (in this example, the printing can be accomplished using black ink, which matches the black color of the paper 1102. Refer to FIGS. 10A, 10B, 10C, and 10D for further discussion about printing the identifier 1110 on the transparent material 1101B of the label 1100.

The gift card component 1104 can be a gift card or other card described herein including a designated space 1106 for receiving the label 1100. Refer to FIGS. 10A, 10B, 10C, and 10D for further discussion. Unlike the designated space 1006 of the gift card component 1004 of FIGS. 10A, 10B, 10C, and 10D, the designated space 1106 of the gift card component 1104 does not include any portion that corresponds to a color or other indicia that is different than the color of the designated space 1106. In other words, the entire designated space 1106 of the gift card component 1104 is a single color or indicia, which provides sufficient contrast when the label 1100 is applied thereto and the identifier 1110 (printed in black ink on the transparent material 1101B of the label 1100) becomes visible. As a result, existing card components can be used and only new labels may be generated using the described techniques, then applied to the existing card components.

As shown in FIG. 11A, the label 1100 remains affixed to the paper 1102 used for printing the label 1100. Although the identifier 1110 is printed on the transparent material 1101B of the label 1100, the identifier 1110 is not visible because color of print used for the identifier 1110 matches color of the paper 1102 (in this example, the color being black).

As shown in FIG. 11B, once the label 1100 is removed/peeled off of the paper 1102, the identifier 1110 begins to become visible on the transparent material 1101B. In FIGS. 11A, 11B, and 11C, the identifier 1110 is a barcode in which bars in the barcode are printed with an ink that matches a color of the opaque material 1101A of the paper 1102. Here, the bars of the barcode are printed in black ink and the color of the opaque material 1101A of the paper 1102 is black. Therefore, once the label 1100 is removed from the paper 1102, the black bars of the barcode become readily apparent on the transparent material 1101B of the label 110.

As shown in FIG. 11C, the label 1100 is brought to overlay the designated space 1106 of the gift card component 1104. The label 1100 can be permanently affixed to the designated space 1106. As a result of the proper alignment of the label 1100 with the designated space 1106, the identifier 1110 becomes fully visible and scannable.

Although implementations in FIGS. 10A, 10B, 10C, 10D, 11A, 11B, and 11C are described using (i) white ink and paper and (ii) black ink and paper, these implementations are merely illustrative examples. Other example implementations may use any other combination of ink and paper color, indicia, pattern, and/or material combinations to achieve the same effects described herein. Moreover, the gift card component, the label, and/or the identifier can be printed with colors that provide sufficient contrast in reading the identifier (e.g., identifier 1010) by a scanner or other scanning device described herein.

Figure 12:
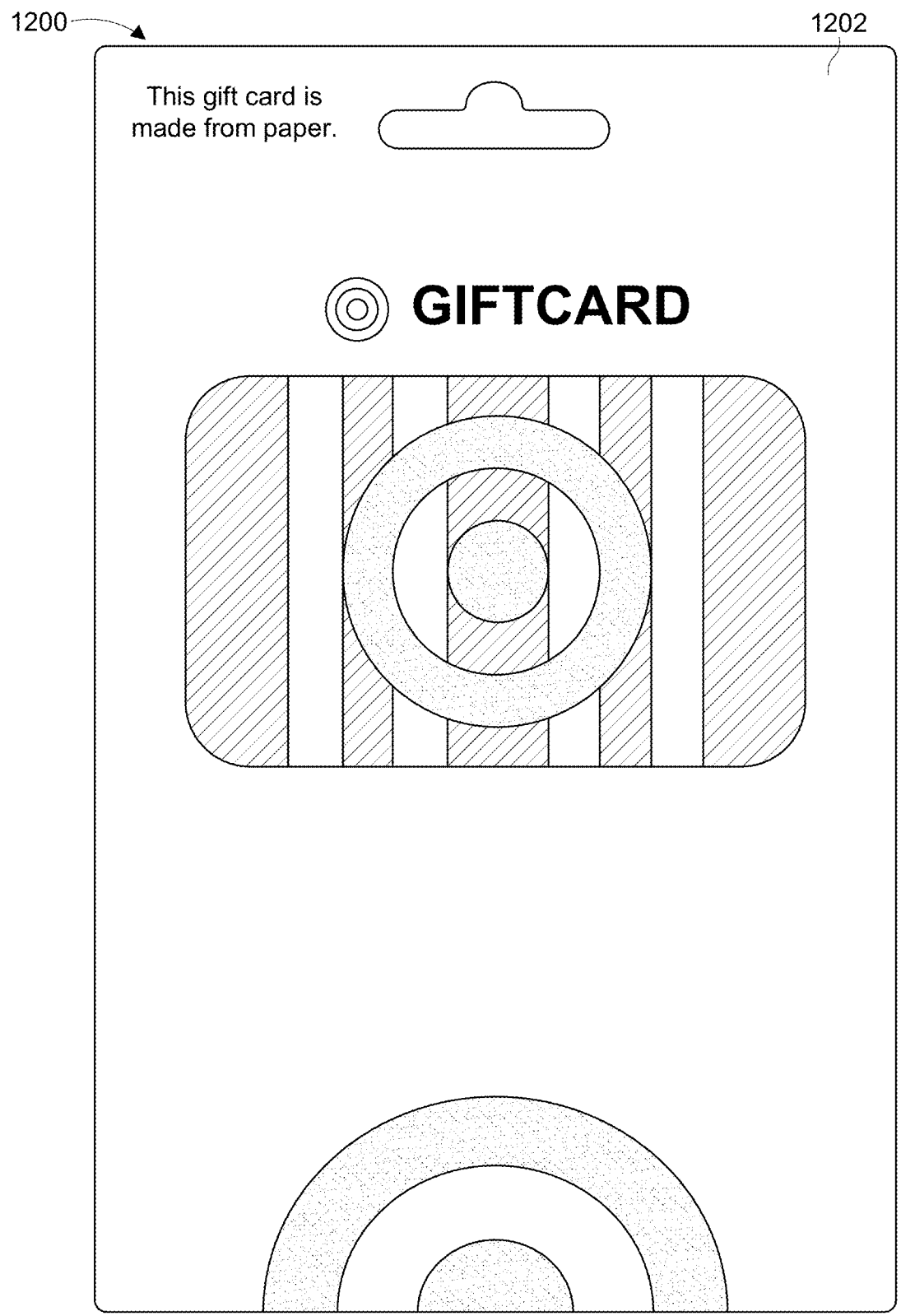
FIG. 12 illustrates an example decoupled gift card configuration having a gift card backer.
Figure 12:
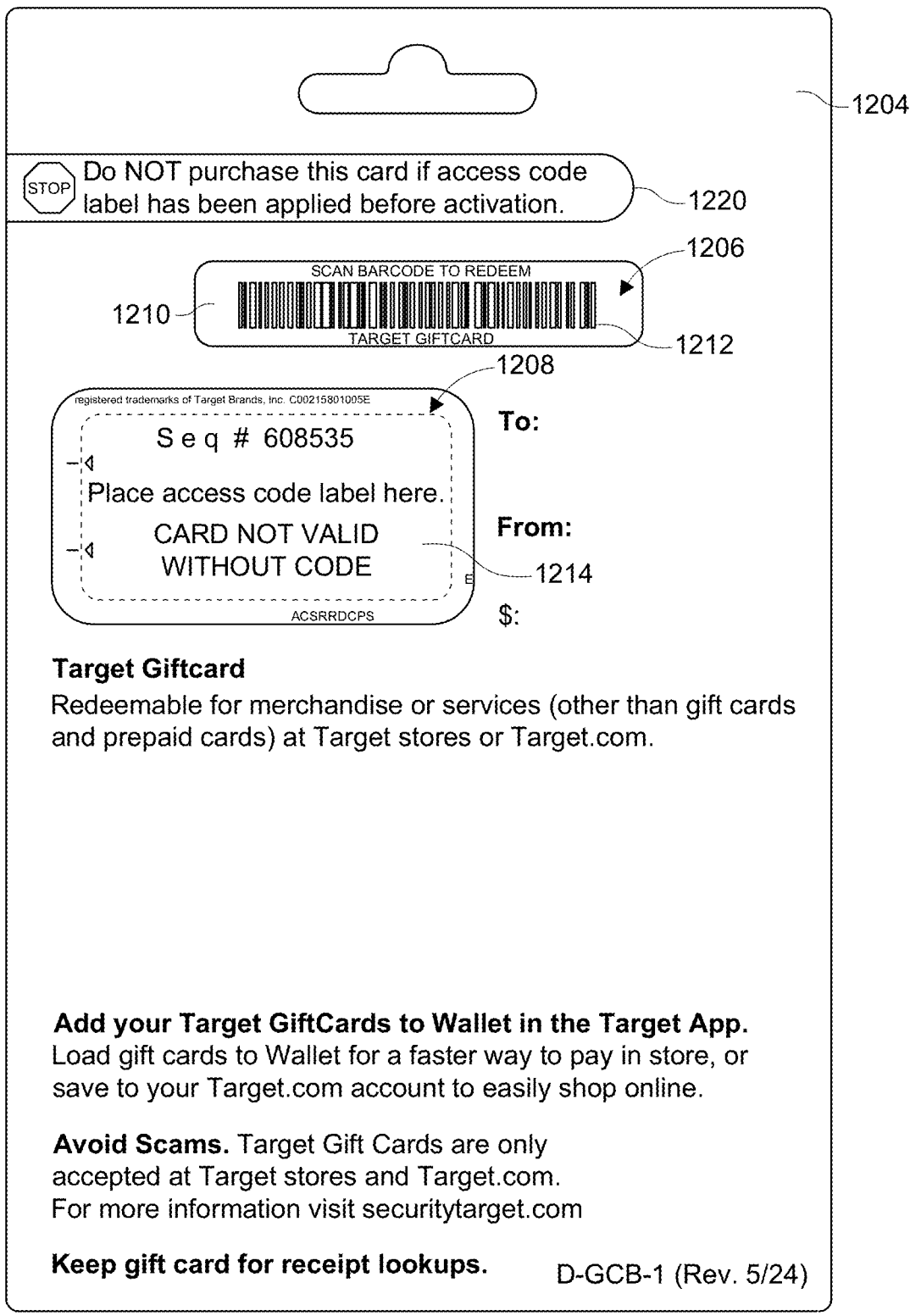

FIG. 12 illustrates an example decoupled gift card configuration having a gift card backer 1200. The gift card backer 1200 can be any type of sleeve, envelope, and/or wrapper that can be configured to receive a gift card 1210. The gift card backer 1200 can be on display in retail environments with the gift card 1210 already affixed or positioned therein/inside the backer 1200. In other words, although the backer 1200 and the gift card 1210 may be separate physical components, they can be attached to each other and thus combined before a checkout process begins. During the checkout process, an access code and/or label can be applied to the gift card 1210 as described herein to complete activation and validation of the gift card 1210 (refer to at least FIGS. 10A, 10B, 10C, 10D, 11A, 11B, 11C, 13A and 13B).

The backer 1200 can include a front surface 1202 and a back surface 1204. The front surface 1202 may include artwork, graphics, and/or indications of an amount that is added to the gift card 1210. The back surface 1204 can include a first opening 1206 sized for viewing a barcode 1212 printed on the gift card 1210 when the gift card 1210 is correctly aligned and/or affixed within the backer 1200.

The back surface 1204 of the backer 1200 can also include a second opening 1208, which can be sized similarly to an alignment portion 1214 (e.g., designated area) of the gift card 1210 when the gift card 1210 is correctly aligned and/or affixed within the backer 1200. The alignment portion 1214 of the gift card 1210 can protrude through the second opening 1208 of the card backer 1200 such that a user (e.g., team member in a retail environment) can attach/affix a label or sticker within the alignment portion 1214 during the checkout process. The alignment portion 1214 may also include instructions to help guide the user in applying an access code or label (refer to FIGS. 10A, 10B, 10C, 10D, 11A, 11B, 11C, 13A and 13B) to the gift card 1210 during the checkout process.

The back surface 1204 of the gift card backer 1200 can also include a graphical element 1220. The graphical element 1220 may include instructions or other information to help the user through the checkout process. For example, the graphical element 1220 can include information warning the user that they should not purchase the gift card backer 1200 having the gift card 1210 therein if an access code or label has already been applied to the alignment portion 1214 before purchase and activation of the gift card 1210.

Figure 13A:
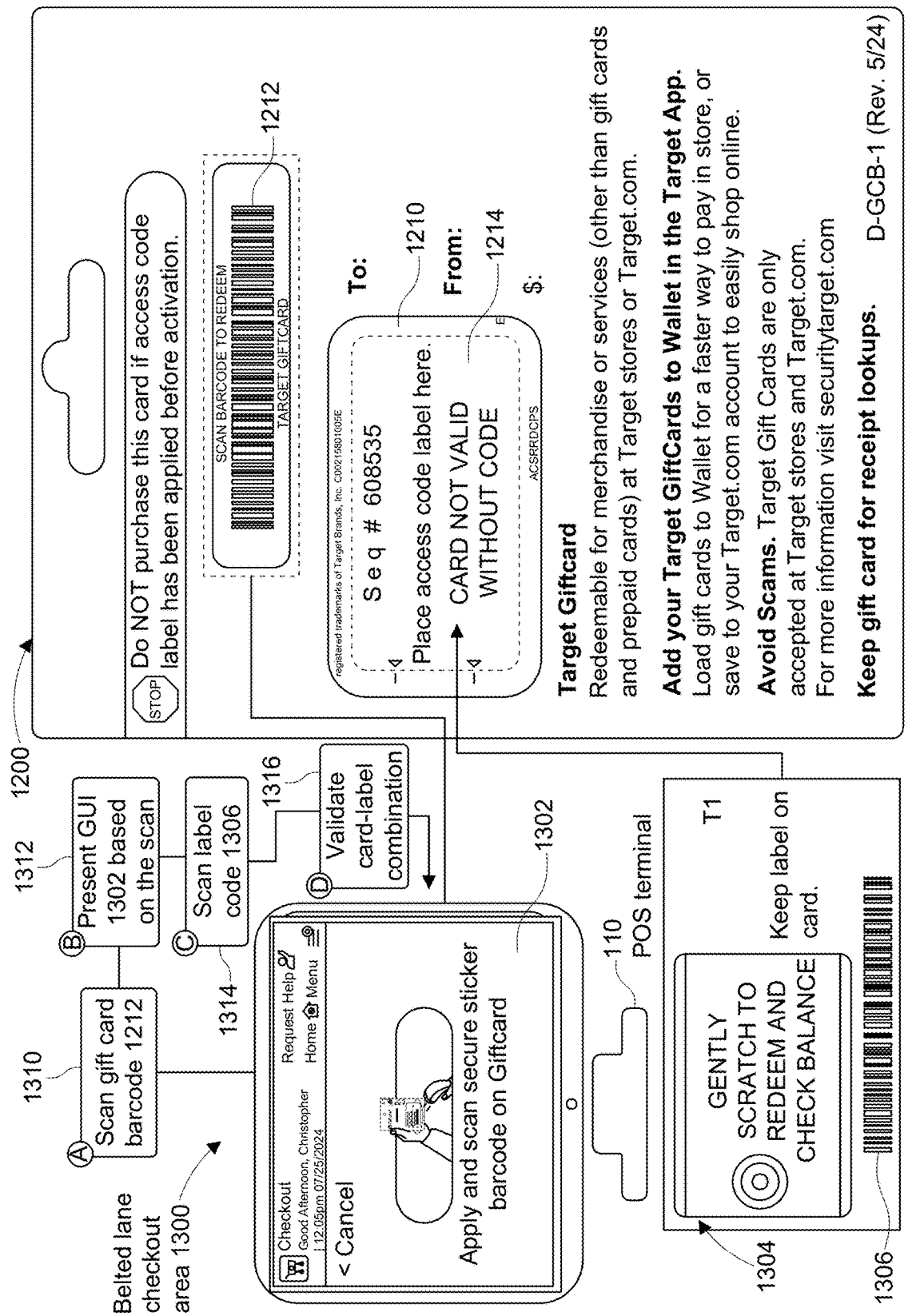
FIG. 13A illustrates an example belted checkout implementation for purchasing a decoupled gift card.
Figure 13B:
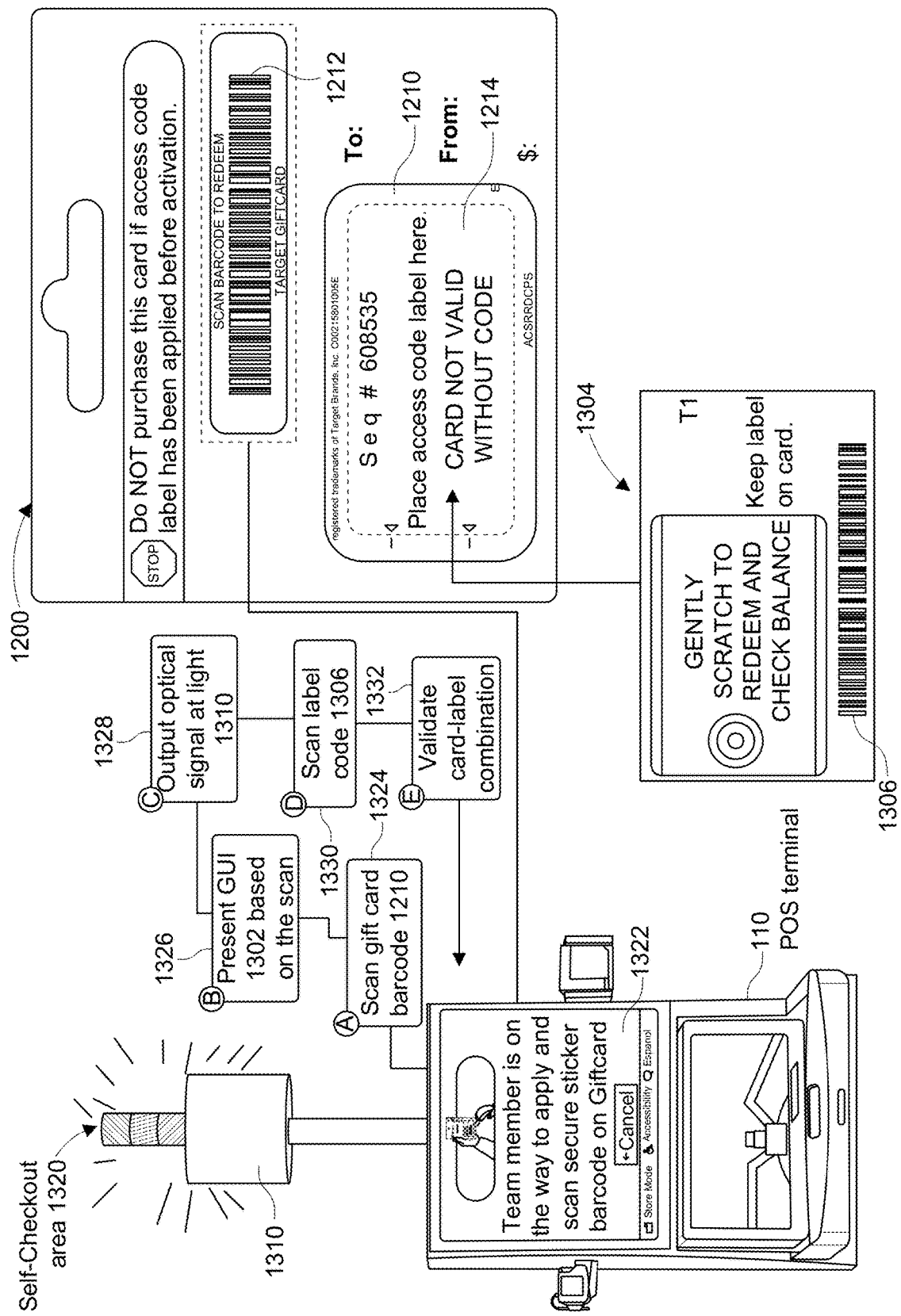
FIG. 13B illustrates an example self-checkout implementation for purchasing a decoupled gift card.

Advantageously, the disclosed configuration of the gift card backer 1200 and the gift card 1210 allows for consistent placement of an access code or other label described herein on the alignment portion 1214 of the gift card 1210 during the checkout process. In this configuration, the gift card 1210 may also be securely affixed to the gift card backer 1200 using adhesives, such as glue, tape, etc. As a result, a user may not readily remove or decouple the gift card 1210 from the gift card backer 1200 to steal the gift card 1210 information. The difference in size and shape of the openings 1206 and 1208 also makes it easier and more intuitive to determine which codes to scan (e.g., the barcode 1212 of the gift card 1210 or a barcode/access code on a label that is affixed to the alignment portion 1214 of the gift card 1210 during the checkout process). The barcode 1212 can be scanned first, which can then cause a prompt to be presented to the user that instructs the user to apply a label with an access code to the alignment portion 1214. Once the label is applied to the alignment portion 1214, the user can scan the access code on the label to continue through and complete the checkout process. Refer to FIGS. 13A and 13B for further discussion.

FIG. 13A illustrates an example belted checkout implementation for purchasing a decoupled gift card. The example of FIG. 13A can occur in a belted lane checkout area 1300 (e.g., a checkout lane operated by a team member in a retail environment). The belted lane checkout area 1300 can include a POS terminal 110, which can display one or more graphical user interfaces (GUIs) to a team member as they undergo a checkout process.

Here, the team member can scan the gift card barcode 1212 using scanning devices at the POS terminal 110 (block A, 1310).

The scanned gift card barcode 1212 can be received at the POS terminal 110. In response to receiving a proper scan of the barcode 1212, the POS terminal 110 can present GUI 1302 (block B, 1312). The GUI 1302 can include instructions for performing a next step in the checkout process. For example, the GUI 1302 can include instructions to apply a label 1304, having a barcode 1306, onto the alignment portion 1214 of the gift card 1210, then scan that barcode 1306. Refer to at least FIGS. 5C, 5D, 5E, 10A, 10B, 10C, 10D, 11A, 11B, and 11C for further discussion about the label 1304 having the barcode 1306 (e.g., access code).

Once the label 1304 is applied to the alignment portion 1214 of the gift card 1210, the team member can follow the prompt in the GUI 1302 to scan the label access code 1306 (block C, 1314).

Upon receiving the scanned access code 1306, the POS terminal 110 can validate the card-label combination in block D (1316) to complete the checkout process and purchase of the gift card 1210. Refer to at least FIGS. 2A and 2B for further discussion about validating the card-label combination.

FIG. 13B illustrates an example self-checkout implementation for purchasing a decoupled gift card. The example of FIG. 13B can occur in a self-checkout area 1320 (e.g., a checkout lane in a retail environment in which a guest scans and purchases items without the assistance of a team member). The checkout area 1320 can include a POS terminal 110, which can display one or more GUIs to the guest as they undergo a checkout process. The POS terminal 110 can also include a light 1310, which can be configured to automatically activate in response to prompts that are generated and presented in the GUI 1322 at the POS terminal 110.

Here, the guest can scan the gift card barcode 1212 using scanning devices at the POS terminal 110 (block A, 1324).

The scanned gift card barcode 1212 can be received at the POS terminal 110. In response to receiving a proper scan of the barcode 1212, the POS terminal 110 can present GUI 1322 (block B, 1326). The GUI 1322 can include instructions for performing a next step in the checkout process. For example, the GUI 1322 can include instructions indicating that a team member is on the way to apply the label 1304, having the access code/barcode 1306, onto the alignment portion 1214 of the gift card 1210, then scan that barcode 1306. Refer to at least FIGS. 5C, 5D, 5E, 10A, 10B, 10C, 10D, 11A, 11B, and 11C for further discussion about the label 1304 having the barcode 1306 (e.g., access code).

The POS terminal 110 can also output an optical signal at the light 1310 in block C (1328). The optical signal can include a flashing light, which can draw the attention of the team member near the self-checkout area 1320. In some implementations, the optical signal can be a change in color that is outputted by the light 1310. For example, the optical signal can be a green light. Other times, the optical signal can be a red light. As another illustrative example, the optical signal can be a flashing red light. Various other types of optical signals are also possible.

Once the team member approaches the guest purchasing the gift card 1210 and applies the label 1304 to the alignment portion 1214 of the gift card 1210, the team member and/or the guest can scan the label access code 1306 (block D, 1330).

Upon receiving the scanned access code 1306, the POS terminal 110 can validate the card-label combination in block E (1332) to complete the checkout process and purchase of the gift card 1210. Refer to at least FIGS. 2A and 2B for further discussion about validating the card-label combination.

In some implementations, if the barcode 1212 and/or the access code 1306 are improperly scanned, the GUI 1322 can be updated to output an error message. The error message can include a prompt or instructions to rescan the particular code that was missed or improperly scanned. If, for example, the guest scanned the same code more than once, an error message can also be presented in the GUI 1322. When scanning the access code 1306, for example, the POS terminal 110 may only accept a particular format of the scanned code (e.g., "AT100072490," refer to at least FIG. 2B). If a different format of the scanned code is recognized, then the POS terminal can update the GUI 1322 to present an error message and/or instructions to rescan the code or scan a different code on the gift card 1210. As a result, the POS terminal 110 can readily and easily identify when inappropriate scans are made during the checkout process in the self-checkout area 1320, thereby ensuring secure transactions.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for assembling a secure gift card, the system comprising:
    a first physical gift card component of a first type, wherein the first physical gift card component includes a first identifier;
    a second physical gift card component of a second type that is different from the first type, wherein the second physical gift card component includes a second identifier, wherein the first physical gift card component and the second physical gift card component are configured (i) to be retained separately prior to activation and (ii) to be physically attached to each other with adhesive at or around a time of activation to form a combined physical gift card that is usable in a retail environment; and
    a gift card computer system comprising one or more processors and memory storing instructions that, when executed, cause the one or more processors to perform an activation process for the combined physical gift card, the activation process comprising:
        receiving, over a communication network, the first identifier for the first physical gift card component and the second identifier for the second physical gift card component for the combined physical gift card,
        validating that the first physical gift card component and the second physical gift card component are available for use in the combined physical gift card based on a comparison of the received first identifier and the received second identifier against gift card component data in a data store,
        associating, based on the validating, the first physical gift card component and the second physical gift card component for the combined physical gift card in the data store, wherein the associating comprises generating a combined gift card data entry in the data store for the combined physical gift card that associates the first physical gift card component with the second physical gift card component, and
        transmitting, based on the validating and associating, confirmation that the combined physical gift card has been activated for use in the retail environment.

2. The system of claim 1, wherein:
when combined, the first physical gift card component includes a unique identifier for the combined physical gift card and the second physical gift card component includes an access code for the combined physical gift card, and
the combined gift card data entry generated in the data store for the combined physical gift card provides an association between the unique identifier and the access code for the combined physical gift card, and
the association provided by the combined gift card data entry is configured to be referenced to validate the combined physical gift card during a subsequent redemption process.

3. The system of claim 2, wherein the second identifier for the second physical gift card component is different from the access code included on the second physical gift card component.

4. The system of claim 3, wherein the combined gift card data entry comprises the unique identifier and the access code for the combined physical gift card.

5. The system of claim 3, wherein:
the data store includes a second gift card component data entry that associates the second identifier for the second physical gift card component with the access code for the second physical gift card component, and
the second gift card component data entry is accessed (i) to validate the second physical gift card component based on the received second identifier and (ii) to retrieve the access code for the second physical gift card component based on the received second identifier for use generating the combined gift card data entry.

6. The system of claim 2, wherein:
the first identifier for the first physical gift card component is the unique identifier for the combined physical gift card, and
the second identifier is a unique identifier for the second physical gift card component that is different from the access code.

7. The system of claim 2, wherein:
the second physical gift card component further includes a removable material that overlays and covers at least a portion of the access code on the second physical gift card component so as to make the at least a portion of the access code unviewable, and
the removable material is configured to be removed from the second physical gift card component, causing the access code to be viewable.

8. The system of claim 7, wherein the second identifier is presented on a same side of the second physical gift card component as the access code and the removable material, and is viewable and uncovered by the removable material.

9. The system of claim 2, wherein the gift card computer system is further configured to perform a redemption process for the combined physical gift card, wherein the redemption process comprises:
receiving, over the communication network, data values representing a submitted unique identifier and a submitted access code as part of a redemption request for requested gift card;
accessing, using the data store, the association provided by the combined gift card data entry and other associations for other combined physical gift cards provided by other combined gift card data entries;
validating the requested gift card as authentic based on the submitted unique identifier and the submitted access code being associated with each other in the association or the other associations provided by the combined gift card data entry and the other combined gift card data entries; and
returning, based on validating the requested gift card, confirmation that the requested gift card is authentic.

10. The system of claim 2, wherein:
the access code is concealed by a tamper-proof material provided on the combined physical gift card,
the unique identifier and the second identifier are viewable and unconcealed on the combined physical gift card, and
the subsequent redemption process is configured to require submission of the unique identifier and the access code from the combined physical gift card.

11. The system of claim 1, wherein:
the gift card component data in the data store comprises (i) a first data entry for the first physical gift card component that includes the first identifier and first information identifying whether the first physical gift card component has already been combined with other gift card components, and (ii) a second data entry for the second physical gift card component that includes the second identifier and second information identifying whether the second physical gift card component has already been combined with other gift card components,
the validating performed by the gift card computer system comprises accessing the first information and the second information to verify that the first physical gift card component and the second physical gift card component have not already been combined with other gift card components, and
when the combined gift card data entry is generated associating the first physical gift card component and the second physical gift card component for the combined physical gift card, the first information and the second information are updated to indicate that the first physical gift card component and the second physical gift card component have been combined with other gift card components.

12. The system of claim 1, wherein the first physical gift card component comprises a card and the second physical gift card component is configured to be physically attached to the card.

13. The system of claim 12, wherein:
the second physical gift card component comprises a label with a first side and a second side,
the first side of the label includes adhesive material configured for physical attaching the second physical gift card component to the card, and
the second side of the label includes the second identifier.

14. The system of claim 1, wherein the retail environment comprises physical retail stores and online stores associated with one or more retailers.

15. The system of claim 1, further comprising:
a plurality of first physical gift card components of the first type that each include unique first identifiers, wherein the first physical gift card component is part of the plurality of first physical gift card components; and
a plurality of second physical gift card components of the second type that each include unique second identifiers, wherein the second physical gift card component is part of the plurality of second physical gift card components,
wherein the plurality of first physical gift card components are configured to be retained separate in the retail environment from the plurality of second physical gift card components prior to being combined and activated as combined physical gift cards, and wherein each of the plurality of first physical gift card components are configured to be combinable with any of the plurality of second card components to form combined physical gift cards.

16. The system of claim 1, further comprising
a point of sale (POS) terminal in network communication with the gift card computer system, wherein the POS terminal is configured to:
   scan, using a scanning device at the POS terminal, the first identifier and the second identifier of the combined physical gift card;
   transmit, to the gift card computer system, the scanned first and second identifiers for the combined physical gift card;
   receive, from the gift card computer system, the confirmation that the combined physical gift card has been activated for use in the retail environment; and
   complete, based on the confirmation, a checkout process to purchase the combined physical gift card.

17. A secure gift card comprising:
a first physical gift card component of a first type, wherein the first physical gift card component includes a first identifier; and
a second physical gift card component of a second type that is different from the first type, wherein the second physical gift card component includes a second identifier, wherein the first physical gift card component and the second physical gift card component are configured to be (i) retained separately prior to activation, (ii) physically attached to each other with adhesive at or around a time of activation, and (iii) associated with each other at or around the time of activation in gift card computer system to form a combined physical gift card that is usable in a retail environment.

18. A secure gift card comprising:
a first physical gift card component of a first type, wherein the first physical gift card component includes a first identifier; and
a second physical gift card component of a second type that is different from the first type, wherein the second physical gift card component includes a second identifier, wherein the first physical gift card component and the second physical gift card component are configured (i) to be retained separately prior to activation and (ii) to be physically attached to each other with adhesive at or around a time of activation to form a combined physical gift card that is usable in a retail environment,
wherein, when combined, the first physical gift card component includes a unique identifier for the combined physical gift card and the second physical gift card component includes an access code for the combined physical gift card.

19. The secure gift card of claim 18, wherein the second identifier for the second physical gift card component is different from the access code included on the second physical gift card component.

20. The secure gift card of claim 18, wherein:
the second physical gift card component further includes a removable material that overlays and covers at least a portion of the access code on the second physical gift card component so as to make the at least a portion of the access code unviewable, and
the removable material is configured to be removed from the second physical gift card component, causing the access code to be viewable.

21. The secure gift card of claim 17, wherein:
the first physical gift card component comprises a card and the second physical gift card component is configured to be physically attached to the card.

22. The secure gift card of claim 21, wherein:
the second physical gift card component comprises a label with a first side and a second side,
the first side of the label includes adhesive material configured for physical attaching the second physical gift card component to the first physical gift card component, and
the second side of the label includes the second identifier.

23. The secure gift card of claim 22, wherein the second side further includes an access code concealed by a tamper-proof material provided on a portion of the second side.

24. The secure gift card of claim 18, wherein:
the first physical gift card component comprises a card,
the second physical gift card component comprises a label with a first side and a second side,
the first side of the label includes adhesive material configured for physical attaching the second physical gift card component to the first physical gift card component, and
the second side of the label includes the access code.

25. The secure gift card of claim 24, wherein:
the first identifier comprises the unique identifier for the combined physical gift card that is configured to remain viewable when the label is physically attached to the card,
the second identifier is different from the access code,
the label further includes a removable material that overlays and covers at least a portion of the access code on the second side of the label so as to make the at least a portion of the access code unviewable,
the second identifier is associated with the access code and uniquely identifies the second physical gift card component relative to other second physical gift card components of the second type, and
the second identifier is uncovered by the removable material and is viewable on the second side of the label.

26. The secure gift card of claim 25, wherein:
the first identifier comprises a first barcode, and
the second identifier comprises a second barcode.

* * * * *